US012140739B2

(12) United States Patent
Machida

(10) Patent No.: US 12,140,739 B2
(45) Date of Patent: Nov. 12, 2024

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Kosuke Machida, Tokyo (JP)

(73) Assignee: Nikon Corporation, Tokyo (JP)

( * ) Notice: Subject to any disclaimer, the term of this patent is extended or adjusted under 35 U.S.C. 154(b) by 336 days.

(21) Appl. No.: 17/595,849

(22) PCT Filed: May 27, 2020

(86) PCT No.: PCT/JP2020/020820
§ 371 (c)(1),
(2) Date: Nov. 26, 2021

(87) PCT Pub. No.: WO2020/250671
PCT Pub. Date: Dec. 17, 2020

(65) Prior Publication Data
US 2022/0317424 A1    Oct. 6, 2022

(30) Foreign Application Priority Data

Jun. 14, 2019    (JP) .................................. 2019-110862

(51) Int. Cl.
*G02B 15/14*    (2006.01)
*G02B 13/18*    (2006.01)
(Continued)

(52) U.S. Cl.
CPC ......... *G02B 15/1421* (2019.08); *G02B 13/18* (2013.01); *G02B 15/1425* (2019.08);
(Continued)

(58) Field of Classification Search
None
See application file for complete search history.

(56) References Cited

U.S. PATENT DOCUMENTS

| 2011/0228160 A1* | 9/2011 | Imaoka ................ G02B 27/646 |
| | | 359/683 |
| 2012/0050603 A1 | 3/2012 | Imaoka et al. |

(Continued)

FOREIGN PATENT DOCUMENTS

| CN | 104181682 A | 12/2014 |
| JP | 2012-047814 A | 3/2012 |

(Continued)

OTHER PUBLICATIONS

Office Action issued Sep. 6, 2022, in Japanese Patent Application No. 2021-525976.

(Continued)

*Primary Examiner* — Darryl J Collins
(74) *Attorney, Agent, or Firm* — Potomac Law Group, PLLC

(57) ABSTRACT

A variable power optical system (ZL (1)) includes a plurality of lens groups (G1-G7). During variable magnification, an interval between adjacent lens groups changes. The plurality of lens groups include: a first focusing lens group (G5) that moves during focusing; and a second focusing lens group (G6) that is disposed more toward an imaging surface side than the first focusing lens group and that moves along a different trajectory than the first focusing lens group during focusing. The first focusing lens group and the second focusing lens group both have a negative refractive power.

(Continued)

The plurality of lens groups satisfy the following condition: $0.40 < fF1/fF2 < 3.50$ (wherein fF1 is the focal distance of the first focusing lens group, and fF2 is the focal distance of the second focusing lens group).

22 Claims, 37 Drawing Sheets

(51) Int. Cl.
  *G02B 15/20* (2006.01)
  *G02B 15/22* (2006.01)
(52) U.S. Cl.
  CPC ......... *G02B 15/1461* (2019.08); *G02B 15/20* (2013.01); *G02B 15/22* (2013.01)

(56) References Cited

U.S. PATENT DOCUMENTS

| | | |
|---|---|---|
| 2013/0201370 A1 | 8/2013 | Hatada |
| 2014/0211082 A1 | 7/2014 | Imaoka |
| 2014/0347546 A1 | 11/2014 | Obikane |
| 2015/0168697 A1 | 6/2015 | Ogata |
| 2015/0323764 A1* | 11/2015 | Mori ................ H04N 23/54 359/683 |
| 2017/0038566 A1* | 2/2017 | Shibayama ............. G03B 3/00 |
| 2019/0196157 A1 | 6/2019 | Kawamura et al. |
| 2019/0302404 A1* | 10/2019 | Iwamoto ............ G02B 15/1461 |
| 2020/0233191 A1* | 7/2020 | Ichimura ................ G02B 13/18 |

FOREIGN PATENT DOCUMENTS

| | | |
|---|---|---|
| JP | 2013-160944 A | 8/2013 |
| JP | 2014-160229 A | 9/2014 |
| JP | 2014-228812 A | 12/2014 |
| JP | 2015-118127 A | 6/2015 |
| JP | 2015-197655 A | 11/2015 |
| JP | 2017-129668 A | 7/2017 |
| JP | 2019-124818 A | 7/2019 |
| JP | 2019-184632 A | 10/2019 |
| JP | 2020-052338 A | 4/2020 |

OTHER PUBLICATIONS

Office Action issued Apr. 14, 2023, in Chinese Patent Application No. 202080043267.2.
Office Action issued Dec. 6, 2022, in Japanese Patent Application No. 2021-525976.
International Search Report from International Patent Application No. PCT/JP2020/020820, Aug. 18, 2020.
International Preliminary Report on Patentability from International Patent Application No. PCT/JP2020/020820, Dec. 23, 2021.
Office Action issued Dec. 5, 2023, in Japanese Patent Application No. 2023-054460.

* cited by examiner

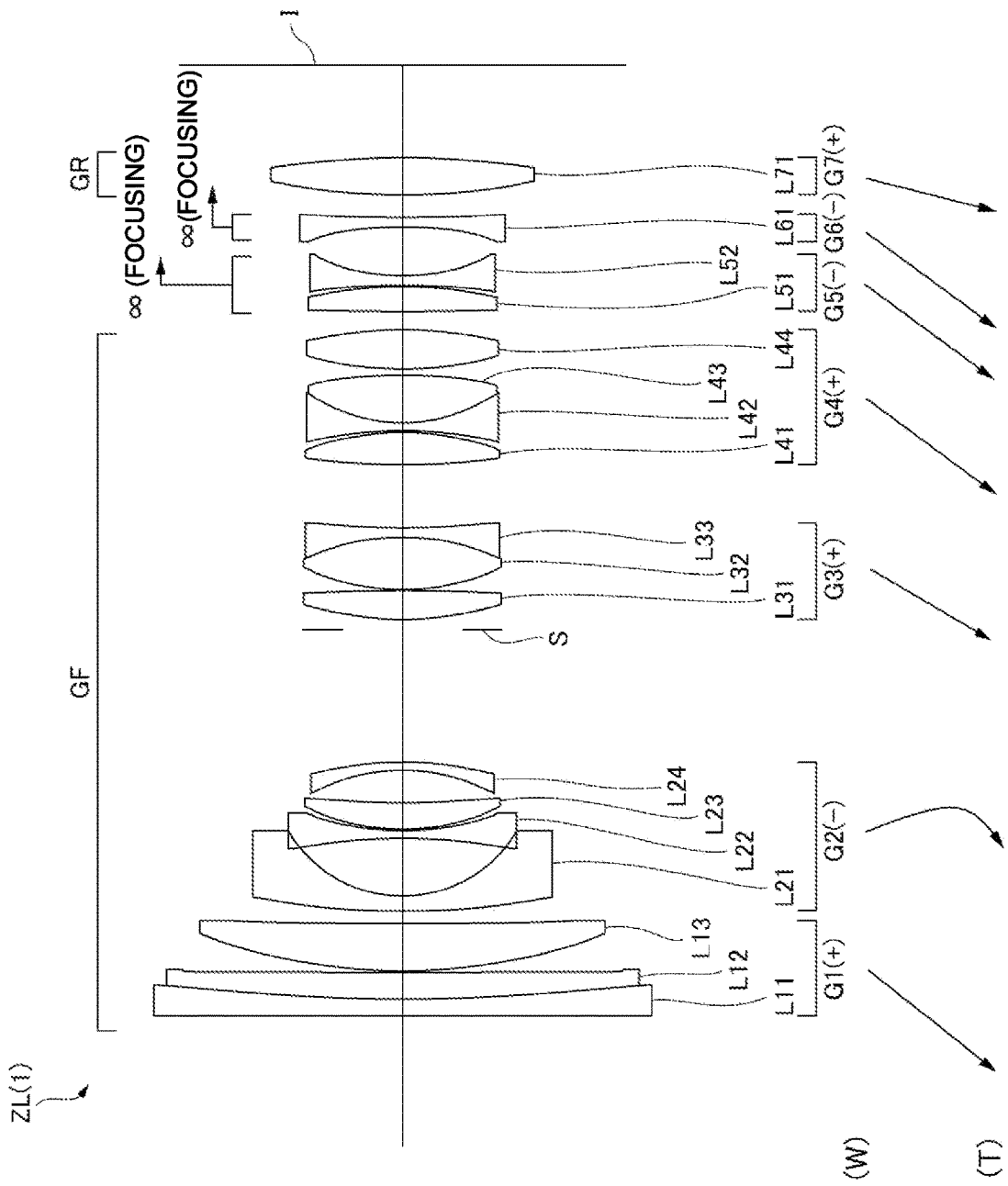

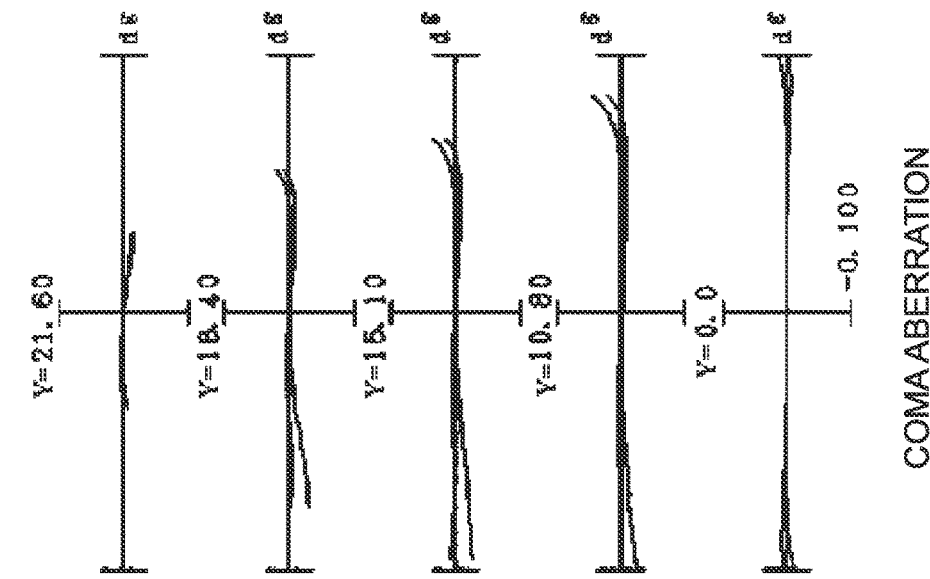
FIG.2B
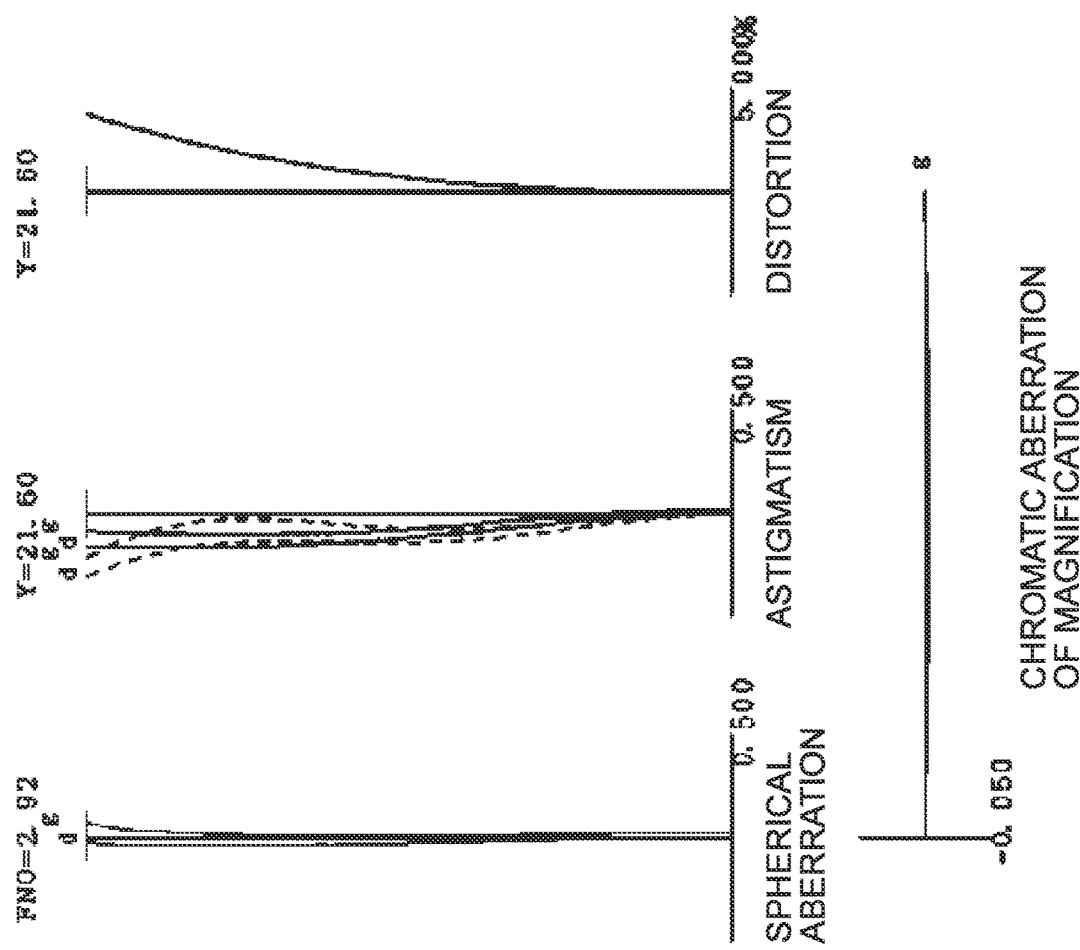

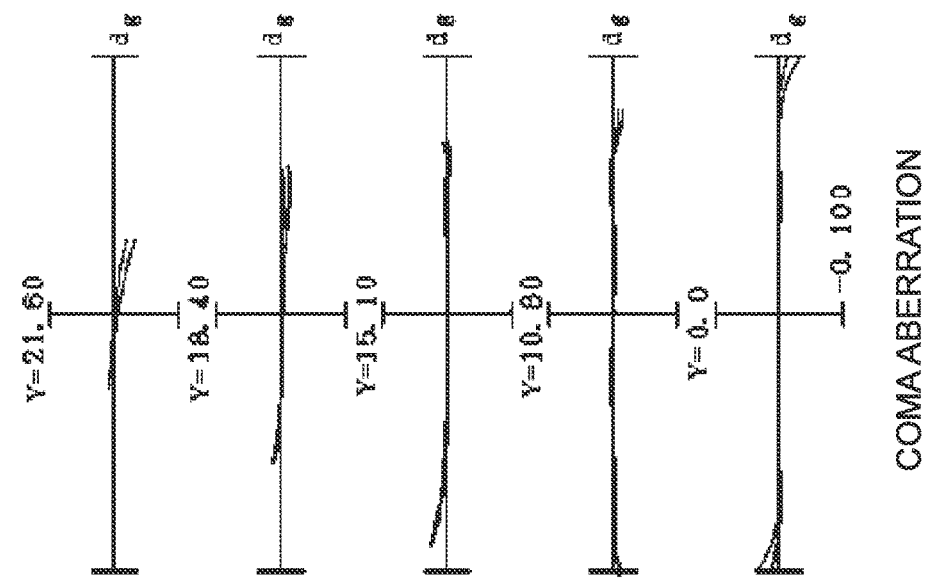
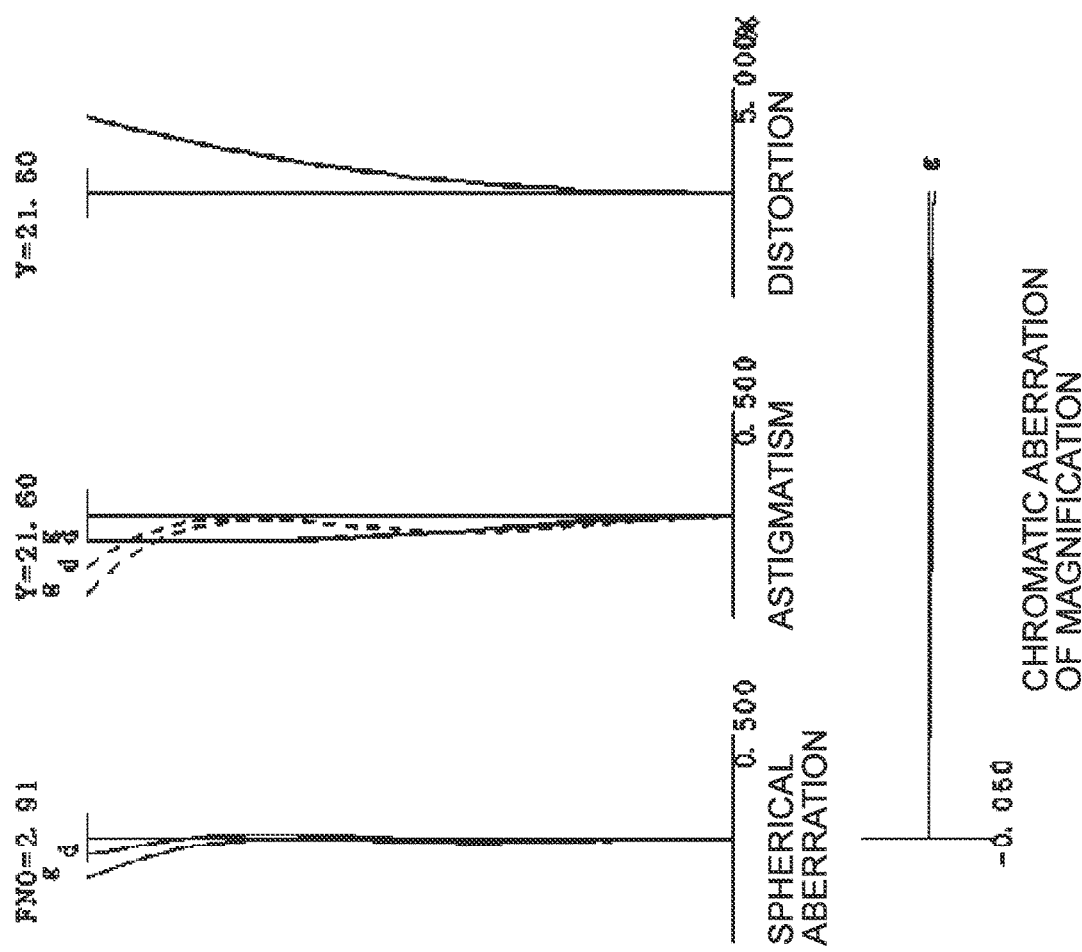
FIG.2C

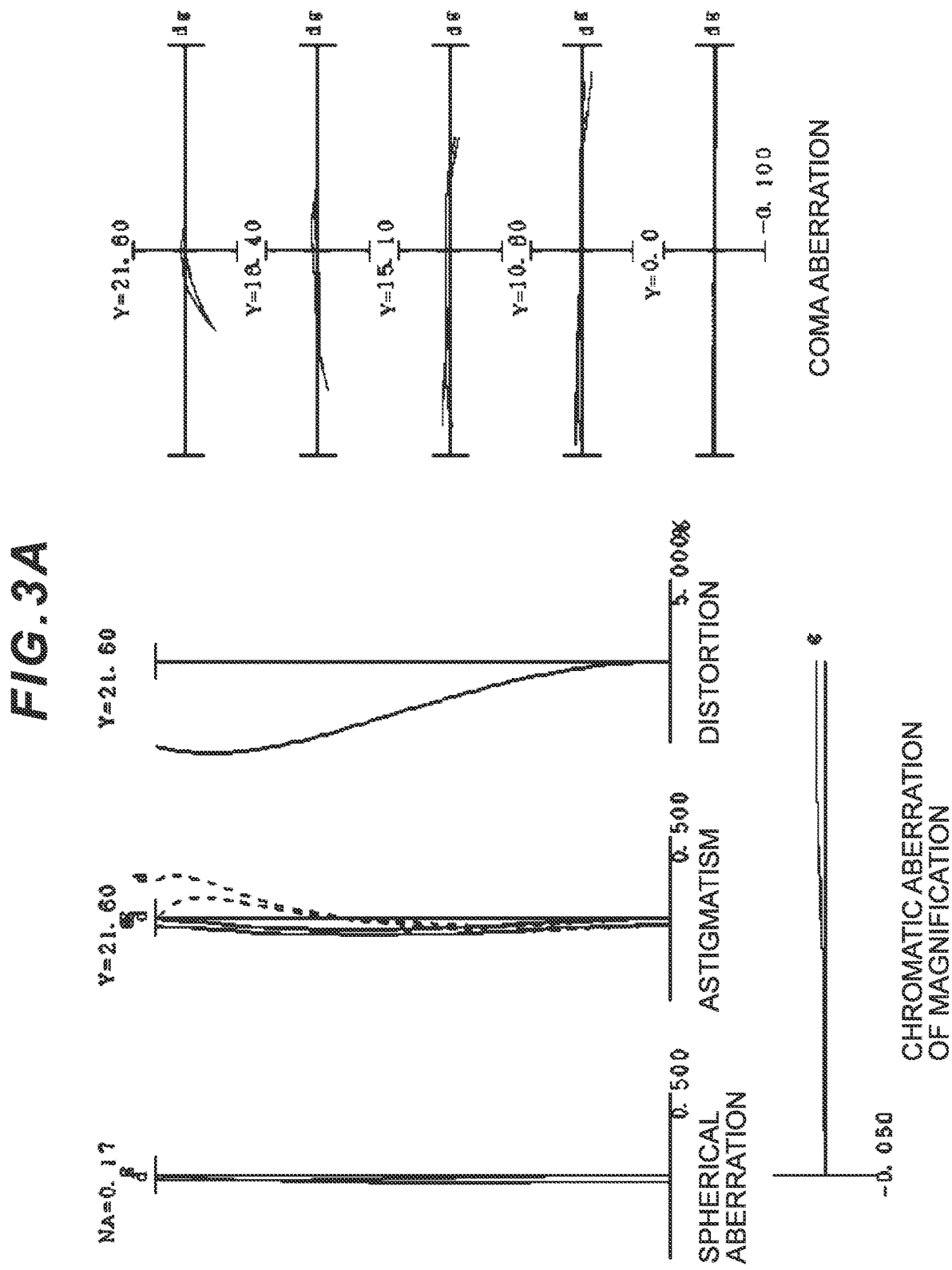

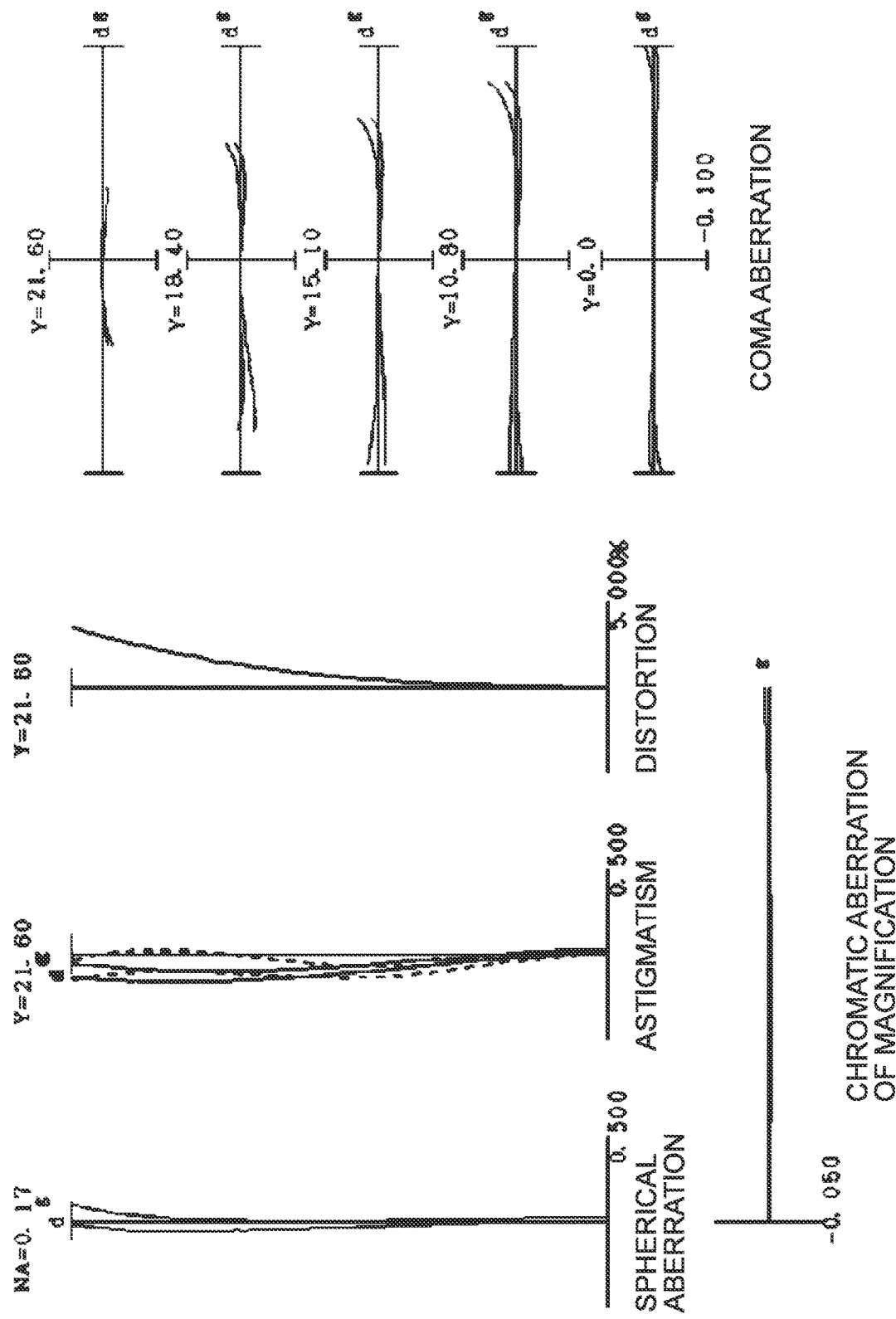

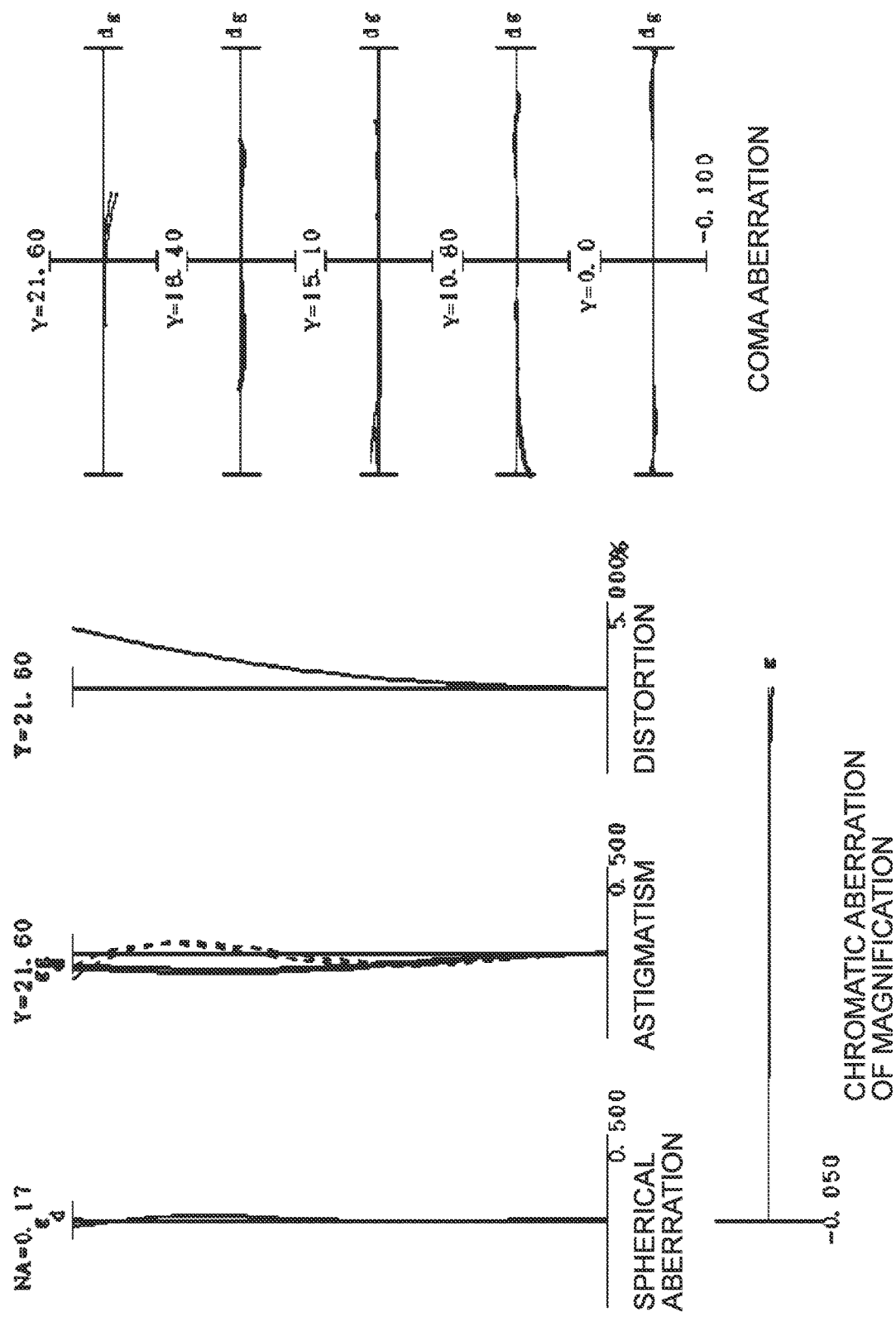

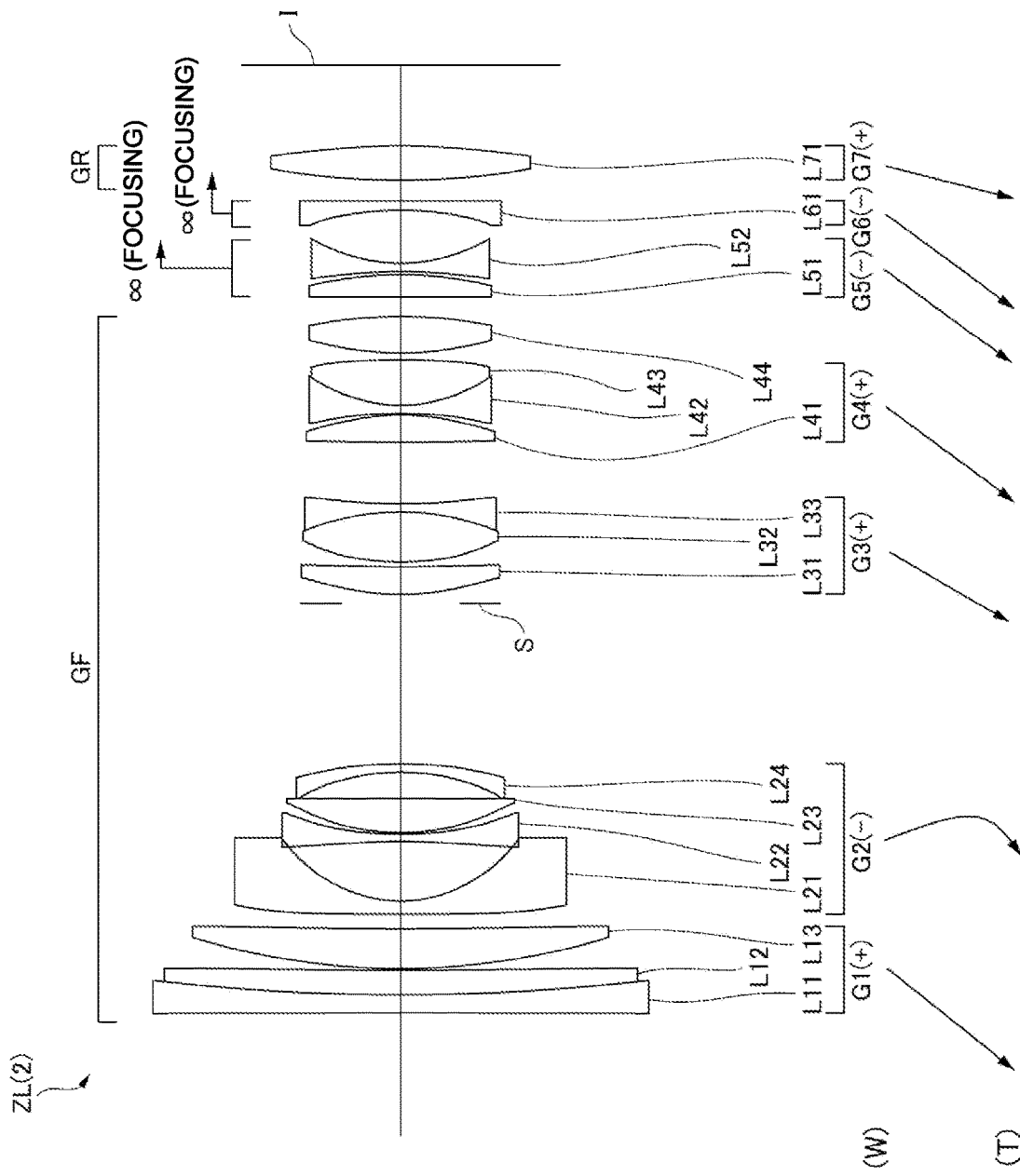

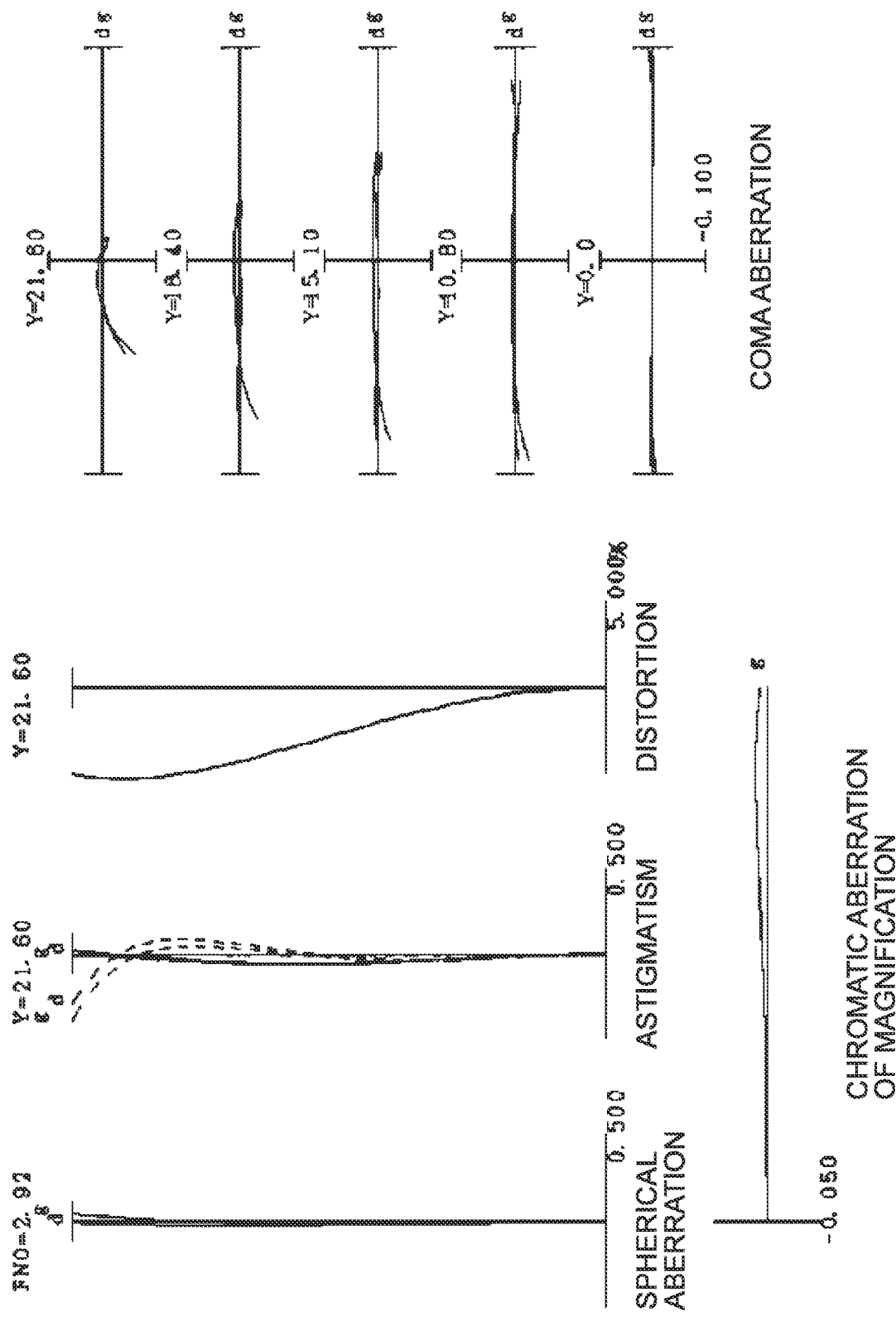

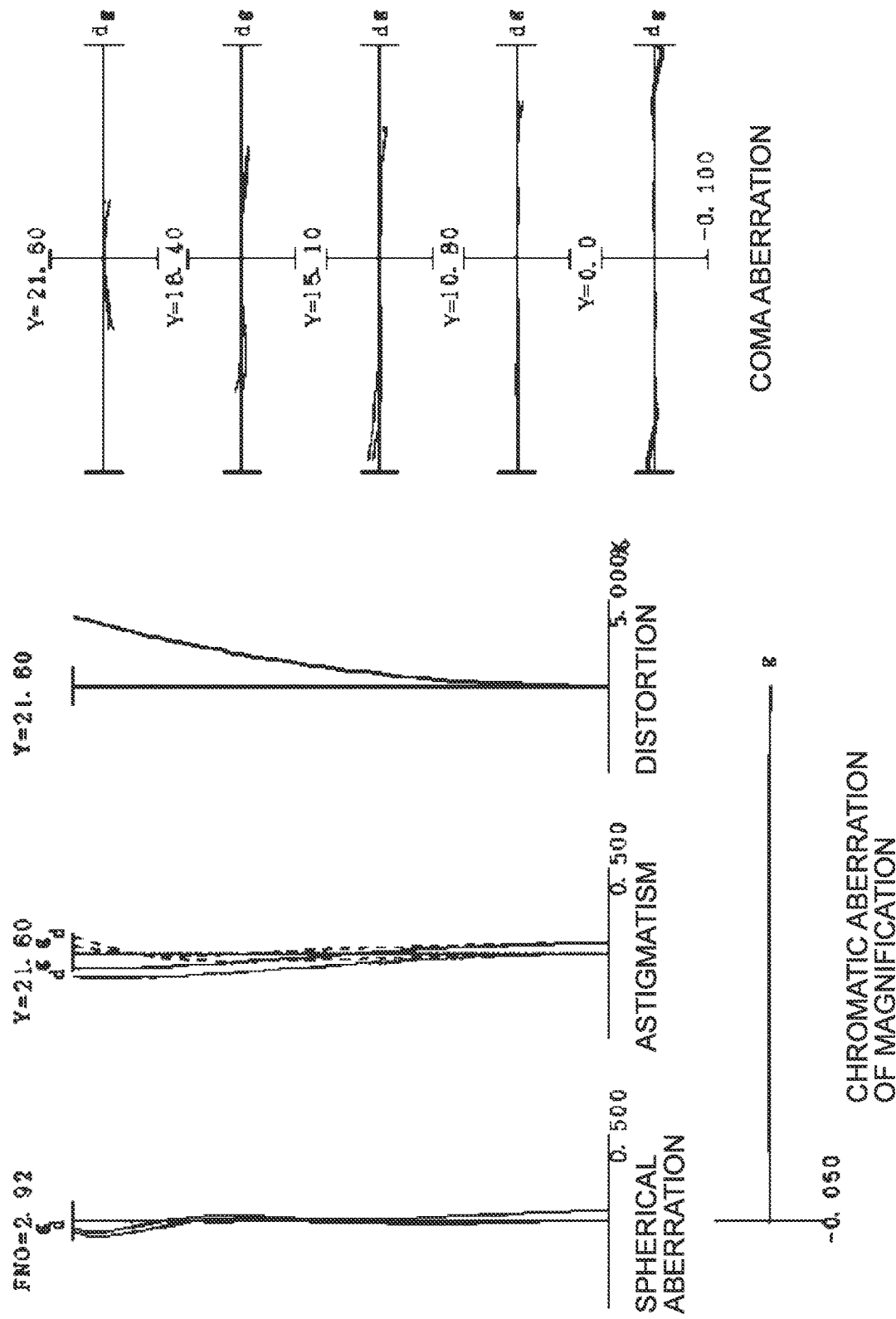

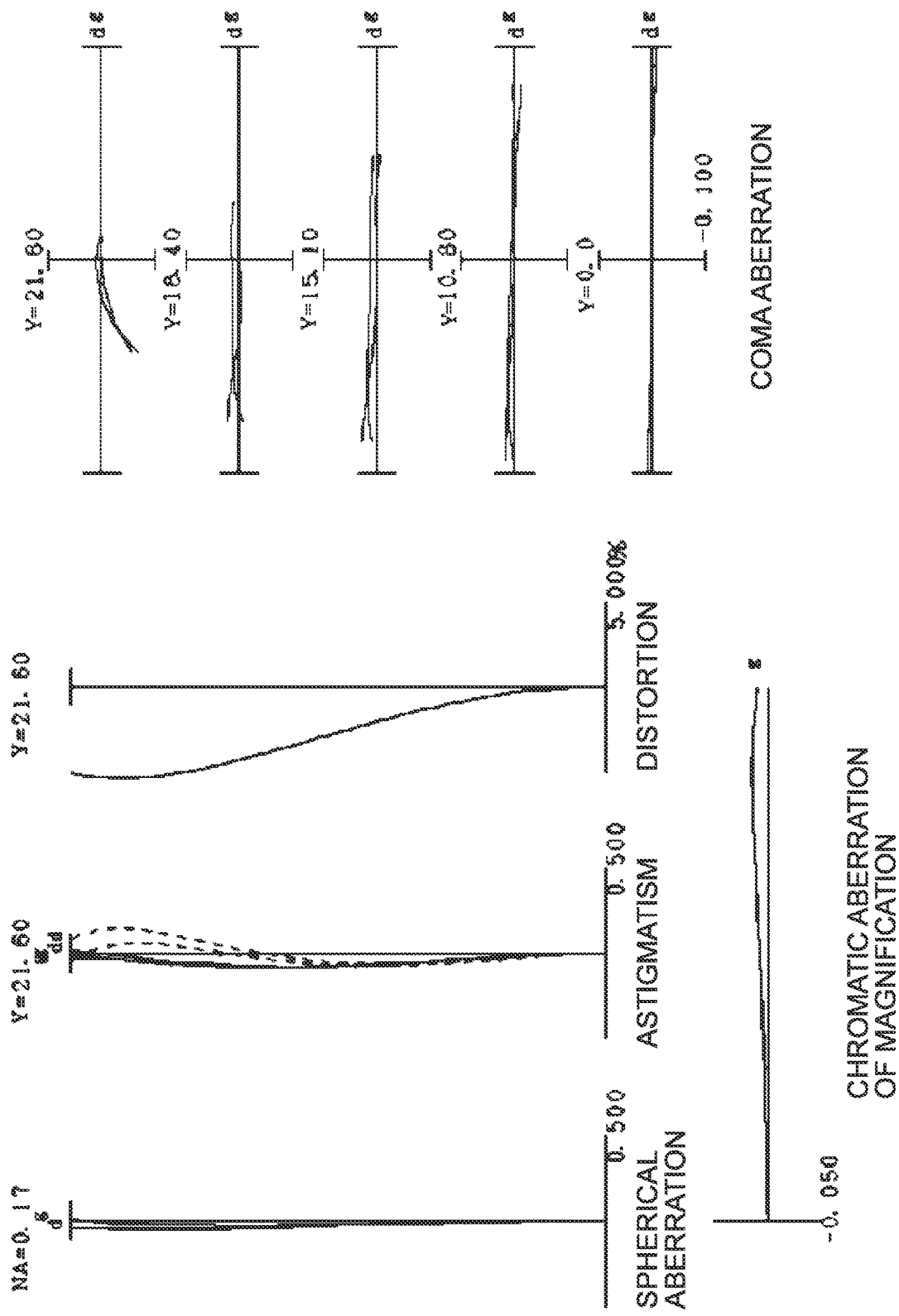

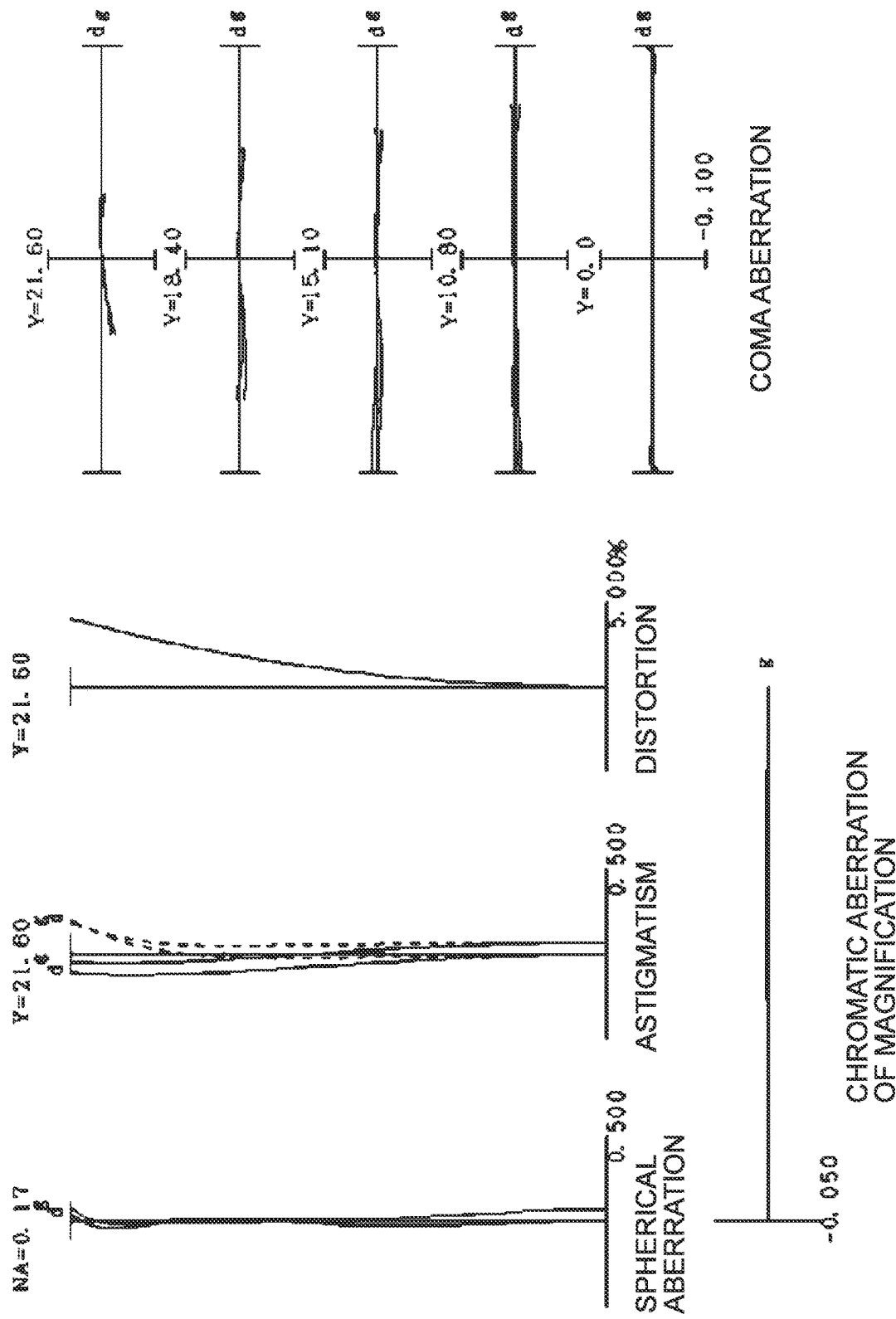

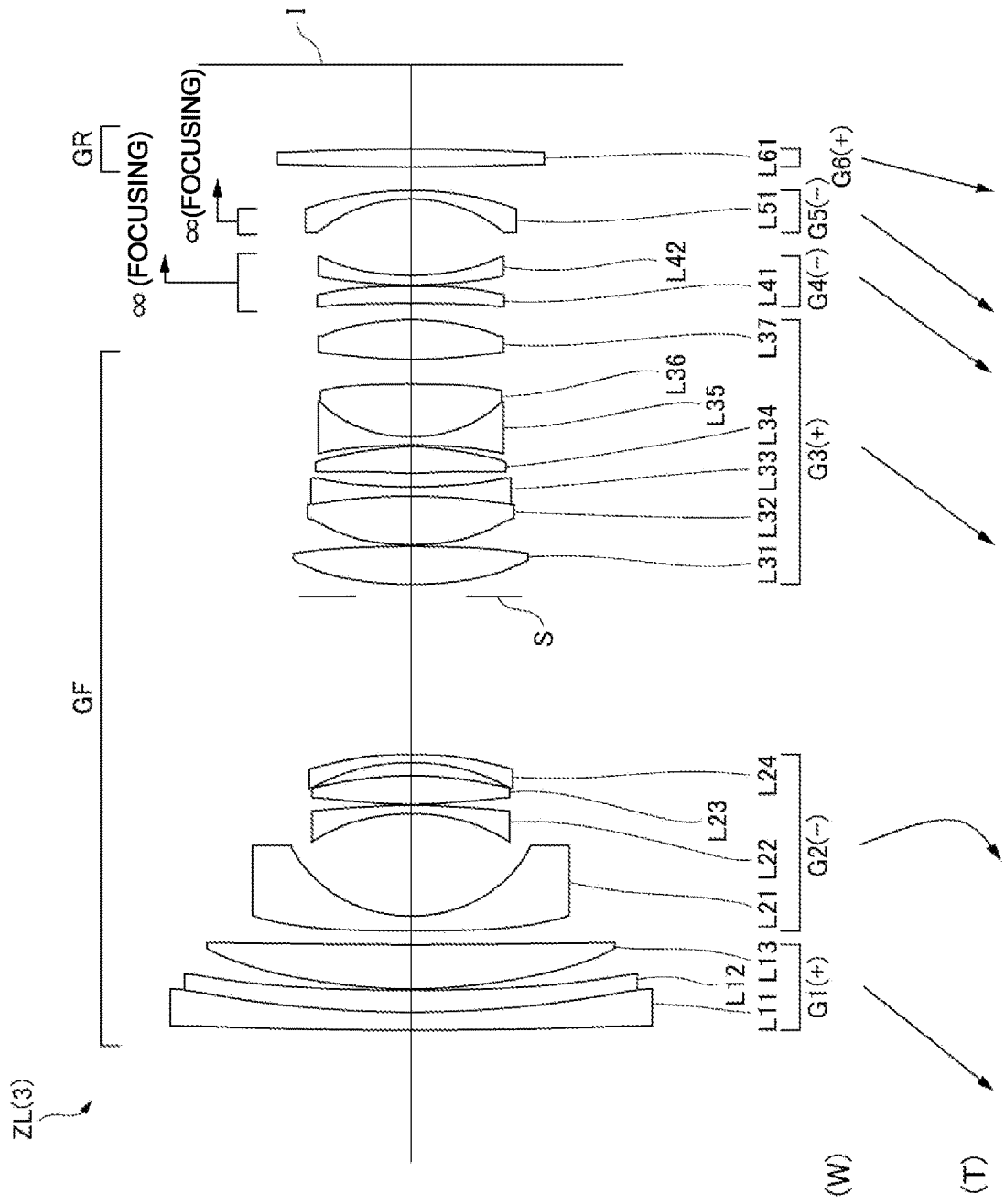

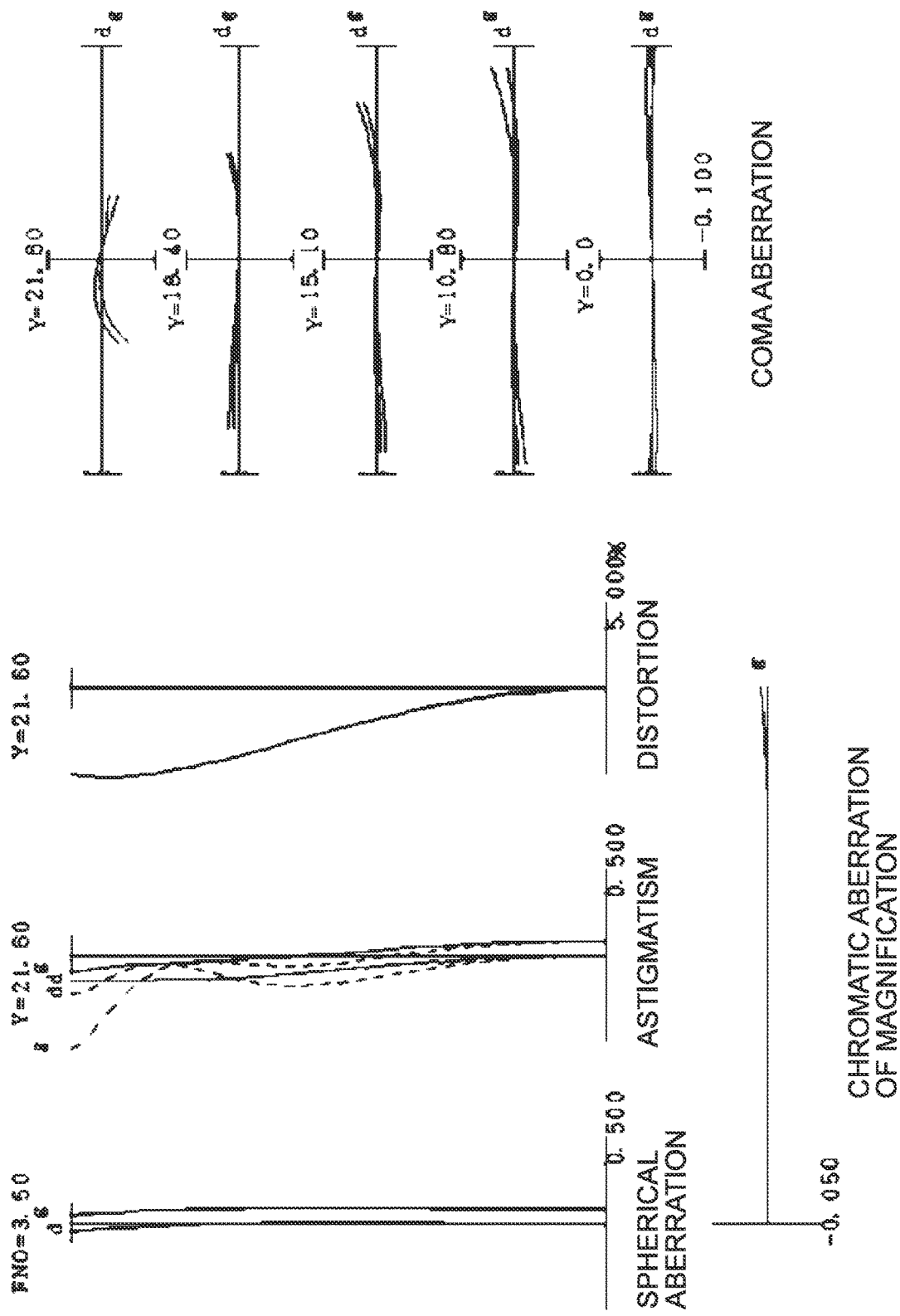

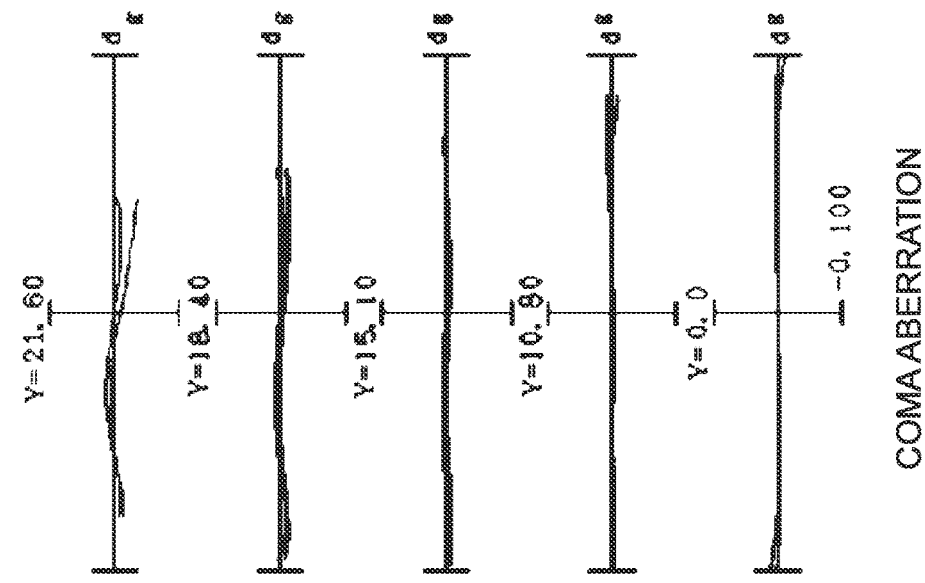
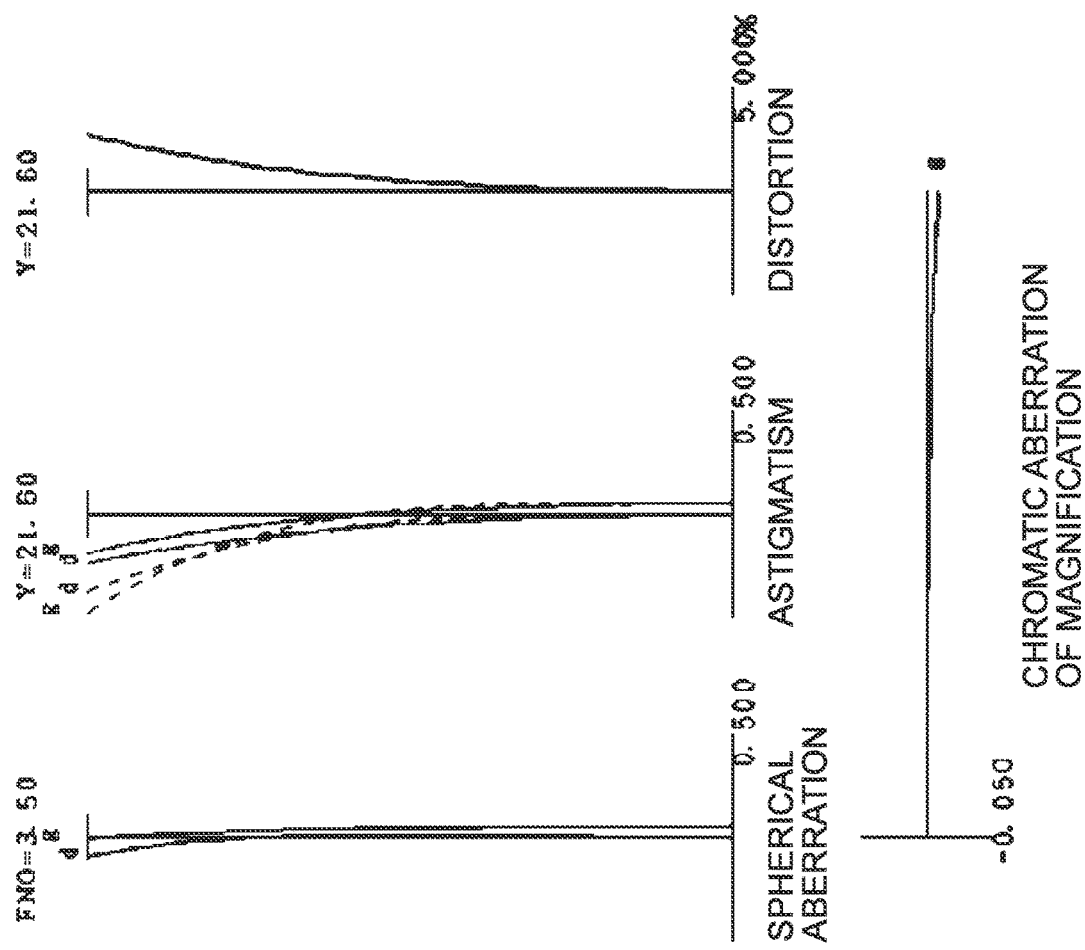
FIG.8B

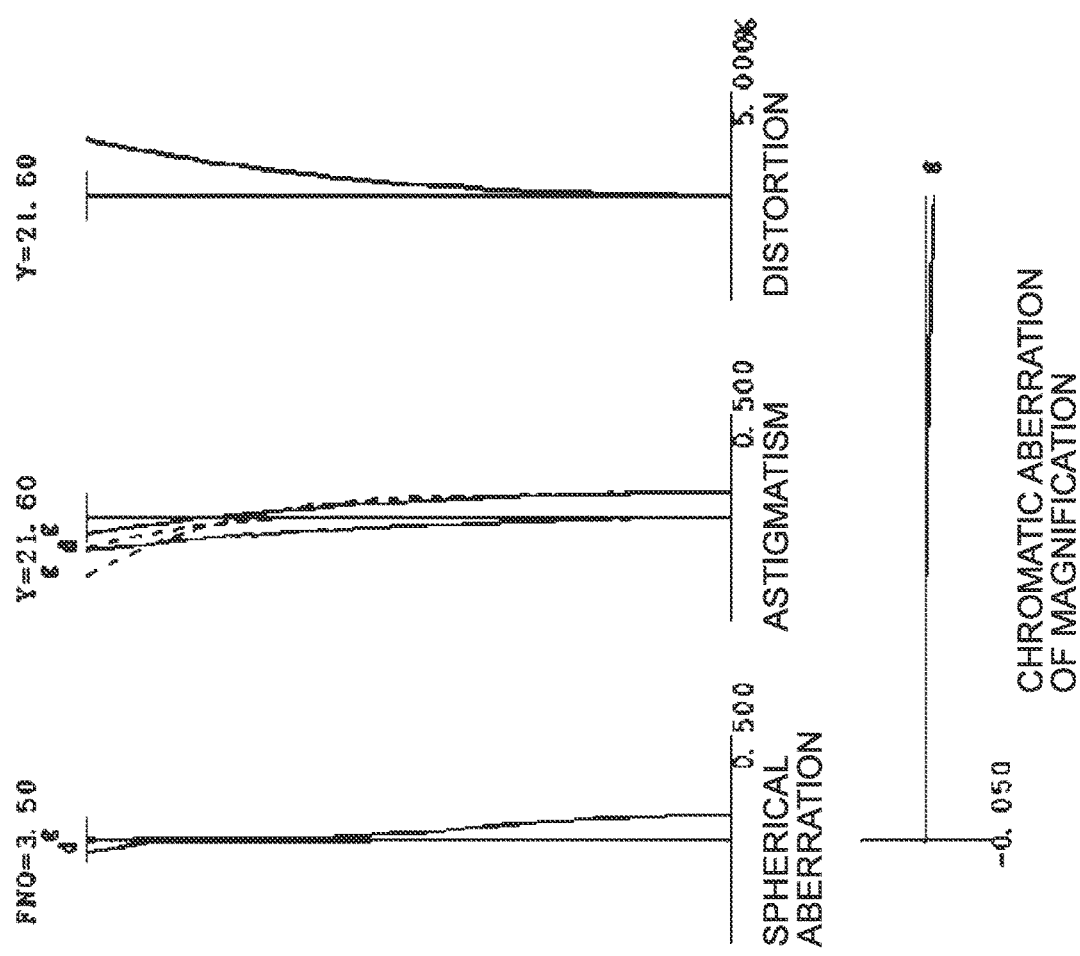

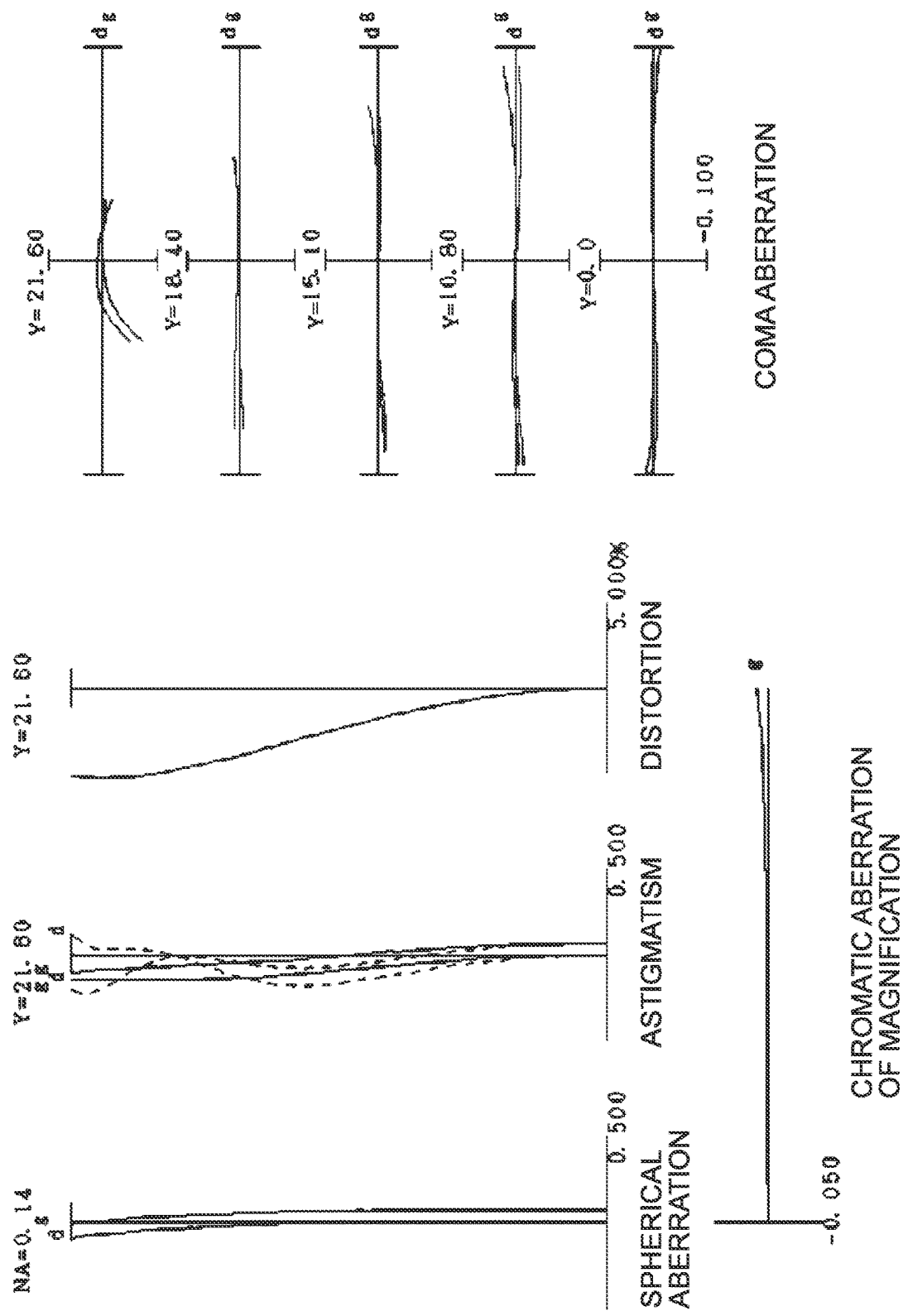

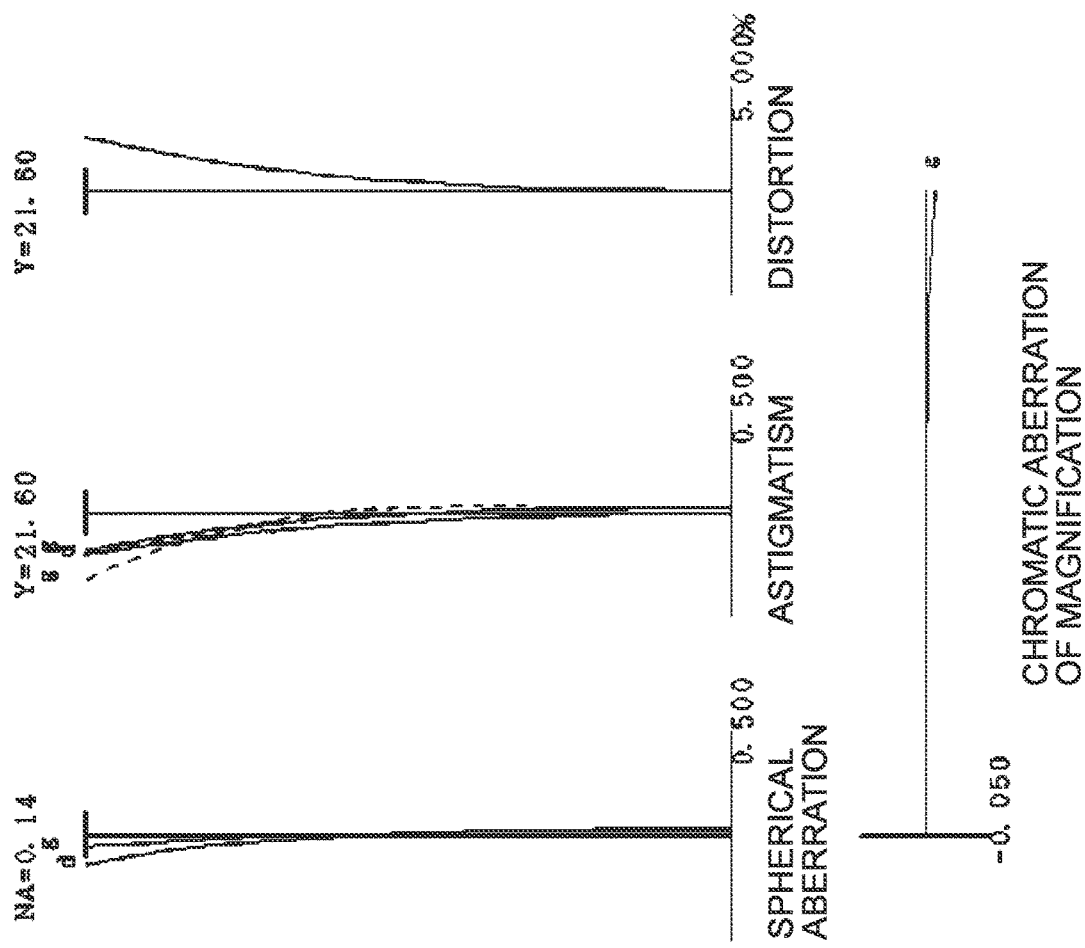

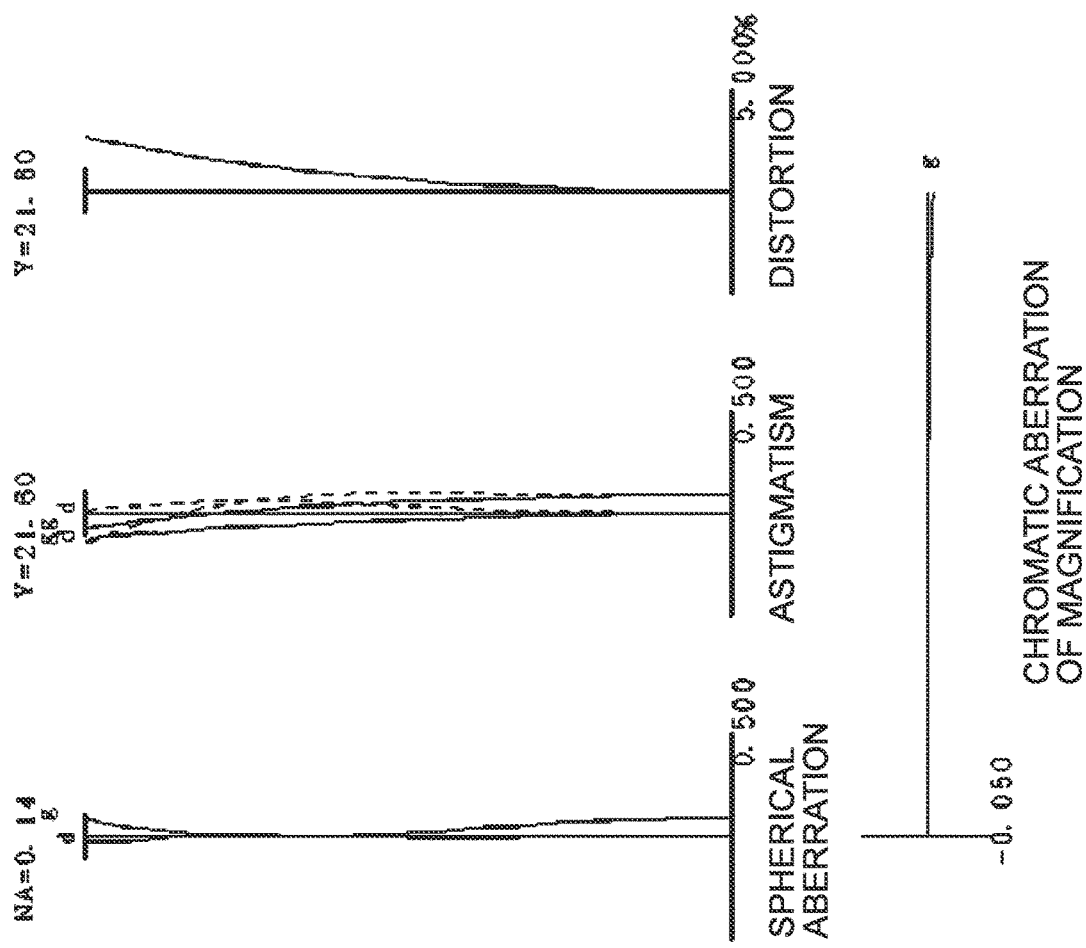

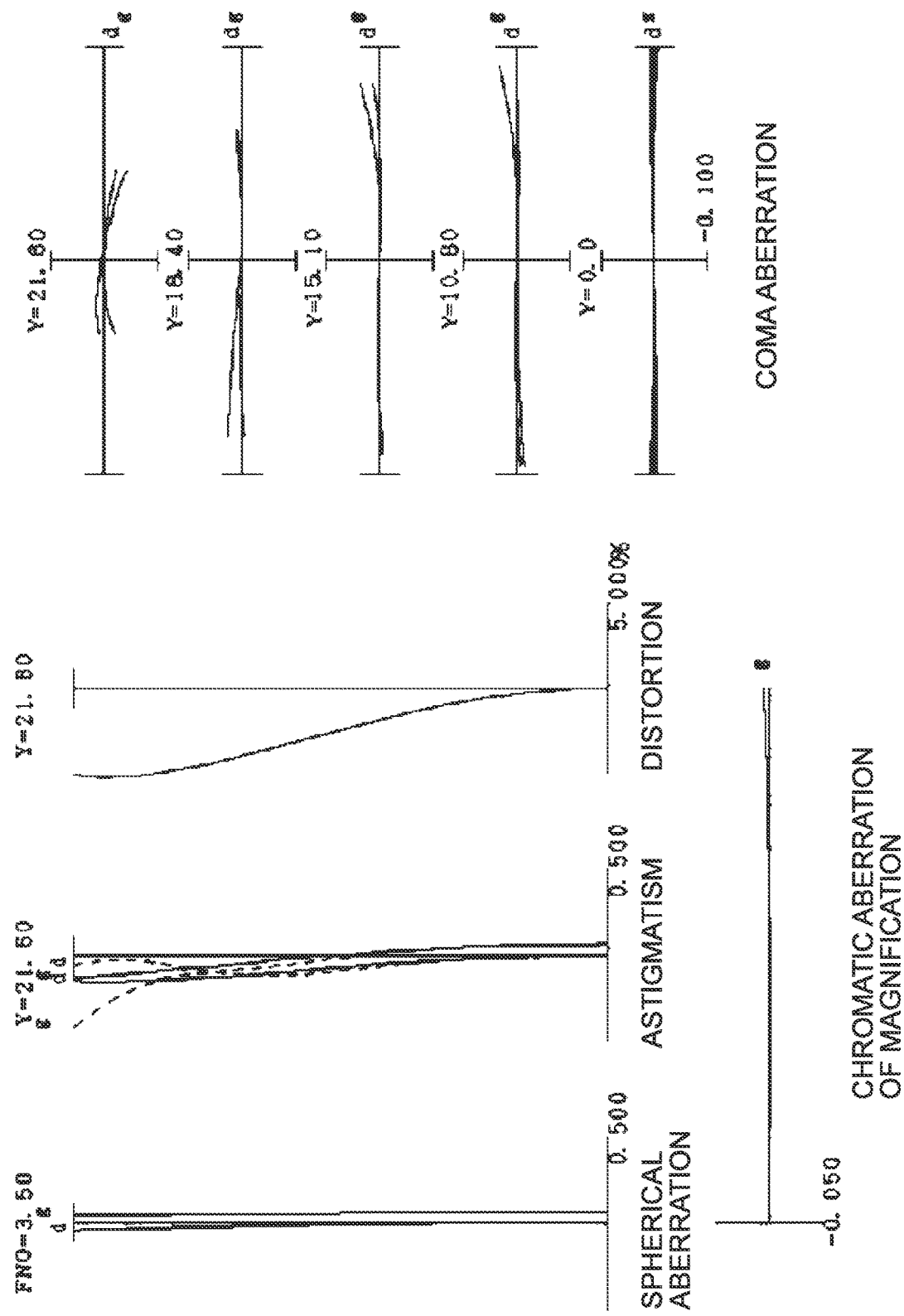

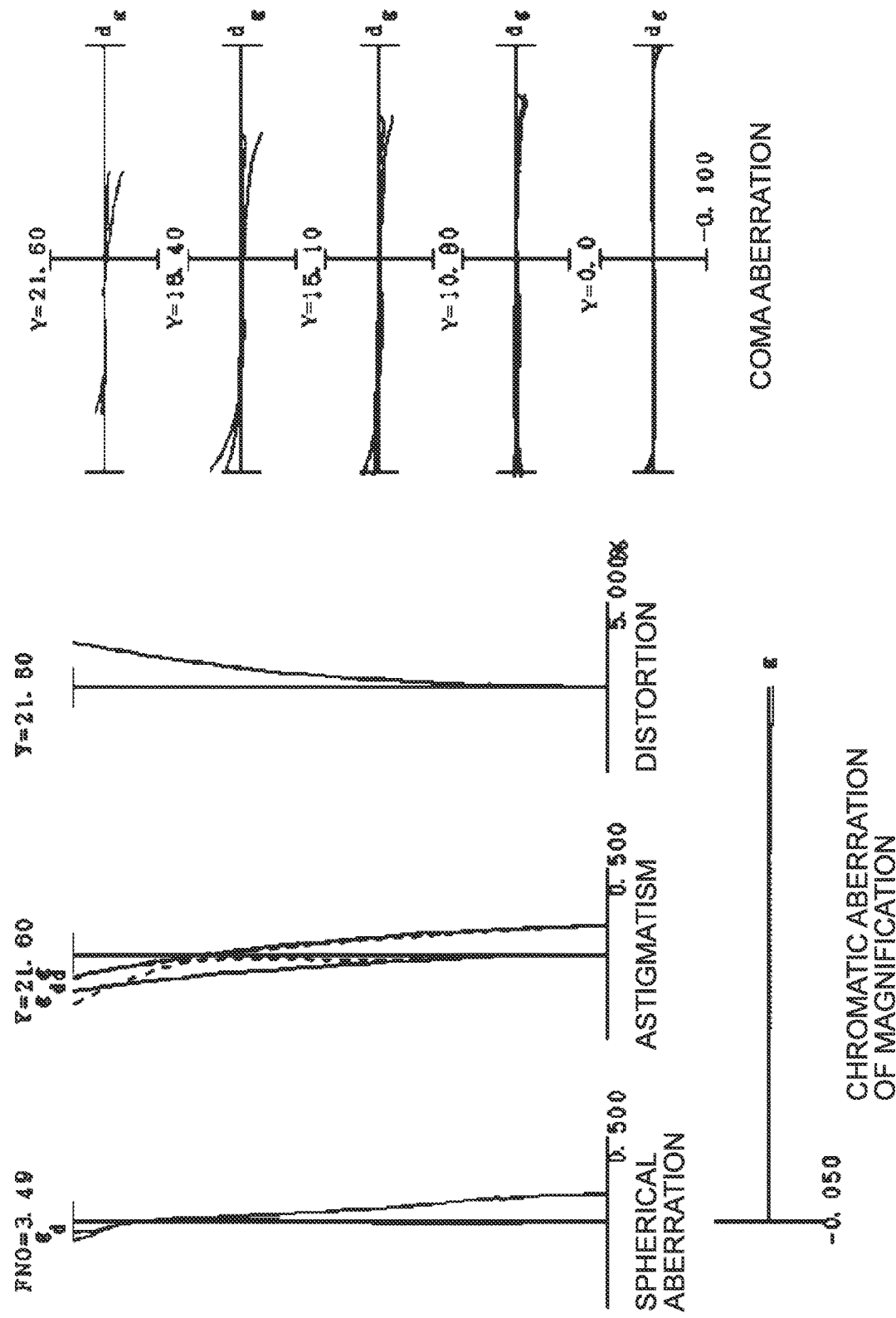

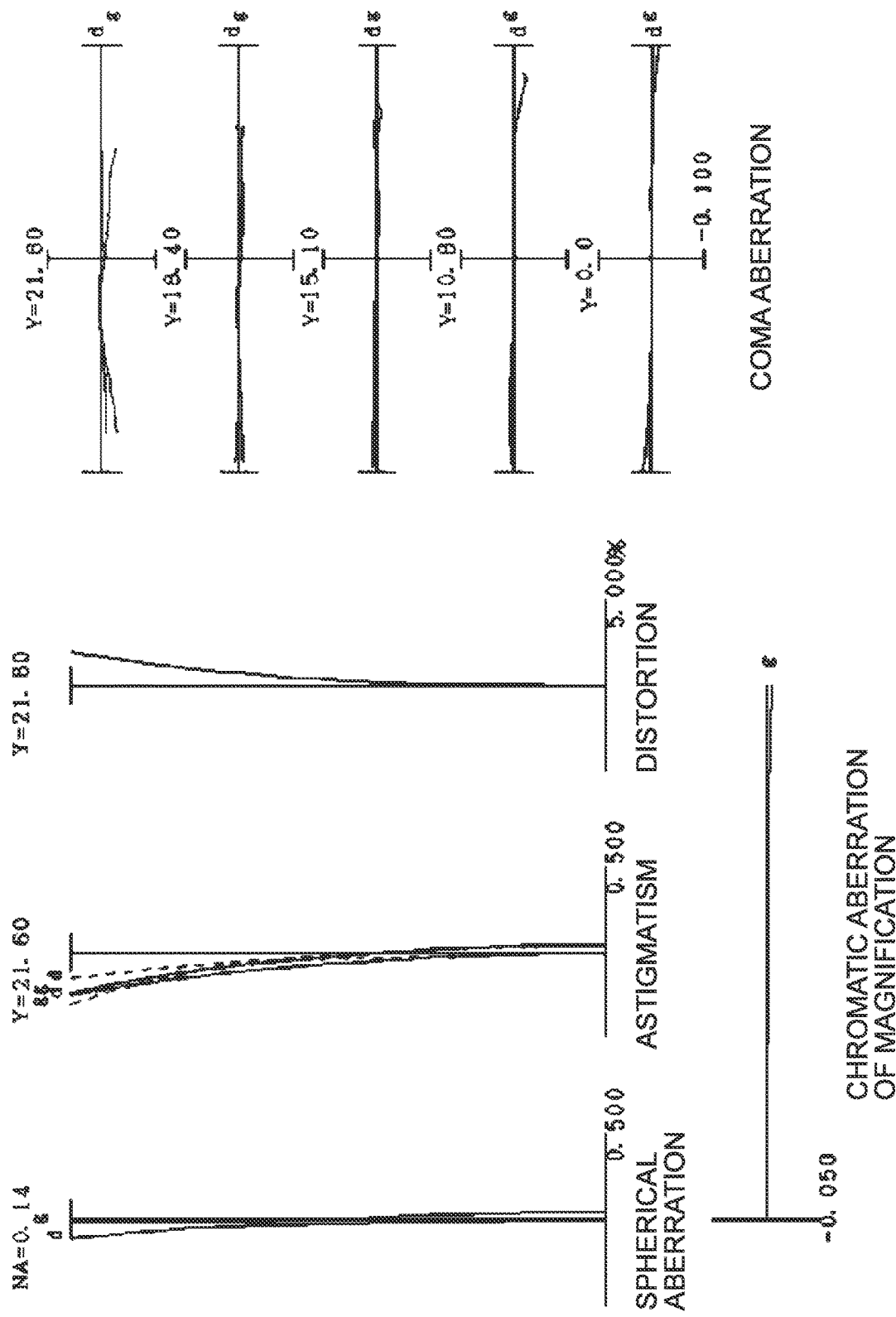

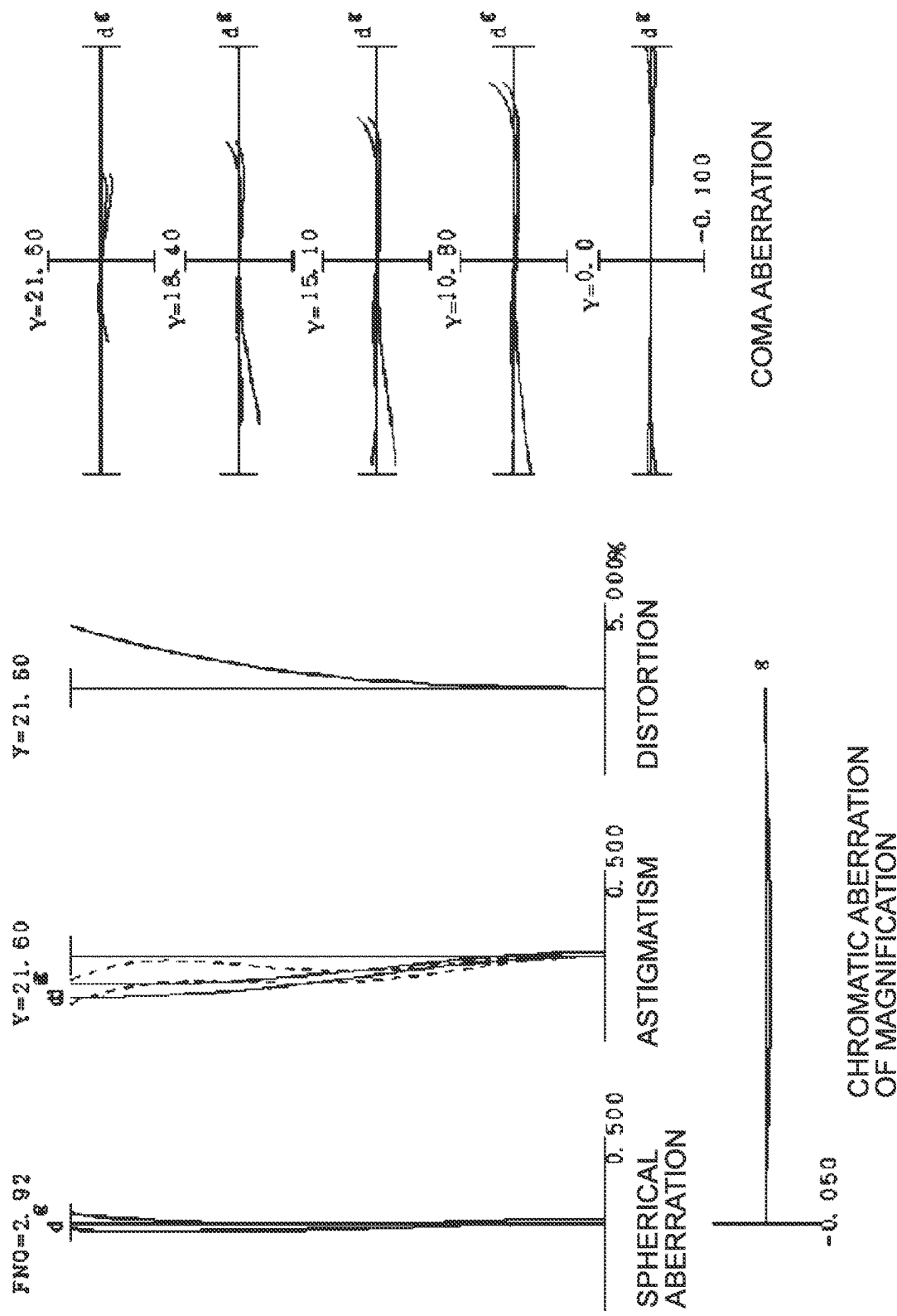

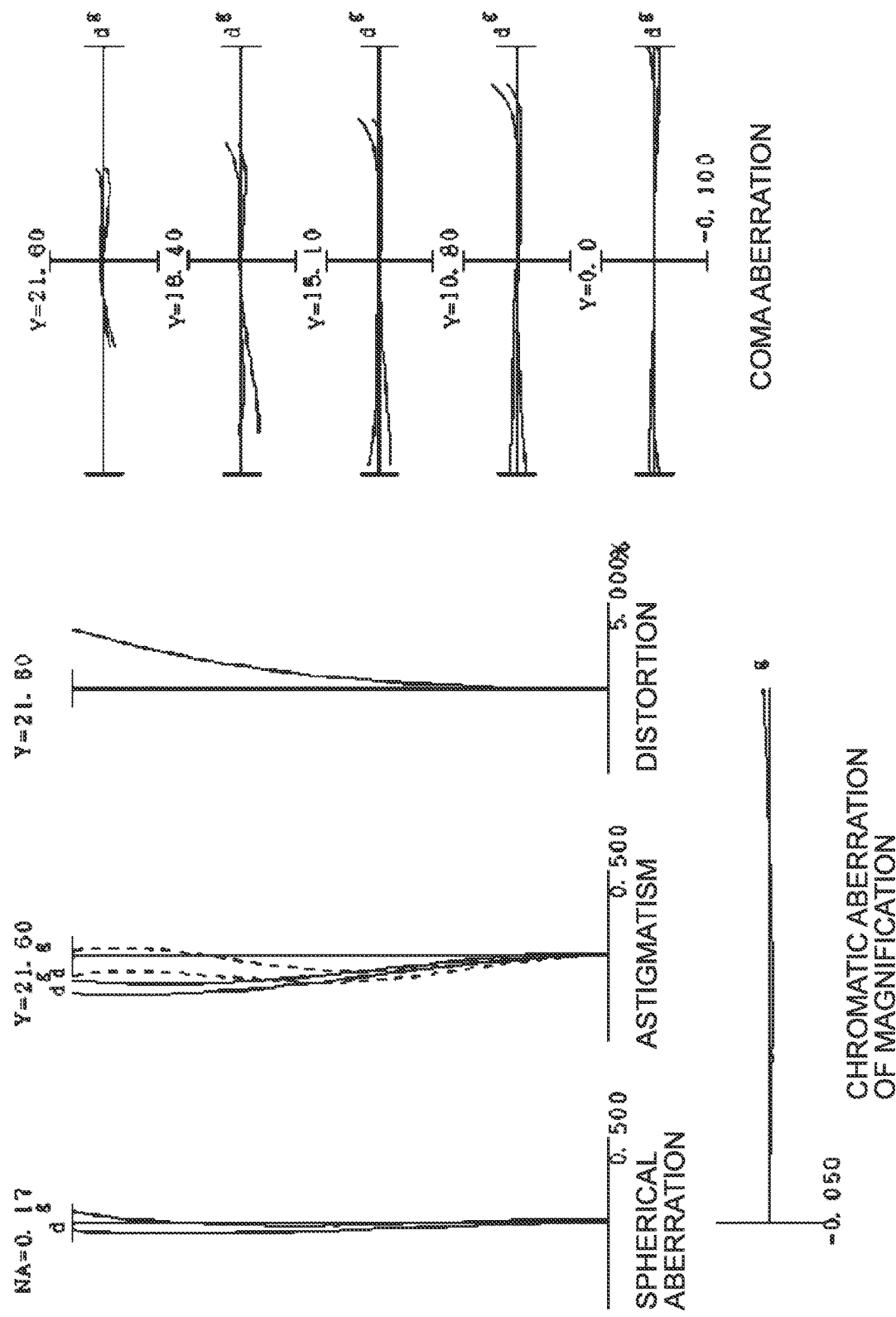

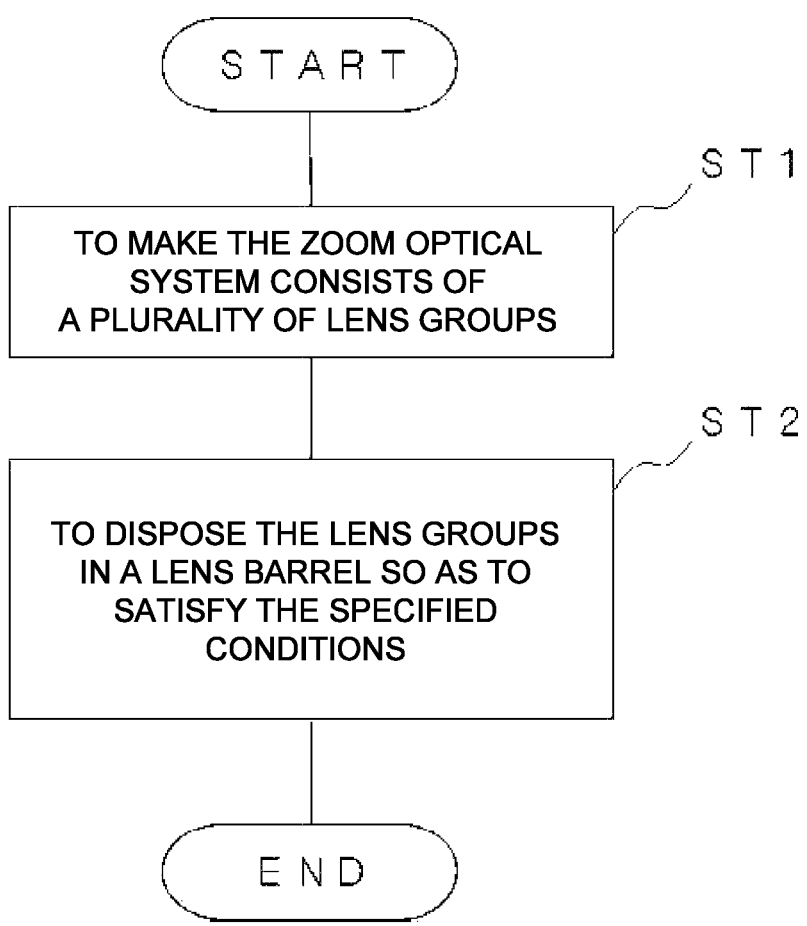

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus and a method for manufacturing the zoom optical system.

TECHNICAL BACKGROUND

Conventionally, zoom optical systems suitable for photographic cameras, electronic still cameras, video cameras and the like have been proposed (for example, see Patent literature 1). The zoom optical systems are required to reduce the weight of a focusing lens group, and suppress variation in aberrations during focusing.

PRIOR ARTS LIST

Patent Document

Patent literature 1: Japanese Laid-Open Patent Publication No. 2013-160944(A)

SUMMARY OF THE INVENTION

The present invention proposes a zoom optical system described below, and an optical apparatus mounted with the zoom optical system. A zoom optical system according to the present invention comprises a plurality of lens groups, wherein distances between adjacent lens groups among the plurality of lens groups change upon zooming. The plurality of lens groups include: a first focusing lens group that moves upon focusing; and a second focusing lens group that is disposed closer to an image surface than the first focusing lens group, and moves on a trajectory different from a trajectory of the first lens group upon focusing. The first focusing lens group and the second focusing lens group each have a negative refractive power. The plurality of lens groups are configured so as to satisfy the following conditional expression.

$$0.40 < fF1/fF2 < 3.50$$

where
fF1: a focal length of the first focusing lens group, and
fF2: a focal length of the second focusing lens group.

BRIEF DESCRIPTION OF THE DRAWINGS

FIG. 1 shows a lens configuration of a zoom optical system according to a first example;

FIGS. 2A, 2B and 2C are graphs respectively showing various aberrations of the zoom optical system according to the first example upon focusing on infinity in the wide-angle end state, the intermediate focal length state and the telephoto end state;

FIGS. 3A, 3B and 3C are graphs respectively showing various aberrations of the zoom optical system according to the first example upon focusing on a short distant object in the wide-angle end state, the intermediate focal length state and the telephoto end state;

FIG. 4 shows a lens configuration of a zoom optical system according to a second example;

FIGS. 5A, 5B and 5C are graphs respectively showing various aberrations of the zoom optical system according to the second example upon focusing on infinity in the wide-angle end state, the intermediate focal length state and the telephoto end state;

FIGS. 6A, 6B and 6C are graphs respectively showing various aberrations of the zoom optical system according to the second example upon focusing on a short distant object in the wide-angle end state, the intermediate focal length state and the telephoto end state;

FIG. 7 shows a lens configuration of a zoom optical system according to a third example;

FIGS. 8A, 8B and 8C are graphs respectively showing various aberrations of the zoom optical system according to the third example upon focusing on infinity in the wide-angle end state, the intermediate focal length state and the telephoto end state;

FIGS. 9A, 9B and 9C are graphs respectively showing various aberrations of the zoom optical system according to the third example upon focusing on a short distant object in the wide-angle end state, the intermediate focal length state and the telephoto end state;

FIGS. 11A, 11B and 11C are graphs respectively showing various aberrations of the zoom optical system according to the fourth example upon focusing on infinity in the wide-angle end state, the intermediate focal length state and the telephoto end state;

FIGS. 12A, 12B and 12C are graphs respectively showing various aberrations of the zoom optical system according to the fourth example upon focusing on a short distant object in the wide-angle end state, the intermediate focal length state and the telephoto end state;

FIGS. 14A, 14B and 14C are graphs respectively showing various aberrations of the zoom optical system according to the fifth example upon focusing on infinity in the wide-angle end state, the intermediate focal length state and the telephoto end state;

FIGS. 15A, 15B and 15C are graphs respectively showing various aberrations of the zoom optical system according to the fifth example upon focusing on a short distant object in the wide-angle end state, the intermediate focal length state and the telephoto end state;

FIG. 17 is a flowchart showing a method for manufacturing the zoom optical system.

DESCRIPTION OF THE EMBODIMENTS

Preferred embodiments for implementing the present invention are hereinafter described.

Figure 16:
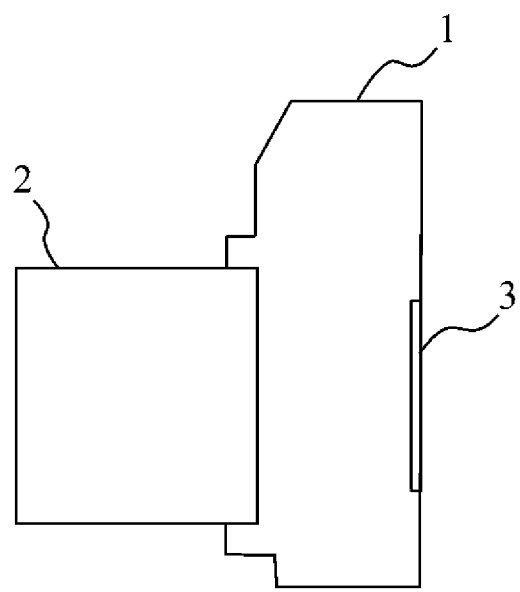
FIG. 16 shows a configuration of a digital camera that is an embodiment of an optical apparatus.

FIG. 16 shows a schematic configuration of a digital camera that is an embodiment of an optical apparatus of the present invention. This camera includes a main body 1 mounted with an image pickup element 3, and a photographic lens 2 equivalent to an embodiment of a zoom optical system of the present invention. Light from an object (photographic subject), not shown, is collected by the photographing lens 2, and reaches an image pickup element 3. Accordingly, the light from the photographic subject is captured by the image pickup element 3, and is recorded as a photographic subject image in a memory, not shown. The details of the photographic lens 2 are hereinafter described as an embodiment of a zoom optical system.

A zoom optical system according to one embodiment of the present invention comprises a plurality of lens groups whose distances between adjacent lens groups change upon zooming. The plurality of lens groups include: a first focusing lens group and a second focusing lens group that respectively move on trajectories different from each other upon focusing. The second focusing lens group is disposed closer to an image surface than the first focusing lens group, and the first focusing lens group and the second focusing lens group each have a negative refractive power. The plurality of lens groups are configured so as to satisfy the following conditional expression (1).

$$0.40 < fF1/fF2 < 3.50 \quad (1)$$

where
fF1: a focal length of the first focusing lens group, and
fF2: a focal length of the second focusing lens group.

The conditional expression (1) described above defines the ratio between the focal length of the first focusing lens group and the focal length of the second focusing lens group. By satisfying the conditional expression (1), the variation in various aberrations including the spherical aberration upon focusing from the infinity object to the short-distant object can be suppressed.

If the corresponding value of the conditional expression (1) exceeds the upper limit value of 3.50, the refractive power of the second focusing lens group becomes strong. Accordingly, it is difficult to suppress the variation in various aberrations including the spherical aberration upon focusing from the infinity object to the short distant object. To secure the advantageous effects of this embodiment, it is preferable to set the upper limit value of the conditional expression (1) to 3.45, 3.40 or 3.35. When the upper limit value of the conditional expression (1) is set to a smaller value, e.g., 3.30, 3.25, 3.20, 3.15, 3.10, or 3.05, the advantageous effects of this embodiment are further secured.

On the other hand, if the corresponding value of the conditional expression (1) falls below the lower limit value of 0.40, the refractive power of the first focusing lens group becomes strong. Accordingly, it is difficult to suppress the variation in various aberrations including the spherical aberration upon focusing from the infinity object to the short distant object. To secure the advantageous effects of this embodiment, it is preferable to set the lower limit value of the conditional expression (1) to 0.45. When the lower limit value of the conditional expression (1) is set to a larger value, e.g., 0.50, 0.55, 0.60, 0.65, 0.70, 0.75, 0.80, 0.85, or 0.88, the advantageous effects of this embodiment are further secured.

The zoom optical system having the configuration described above facilitates favorable aberration correction by changing the distances between the adjacent lens groups upon zooming, and arranges the plurality of focusing lens groups having refractive powers, which can suppress the variation in various aberrations including the spherical aberration upon focusing from the infinity object to the short-distant object, without increasing the sizes of the focusing lens groups.

Preferably, the zoom optical system further satisfies the following conditional expression (2).

$$0.20 < (-fFs)/ft < 2.00 \quad (2)$$

where
fFs: a focal length of either the first focusing lens group or the second focusing lens group which has a stronger refractive power than the other, and
ft: a focal length of the zoom optical system in a telephoto end state.

The conditional expression (2) defines the ratio between the focal length of a focusing lens group having a stronger refractive power between the first focusing lens group and the second focusing lens group and the focal length of the zoom optical system in the telephoto end state. By satisfying the conditional expression (2), the variation in various aberrations including the spherical aberration upon focusing from the infinity object to the short-distant object in the telephoto end state can be suppressed without increasing the size of the lens barrel.

If the corresponding value of the conditional expression (2) exceeds the upper limit value of 2.00, the refractive power of the focusing lens group becomes weak. Accordingly, the amount of movement of the focusing lens group upon focusing from the infinity object to the short distant object becomes large, thereby increasing the size of the lens barrel. To secure the advantageous effects of this embodiment, it is preferable to set the upper limit value of the conditional expression (2) to 1.90. When the upper limit value of the conditional expression (2) is set to a smaller value, e.g., 1.80, 1.65, 1.50, 1.35, 1.25, 1.20, 1.10, or 1.05, the advantageous effects of this embodiment are further secured.

On the other hand, if the corresponding value of the conditional expression (2) falls below the lower limit value of 0.20, the refractive power of the focusing lens group becomes strong. Accordingly, it is difficult to suppress the variation in various aberrations including the spherical aberration upon focusing from the infinity object to the short distant object in the telephoto end state. To secure the advantageous effects of this embodiment, it is preferable to set the lower limit value of the conditional expression (2) to 0.25. When the lower limit value of the conditional expression (2) is set to a larger value, e.g., 0.30, 0.35, 0.40, 0.43, 0.45, 0.48, 0.50, 0.53, or 0.55, the advantageous effects of this embodiment are further secured.

Preferably, the first focusing lens group moves in a direction toward the image surface upon focusing from an infinity object to a short distant object. Accordingly, the variation in various aberrations including the spherical aberration upon focusing from the infinity object to the short-distant object can be effectively suppressed.

Preferably, the second focusing lens group moves in a direction toward the image surface upon focusing from an infinity object to a short distant object. Accordingly, the variation in various aberrations including the spherical aberration upon focusing from the infinity object to the short-distant object can be further effectively suppressed.

Preferably, the zoom optical system further satisfies the following conditional expression (3).

$$1.00 < (-fFs)/fw < 4.00 \quad (3)$$

where
fFs: a focal length of either the first focusing lens group or the second focusing lens group which has a stronger refractive power than the other, and
fw: a focal length of the zoom optical system in a wide angle end state.

The conditional expression (3) defines the ratio between the focal length of a focusing lens group having a stronger refractive power between the first focusing lens group and the second focusing lens group and the focal length of the zoom optical system in the wide angle end state. By satisfying the conditional expression (3), the variation in various aberrations including the spherical aberration upon focusing from the infinity object to the short-distant object in the wide angle end state can be suppressed without increasing the size of the lens barrel.

If the corresponding value of the conditional expression (3) exceeds the upper limit value of 4.00, the refractive power of the focusing lens group becomes weak. Accordingly, the amount of movement of the focusing lens group upon focusing from the infinity object to the short distant object becomes large, thereby increasing the size of the lens barrel. To secure the advantageous effects of this embodiment, it is preferable to set the upper limit value of the conditional expression (3) to 3.90. When the upper limit value of the conditional expression (3) is set to a smaller value, e.g., 3.80, 3.50, 3.30, 3.15, 3.00, 2.80, 2.50, 2.20, or 2.00, the advantageous effects of this embodiment are further secured.

On the other hand, if the corresponding value of the conditional expression (3) falls below the lower limit value of 1.00, the refractive power of the focusing lens group becomes strong. Accordingly, it is difficult to suppress the variation in various aberrations including the spherical aberration upon focusing from the infinity object to the short distant object in the wide angle end state. To secure the advantageous effects of this embodiment, it is preferable to set the lower limit value of the conditional expression (3) to 1.10. When the lower limit value of the conditional expression (3) is set to a larger value, e.g., 1.20, 1.25, 1.30, 1.35, 1.40, 1.45, 1.50, 1.55, or 1.60, the advantageous effects of this embodiment are further secured.

Preferably, the zoom optical system further satisfies the following conditional expression (4).

$$0.10 < MWF1/MWF2 < 3.00 \tag{4}$$

where

MWF1: an absolute value of an amount of movement of the first focusing lens group upon focusing from an infinity object to a short distant object in a wide angle end state, and MWF2: an absolute value of an amount of movement of the second focusing lens group upon focusing from the infinity object to the short distant object in the wide angle end state.

The conditional expression (4) defines the ratio between the absolute value of the amount of movement of the first focusing lens group upon focusing from the infinity object to the short-distant object in the wide angle end state, and the absolute value of the amount of movement of the second focusing lens group upon focusing from the infinity object to the short-distant object in the wide angle end state. By satisfying the conditional expression (4), the variation in various aberrations including the spherical aberration upon focusing from the infinity object to the short-distant object in the wide angle end state can be suppressed.

If the corresponding value of the conditional expression (4) exceeds the upper limit value of 3.00, the amount of movement of the first focusing lens group becomes too large. Accordingly, it is difficult to suppress the variation in various aberrations including the spherical aberration upon focusing from the infinity object to the short distant object in the wide angle end state. To secure the advantageous effects of this embodiment, it is preferable to set the upper limit value of the conditional expression (4) to 2.50. When the upper limit value of the conditional expression (4) is set to a smaller value, e.g., 2.00, 1.75, 1.50, 1.30, 1.15, 1.00, 0.85, 0.80, or 0.75, the advantageous effects of this embodiment are further secured.

On the other hand, if the corresponding value of the conditional expression (4) falls below the lower limit value of 0.10, the amount of movement of the second focusing lens group becomes too large. Accordingly, it is difficult to suppress the variation in various aberrations including the spherical aberration upon focusing from the infinity object to the short distant object in the wide angle end state. To secure the advantageous effects of this embodiment, it is preferable to set the lower limit value of the conditional expression (4) to 0.13, 0.15, 0.18, 0.20, 0.21, or 0.23. When the lower limit value of the conditional expression (4) is set to a larger value, e.g., 0.25, 0.30, 0.35, or 0.38, the advantageous effects of this embodiment are further secured.

Preferably, the zoom optical system further satisfies the following conditional expression (5).

$$0.20 < \beta WF1/\beta WF2 < 5.00 \tag{5}$$

where $\beta WF1$: a lateral magnification of the first focusing lens group upon focusing on an infinity object in a wide angle end state, and $\beta WF2$: a lateral magnification of the second focusing lens group upon focusing on the infinity object in the wide angle end state.

The conditional expression (5) defines the ratio between the lateral magnification of the first focusing lens group upon focusing on the infinity object in the wide angle end state, and the lateral magnification of the second focusing lens group upon focusing on the infinity object in the wide angle end state. By satisfying the conditional expression (5), the variation in various aberrations including the spherical aberration upon focusing from the infinity object to the short-distant object in the wide angle end state can be suppressed.

If the corresponding value of the conditional expression (5) exceeds the upper limit value of 5.00, the lateral magnification of the first focusing lens group upon focusing on the infinity object in the wide angle end state becomes too large. Accordingly, it is difficult to suppress the variation in various aberrations including the spherical aberration upon focusing from the infinity object to the short distant object in the wide angle end state. To secure the advantageous effects of this embodiment, it is preferable to set the upper limit value of the conditional expression (5) to 4.80. When the upper limit value of the conditional expression (5) is set to a smaller value, e.g., 4.60, 4.00, 3.50, 3.30, 3.00, 2.50, 2.00, 1.50, or 1.25, the advantageous effects of this embodiment are further secured.

On the other hand, if the corresponding value of the conditional expression (5) falls below the lower limit value of 0.20, the lateral magnification of the second focusing lens group upon focusing on the infinity object in the wide angle end state becomes too large. Accordingly, it is difficult to suppress the variation in various aberrations including the spherical aberration upon focusing from the infinity object to the short distant object in the wide angle end state. To secure the advantageous effects of this embodiment, it is preferable to set the lower limit value of the conditional expression (5) to 0.30 or 0.35. When the lower limit value of the conditional expression (5) is set to a larger value, e.g., 0.40, 0.45, 0.50, 0.55, 0.60, 0.65, 0.70, or 0.75, the advantageous effects of this embodiment are further secured.

Preferably, the plurality of lens groups include a succeeding lens group disposed closer to the image surface than the second focusing lens group, and the succeeding lens group consists of at least one lens group. Accordingly, the variation in various aberrations including the spherical aberration upon focusing from the infinity object to the short-distant object can be effectively suppressed.

Preferably, the zoom optical system further satisfies the following conditional expression (6).

$$-2.00<(-fFs)/fR<2.00 \tag{6}$$

where fFs: a focal length of either the first focusing lens group or the second focusing lens group which has a stronger refractive power than the other, and fR: a focal length of the succeeding lens group.

The conditional expression (6) defines the ratio between the focal length of a focusing lens group having a stronger refractive power between the first focusing lens group and the second focusing lens group, and the focal length of the succeeding lens group. By satisfying the conditional expression (6), the variation in various aberrations including the spherical aberration upon focusing from the infinity object to the short-distant object can be suppressed.

If the corresponding value of the conditional expression (6) exceeds the upper limit value of 2.00, the positive refractive power of the succeeding lens group becomes strong. Accordingly, it is difficult to suppress the variation in various aberrations including the spherical aberration upon focusing from the infinity object to the short distant object. To secure the advantageous effects of this embodiment, it is preferable to set the upper limit value of the conditional expression (6) to 1.90. When the upper limit value of the conditional expression (6) is set to a smaller value, e.g., 1.80, 1.65, 1.50, 1.35, 1.20, 1.10, 1.10, 0.90, or 0.80, the advantageous effects of this embodiment are further secured.

On the other hand, if the corresponding value of the conditional expression (6) falls below the lower limit value of −2.00, the negative refractive power of the succeeding lens group becomes strong. Accordingly, it is difficult to suppress the variation in various aberrations including the spherical aberration upon focusing from the infinity object to the short distant object. To secure the advantageous effects of this embodiment, it is preferable to set the lower limit value of the conditional expression (6) to −1.90. When the lower limit value of the conditional expression (6) is set to a larger value, e.g., −1.80, −1.65, −1.50, −1.25, −1.00, −0.75, −0.50, −0.25, or −0.10, the advantageous effects of this embodiment are further secured.

Preferably, the plurality of lens groups include a preceding lens group disposed closer to an object than the first focusing lens group, and the preceding lens group consists of at least one lens group. Accordingly, the variation in various aberrations including the spherical aberration upon zooming from the wide-angle end state to the telephoto end state can be effectively suppressed.

Preferably, the zoom optical system further satisfies the following conditional expression (7).

$$0.30<(-fFs)/fF<3.00 \tag{7}$$

where fFs: a focal length of either the first focusing lens group or the second focusing lens group which has a stronger refractive power than the other, and fF: a focal length of a lens group adjacent to the first focusing lens group in the preceding lens group.

The conditional expression (7) defines the ratio between the focal length of a focusing lens group having a stronger refractive power between the first focusing lens group and the second focusing lens group, and the focal length of the preceding lens group. By satisfying the conditional expression (7), the variation in various aberrations including the spherical aberration upon zooming from the wide-angle end state to the telephoto end state can be suppressed without increasing the size of the lens barrel.

If the corresponding value of the conditional expression (7) exceeds the upper limit value of 3.00, the refractive power of the preceding lens group becomes strong. Accordingly, it is difficult to suppress the variation in various aberrations including the spherical aberration upon zooming from the wide-angle end state to the telephoto end state. To secure the advantageous effects of this embodiment, it is preferable to set the upper limit value of the conditional expression (7) to 2.90. When the upper limit value of the conditional expression (7) is set to a smaller value, e.g., 2.80, 2.65, 2.50, 2.30, 2.15, 2.00, 1.90, 1.85, or 1.80, the advantageous effects of this embodiment are further secured.

On the other hand, if the corresponding value of the conditional expression (7) falls below the lower limit value of 0.30, the refractive power of the preceding lens group becomes weak. Accordingly, the amount of movement of the preceding lens group upon zooming from the wide-angle end state to the telephoto end state becomes large, thereby increasing the size of the lens barrel. To secure the advantageous effects of this embodiment, it is preferable to set the lower limit value of the conditional expression (7) to 0.40. When the lower limit value of the conditional expression (7) is set to a larger value, e.g., 0.50, 0.70, 0.85, 1.00, 1.10, 1.15, 1.20, 1.25, or 1.30, the advantageous effects of this embodiment are further secured.

Preferably, the preceding lens groups include a first lens group that has a positive refractive power and is disposed closest to an object. Accordingly, the variation in various aberrations including the spherical aberration upon zooming from the wide-angle end state to the telephoto end state can be effectively suppressed.

Preferably, the preceding lens group includes a second lens group that has a negative refractive power and is disposed adjacent to the first lens group. Accordingly, the variation in various aberrations including the spherical aberration upon zooming from the wide-angle end state to the telephoto end state can be effectively suppressed.

Preferably, the zoom optical system further satisfies the following conditional expression (8).

$$4.00<f1/(-f2)<8.00 \tag{8}$$

where f1: a focal length of the first lens group, and f2: a focal length of the second lens group.

The conditional expression (8) defines the ratio between the focal length of the first lens group and the focal length of the second lens group. By satisfying the conditional expression (8), the variation in various aberrations including the spherical aberration upon zooming from the wide-angle end state to the telephoto end state can be suppressed.

If the corresponding value of the conditional expression (8) exceeds the upper limit value of 8.00, the refractive power of the second lens group becomes strong. Accordingly, it is difficult to suppress the variation in various aberrations including the spherical aberration upon zooming from the wide-angle end state to the telephoto end state. To secure the advantageous effects of this embodiment, it is preferable to set the upper limit value of the conditional expression (8) to 7.80. When the upper limit value of the conditional expression (8) is set to a smaller value, e.g., 7.50, 7.25, 7.00, 6.75, 6.50, 6.30, 6.20, 6.10, or 6.00, the advantageous effects of this embodiment are further secured.

On the other hand, if the corresponding value of the conditional expression (8) falls below the lower limit value of 4.00, the refractive power of the first lens group becomes strong. Accordingly, it is difficult to suppress the variation in various aberrations including the spherical aberration upon zooming from the wide-angle end state to the telephoto end state. To secure the advantageous effects of this embodiment, it is preferable to set the lower limit value of the conditional expression (8) to 4.20. When the lower limit value of the conditional expression (8) is set to a larger value, e.g., 4.50, 4.70, 4.85, 5.00, 5.20, 5.40, 5.50, 5.60, or 5.70, the advantageous effects of this embodiment are further secured.

The zoom optical system has the configuration described above, which can favorably suppress the aberration fluctuation upon zooming from a wide angle end state to a telephoto end state, while satisfying the following conditional expression (9).

$$2\omega w > 75.0° \quad (9)$$

where $\omega w$: a half angle of view of the zoom optical system in a wide angle end state.

According to the configuration described above, by narrowing down the range of the corresponding value of each conditional expression, the lower limit value of the conditional expression (9) can be set to a larger value, e.g., 77.0°, 80.0°, 82.0° or 83.5°.

Preferably, the zoom optical system further satisfies the following conditional expression (10).

$$0.10 < BFw/fw < 1.00 \quad (10)$$

where

BFw: an air equivalent distance (back focus) of the zoom optical system in a wide-angle end state, and fw: a focal length of the zoom optical system in a wide angle end state.

The conditional expression (10) defines the ratio between the back focus of the zoom optical system in the wide-angle end state, and the focal length of the zoom optical system in the wide-angle end state. By satisfying the conditional expression (10), the various aberrations including the coma aberration in the wide-angle end state can be effectively corrected.

If the corresponding value of the conditional expression (10) exceeds the upper limit value of 1.00, the back focus in the wide angle end state becomes large with respect to the focal length in the wide-angle end state. Accordingly, it is difficult to correct the various aberrations including the coma aberration in the wide-angle end state. To secure the advantageous effects of this embodiment, it is preferable to set the upper limit value of the conditional expression (10) to 0.90 or 0.85. When the upper limit value of the conditional expression (10) is set to a smaller value, e.g., 0.80, 0.75, 0.70, 0.65, 0.60, or 0.55, the advantageous effects of this embodiment are further secured.

On the other hand, if the corresponding value of the conditional expression (10) falls below the lower limit value of 0.10, the back focus in the wide angle end state becomes small with respect to the focal length in the wide-angle end state. Accordingly, it is difficult to correct the various aberrations including the coma aberration in the wide-angle end state. To secure the advantageous effects of this embodiment, it is preferable to set the lower limit value of the conditional expression (10) to 0.15, 0.20, or 0.25. When the lower limit value of the conditional expression (10) is set to a larger value, e.g., 0.30, 0.35, 0.38, 0.40, 0.42, or 0.45, the advantageous effects of this embodiment are further secured.

Preferably, the second focusing lens group has a lens component having a negative refractive power, and the lens component satisfies the following conditional expression (11). Here, "lens component" is used as a term that means each of a single lens and a cemented lens.

$$-2.00 < (r2+r1)/(r2-r1) < 6.00 \quad (11)$$

Where r1: a radius of curvature of a lens surface of the lens component on an object side, and r2: a radius of curvature of a lens surface of the lens component on an image side.

The conditional expression (11) defines the shape factor of the lens having a negative refractive power in the second focusing lens group. By satisfying the conditional expression (11), the variation in various aberrations including the coma aberration upon focusing from the infinity object to the short-distant object can be suppressed.

If the corresponding value of the conditional expression (11) exceeds the upper limit value of 6.00, the power for correcting the coma aberration of the second focusing lens group is insufficient. Accordingly, it is difficult to suppress the variation in various aberrations including the coma aberration upon focusing from the infinity object to the short distant object. To secure the advantageous effects of this embodiment, it is preferable to set the upper limit value of the conditional expression (11) to 5.50. When the upper limit value of the conditional expression (11) is set to a smaller value, e.g., 5.00, 4.75, 4.50, 4.25, 4.00, 3.70, 3.50, or 3.20, the advantageous effects of this embodiment are further secured.

On the other hand, if the corresponding value of the conditional expression (11) falls below the lower limit value of −2.00, the power for correcting the coma aberration of the second focusing lens group is insufficient. Accordingly, it is difficult to suppress the variation in various aberrations including the coma aberration upon focusing from the infinity object to the short distant object. To secure the advantageous effects of this embodiment, it is preferable to set the lower limit value of the conditional expression (11) to −1.50. When the lower limit value of the conditional expression (11) is set to a larger value, e.g., −1.00, −0.50, −0.10, −0.05, 0.05, 0.08, 0.12, 0.40, or 0.55, the advantageous effects of this embodiment are further secured.

Preferably, the zoom optical system further satisfies the following conditional expression (12).

$$1.05 < \beta WF1 < 1.80 \quad (12)$$

where $\beta WF1$: a lateral magnification of the first focusing lens group upon focusing on an infinity object in a wide angle end state.

The conditional expression (12) defines the lateral magnification of the first focusing lens group upon focusing on the infinity object in the wide angle end state. By satisfying the conditional expression (12), the variation in various aberrations including the spherical aberration upon focusing from the infinity object to the short-distant object in the wide angle end state can be suppressed.

If the corresponding value of the conditional expression (12) exceeds the upper limit value of 1.80, the lateral magnification of the first focusing lens group upon focusing on the infinity object in the wide angle end state becomes too large. Accordingly, it is difficult to suppress the variation in various aberrations including the spherical aberration upon focusing from the infinity object to the short distant object in the wide angle end state. To secure the advantageous effects of this embodiment, it is preferable to set the upper limit value of the conditional expression (12) to 1.75. When the upper limit value of the conditional expression (12) is set to a smaller value, e.g., 1.70, 1.65, 1.60, 1.58, 1.55, 1.53, 1.50 or 1.49, or further to 1.48, the advantageous effects of this embodiment are further secured.

If the corresponding value of the conditional expression (12) falls below the lower limit value of 1.05, the lateral magnification of the first focusing lens group upon focusing on the infinity object in the wide angle end state becomes too small. Accordingly, it is difficult to suppress the variation in the distortion and the coma aberration including the spherical aberration upon focusing from the infinity object to the short distant object in the wide angle end state. To secure the advantageous effects of this embodiment, it is preferable to set the lower limit value of the conditional expression (12) to 1.06. When the lower limit value of the conditional expression (12) is set to 1.08, 1.10, 1.12, 1.15, 1.16, 1.20 or 1.22, or further to 1.25, the advantageous effects of this embodiment are further secured.

Preferably, the zoom optical system further satisfies the following conditional expression (13).

$$1.05 < \beta WF2 < 1.80 \tag{13}$$

where $\beta WF2$: a lateral magnification of the second focusing lens group upon focusing on an infinity object in a wide angle end state.

The conditional expression (13) defines the lateral magnification of the second focusing lens group upon focusing on the infinity object in the wide angle end state. By satisfying the conditional expression (13), the variation in various aberrations including the spherical aberration upon focusing from the infinity object to the short-distant object in the wide angle end state can be suppressed.

If the corresponding value of the conditional expression (13) exceeds the upper limit value of 1.80, the lateral magnification of the second focusing lens group upon focusing on the infinity object in the wide angle end state becomes too large. Accordingly, it is difficult to suppress the variation in various aberrations including the spherical aberration upon focusing from the infinity object to the short distant object in the wide angle end state. To secure the advantageous effects of this embodiment, it is preferable to set the upper limit value of the conditional expression (13) to 1.75. When the upper limit value of the conditional expression (13) is set to 1.70, 1.68, 1.65, 1.63, 1.60, 1.58 or 1.55, or further to 1.54, the advantageous effects of this embodiment are further secured.

If the corresponding value of the conditional expression (13) falls below the lower limit value of 1.05, the lateral magnification of the second focusing lens group upon focusing on the infinity object in the wide angle end state becomes too small. Accordingly, it is difficult to suppress the variation in the distortion and the coma aberration including the spherical aberration upon focusing from the infinity object to the short distant object in the wide angle end state. To secure the advantageous effects of this embodiment, it is preferable to set the lower limit value of the conditional expression (13) to 1.08. When the lower limit value of the conditional expression (13) is set to 1.10, 1.13, 1.15, 1.18, 1.20, 1.23, 1.24 or 1.28, or further to 1.30, the advantageous effects of this embodiment are further secured.

Preferably, the zoom optical system further satisfies the following conditional expression (14).

$$(\beta WF1 + 1/\beta WF1)^{-2} < 0.250 \tag{14}$$

where $\beta WF1$: a lateral magnification of the first focusing lens group upon focusing on an infinity object in a wide angle end state.

The conditional expression (14) defines the condition that the lateral magnification of the first focusing lens group upon focusing on the infinity object in the wide angle end state satisfies. By satisfying the conditional expression (14), the variation in various aberrations including the spherical aberration, the distortion and the coma aberration upon focusing from the infinity object to the short-distant object in the wide angle end state can be suppressed, while the amount of movement of the first focusing lens group can be reduced.

If the corresponding value of the conditional expression (14) exceeds the upper limit value of 0.250, the amount of movement of the first focusing lens group upon focusing on the infinity object in the wide angle end state becomes too large, which is not preferable. To secure the advantageous effects of this embodiment, it is preferable to set the upper limit value of the conditional expression (14) to 0.249. When the upper limit value of the conditional expression (14) is set to 0.248, 0.247 or 0.246, or further to 0.245, the advantageous effects of this embodiment are further secured.

Preferably, the zoom optical system further satisfies the following conditional expression (15).

$$(\beta WF2 + 1/\beta WF2)^{-2} < 0.250 \tag{15}$$

where $\beta WF2$: a lateral magnification of the second focusing lens group upon focusing on an infinity object in a wide angle end state.

The conditional expression (15) defines the lateral magnification of the second focusing lens group upon focusing on the infinity object in the wide angle end state. By satisfying the conditional expression (15), the variation in various aberrations including the spherical aberration, the distortion and the coma aberration upon focusing from the infinity object to the short-distant object in the wide angle end state can be suppressed, while the amount of movement of the second focusing lens group can be reduced.

If the corresponding value of the conditional expression (15) exceeds the upper limit value of 0.249, the amount of movement of the second focusing lens group upon focusing on the infinity object in the wide angle end state becomes too large, which is not preferable. To secure the advantageous effects of this embodiment, it is preferable to set the upper limit value of the conditional expression (15) to 0.248. When the upper limit value of the conditional expression (15) is set to 0.245, 0.240, 0.238, 0.235, 0.233, 0.230 or 0.228, or further to 0.225, the advantageous effects of this embodiment are further secured.

The aforementioned optical apparatus is mounted with the zoom optical system described above, which can achieve high-speed and silent auto focusing without increasing the size of the lens barrel, and favorably suppress the aberration fluctuation upon zooming from the wide angle end state to the telephoto end state, and the aberration fluctuation upon focusing from the infinity object to the short distant object.

Subsequently, referring to FIG. 17, a method for manufacturing the zoom optical system described above is schematically described. The zoom optical system consists of a plurality of lens groups (ST1), and is manufactured by disposing the configured lens groups in a lens barrel, under the following condition (ST2). The plurality of lens groups are disposed such that distances between adjacent lens groups among the plurality of lens groups change upon zooming. The plurality of lens groups herein disposed includes: a first focusing lens group that moves upon focusing; and a second focusing lens group that is disposed closer to an image surface than the first focusing lens group, and moves on a trajectory different from a trajectory of the first focusing lens group upon focusing. The first focusing lens group and the second focusing lens group each have a negative refractive power. The plurality of lens groups including two focusing lens groups are configured so as to satisfy the aforementioned conditional expression (1).

The zoom optical system manufactured by the procedures described above and the optical apparatus mounted with the zoom optical system can achieve high-speed and silent auto focusing without increasing the size of the lens barrel, and favorably suppress the aberration fluctuation upon zooming from the wide angle end state to the telephoto end state, and the aberration fluctuation upon focusing from the infinity object to the short distant object.

EXAMPLES

The aforementioned zoom optical system is further described exemplifying five numerical examples from a first example to a fifth example. First, the way of reading the diagrams and tables to be referred to by descriptions of the examples is described.

FIGS. 1, 4, 7, 10 and 13 show the lens configurations and operations of zoom optical systems in the respective examples. At the center of each diagram, the arrangement of lens groups are shown in a sectional view. At the lower part of each diagram, the movement trajectories of lens groups G and an aperture stop S along the optical axis upon zooming from a wide angle end state (W) to a telephoto end state (T) are indicated by arrows on a two-dimensional plane. The horizontal axis of the two-dimensional plane indicates the position on the optical axis, and the vertical axis indicates the state of the zoom optical system. At the upper part of each diagram, the movement trajectories (movement directions and amounts of movement) of the focusing lens group upon focusing from the infinity to the short distant object are indicated by arrows with characters of "FOCUSING" and "∞".

In FIGS. 1, 4, 7, 10 and 13, each lens group is represented by a combination of a symbol G and a numeral, and each lens is represented by a combination of a symbol L and a numeral. In this Specification, to prevent complication due to increase in the number of symbols, numbering is made on an example-by-example basis. Accordingly, among multiple examples, the combinations of the same symbols and numerals are sometimes used. However, this does not mean that the configurations indicated by these combinations of the symbols and numerals are the same.

FIGS. 2A-2C, 5A-5C, 8A-8C, 11A-11C and 14A-14C are various aberration graphs of the zoom optical systems in the respective examples upon focusing on infinity. FIGS. 3A-3C, 6A-6C, 9A-9C, 12A-12C and 15A-15C are various aberration graphs of the zoom optical systems in the respective examples upon focusing on a short distant object. In these graphs, FNO indicates the F-number, NA indicates the numerical aperture, and Y indicates the image height. The spherical aberration graph indicates the value of the F-number or the numerical aperture corresponding to the maximum diameter. The astigmatism graph and the distortion graph each indicate the maximum value of the image height. The coma aberration graph indicates the value of each image height. The symbol d indicates d-line ($\lambda$=587.6 nm). The symbol g indicates g-line ($\lambda$=435.8 nm). In the astigmatism graph, a solid line indicates a sagittal image surface, and a broken line indicates a meridional image surface. The graph of the chromatic aberration of magnification shows the chromatic aberration of magnification with reference to g-line.

Subsequently, tables used for the respective examples are described. In the table of [General Data], f indicates the focal length of the entire lens system, FNO indicates the F-number, $2\omega$ indicates the angle of view (the unit is ° (degrees), and $\omega$ is the half angle of view), and Ymax indicates the maximum image height. TL indicates a distance obtained by adding BF to the distance from the lens foremost surface to the lens last surface on the optical axis upon focusing on infinity. BF indicates the air equivalent distance (back focus) from the lens last surface to the image surface I on the optical axis upon focusing on infinity. Note that these values are indicated for each of zoom states at the wide-angle end (W), the intermediate focal length (M) and the telephoto end (T).

In the table of [General Data], MWF1 indicates the absolute value of the amount of movement of the first focusing lens group upon focusing from an infinity object to a short-distant object (shortest-distant object) in the wide angle end state. MWF2 indicates the absolute value of the amount of movement of the second focusing lens group upon focusing from the infinity object to the short-distant object (shortest-distant object) in the wide angle end state. $\beta$WF1 indicates the lateral magnification of the first focusing lens group in the case of focusing on the infinity object in the wide angle end state. $\beta$WF2 indicates the lateral magnification of the second focusing lens group in the case of focusing on the infinity object in the wide angle end state.

In the table of [Lens Data], Surface Number indicates the order of the optical surface from the object side along the direction in which the ray travels, R indicates the radius of curvature (the surface whose center of curvature resides on the image side is regarded to have a positive value) of each optical surface, D indicates the surface distance, which is the distance to the next optical surface (or the image surface) from each optical surface on the optical axis, nd is the refractive index of the material of the optical member for d-line, and vd indicates the Abbe number of the material of the optical member with respect to d-line. (Aperture Stop S) indicates an aperture stop. The radius of curvature "∞" indicates a plane or an aperture. The description of the air refractive index nd=1.00000 is omitted. In a case where the lens surface is an aspherical surface, the surface number is assigned * symbol, and the field of the radius of curvature R indicates the paraxial radius of curvature.

In the table of [Aspherical Surface Data], the shape of the aspherical surface indicated in [Lens Data] is indicated by the following expression (A). X(y) indicates the distance (sag amount) from the tangent plane at the vertex of the aspherical surface to the position on the aspherical surface at the height y along the optical axis direction. R indicates the radius of curvature (paraxial radius of curvature) of the reference spherical surface. K indicates the conic constant. Ai indicates the i-th aspherical coefficient. "E-n" indicates "x10$^{-n}$". For example, 1.234E−05=1.234×10$^{-5}$. Note that the second-order aspherical coefficient A2 is zero, and its description is omitted.

$$X(y)=(y^2/R)/\{1+(1-\kappa xy^2/R^2)^{1/2}\}+A4xy^4+A6xy^6+A8xy^8+A10xy^{10}+A12xy^{12} \quad (A)$$

The table of [Lens Group Data] shows the first surface (the surface closest to the object) and the focal length of each lens group.

The table of [Variable Distance Data] shows the surface distances at surface numbers where the surface distance is "Variable" in the table showing [Lens Data]. Here, surface distances in the zoom states at the wide-angle end (W), the intermediate focal length (M) and the telephoto end (T) upon the infinity focus and the short range focus are indicated.

The table of [Conditional Expression Corresponding Value] shows the value corresponding to each conditional expression.

In general, "mm" is used as units for the focal length f, radius of curvature R, surface distance D, and other lengths. Accordingly, also in each table in this Specification, the unit for length is "mm". Note that the optical system can achieve equivalent optical performances even when proportionally enlarged or proportionally reduced. Accordingly, the unit for lengths is not necessarily limited to "mm".

The descriptions of the diagrams and tables so far are common to all the examples. Redundant descriptions are hereinafter omitted.

First Example

A first example is described with reference to FIGS. 1, 2A-2C and 3A-3C and Table 1. FIG. 1 is a lens configuration diagram of a zoom optical system according to the first example. The zoom optical system ZL(1) according to the first example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 (first focusing lens group) having a negative refractive power; a sixth lens group G6 (second focusing lens group) having a negative refractive power; and a seventh lens group G7 having a positive refractive power. Here, the first to fourth lens groups G1 to G4 correspond to a preceding lens group GF, and the seventh lens group G7 corresponds to a succeeding lens group GR. The image surface I is disposed subsequent to the seventh lens group G7.

Upon zooming from the wide angle end state (W) to the telephoto end state (T), the first to seventh lens groups G1 to G7 move along the trajectories indicated by the arrows in the lower part of FIG. 1, which changes the distances between adjacent lens groups, and achieves zooming. Upon focusing, the fifth lens group G5 and the sixth lens group G6 independently move in the directions (image surface direction) indicated by arrows in the upper part of FIG. 1 (along different trajectories), thus achieving focusing from the infinity object to the short distant object.

The first lens group G1 consists of, in order from the object: a negative cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a positive meniscus lens L23 having a convex surface facing the object; and a negative meniscus lens L24 having a concave surface facing the object. The negative meniscus lens L21 has an object-side surface that is an aspherical surface.

The third lens group G3 consists of, in order from the object: a biconvex positive lens L31; and a negative cemented lens that includes a biconvex positive lens L32, and a biconcave negative lens L33.

The fourth lens group G4 consists of, in order from the object: a biconvex positive lens L41; a negative cemented lens that includes a biconcave negative lens L42, and a biconvex positive lens L43; and a biconvex positive lens L44. The positive lens L41 has an object-side surface that is an aspherical surface. The positive lens L44 has an image-side surface that is an aspherical surface.

The fifth lens group G5 consists of, in order from the object: a biconvex positive lens L51; and a biconcave negative lens L52.

The sixth lens group G6 consists of a biconcave negative lens L61. The negative lens L61 has an object-side surface that is an aspherical surface.

The seventh lens group G7 consists of a biconvex positive lens L71.

The following Table 1 lists values of data on the zoom optical system according to the first example.

TABLE 1

| [General Data] | | | |
|---|---|---|---|
| Zooming ratio = 2.74 | | | |
| MWF1 = 0.255 | | | |
| MWF2 = 0.618 | | | |
| βWF1 = 1.418 | | | |
| βWF2 = 1.530 | | | |

| | W | M | T |
|---|---|---|---|
| f | 24.8 | 50.0 | 67.9 |
| FNO | 2.92 | 2.92 | 2.92 |
| 2ω | 85.14 | 45.20 | 34.12 |
| Ymax | 21.60 | 21.60 | 21.60 |
| TL | 135.45 | 153.76 | 169.45 |
| BF | 13.08 | 25.53 | 33.89 |

| [Lens Data] | | | | |
|---|---|---|---|---|
| Surface Number | R | D | nd | νd |
| Object Surface | ∞ | | | |
| 1 | 11820.3050 | 2.500 | 1.84666 | 23.80 |
| 2 | 254.8436 | 3.832 | 1.59319 | 67.90 |
| 3 | 1938.9860 | 0.200 | | |
| 4 | 81.3609 | 6.634 | 1.81600 | 46.59 |
| 5 | 717.8392 | D5(Variable) | | |
| 6* | 170.2224 | 2.000 | 1.67798 | 54.89 |
| 7 | 19.0228 | 8.030 | | |
| 8 | −102.7918 | 1.200 | 1.59319 | 67.90 |
| 9 | 39.9274 | 0.200 | | |
| 10 | 30.7705 | 3.844 | 1.85000 | 27.03 |
| 11 | 120.7450 | 4.556 | | |
| 12 | −26.6990 | 1.200 | 1.60300 | 65.44 |
| 13 | −48.1940 | D13(Variable) | | |
| 14(Aperture Stop S) | ∞ | 1.500 | | |
| 15 | 51.8883 | 3.971 | 1.90265 | 35.73 |
| 16 | −335.1012 | 0.200 | | |
| 17 | 34.2757 | 7.394 | 1.49782 | 82.57 |
| 18 | −32.4829 | 1.300 | 1.81600 | 46.59 |
| 19 | 124.5969 | D19(Variable) | | |
| 20* | 73.3752 | 4.605 | 1.82098 | 42.50 |
| 21 | −40.9497 | 0.222 | | |
| 22 | −60.6253 | 1.200 | 1.85478 | 24.80 |
| 23 | 23.2350 | 6.747 | 1.49782 | 82.57 |
| 24 | −68.9735 | 0.930 | | |
| 25 | 51.1526 | 5.532 | 1.80604 | 40.74 |
| 26* | −59.8674 | D26(Variable) | | |
| 27 | 364.3227 | 3.545 | 1.94595 | 17.98 |

TABLE 1-continued

| | | | | |
|---|---|---|---|---|
| 28 | −58.9057 | 0.200 | | |
| 29 | −87.4737 | 1.200 | 1.77250 | 49.62 |
| 30 | 26.6831 | D30(Variable) | | |
| 31* | −54.3769 | 1.300 | 1.95150 | 29.83 |
| 32 | 226.2913 | D32(Variable) | | |
| 33 | 84.9939 | 5.357 | 1.83481 | 42.73 |
| 34 | −133.1562 | BF | | |
| Image Surface | ∞ | | | |

[Aspherical Surface Data]

6th Surface

K = 1.0000
A4 = 2.79734E−06, A6 = −1.48626E−09, A8 = 2.33651E−12,
A10 = −3.91747E−17

20th Surface

K = 1.0000
A4 = −1.24053E−05, A6 = 2.41375E−10, A8 = 1.23614E−11,
A10 = −2.66251E−14

26th Surface

K = 1.0000
A4 = 1.94712E−06, A6 = −7.52657E−09, A8 = −2.53945E−12,
A10 = 9.10643E−15

31st Surface

K = 1.0000
A4 = −5.72467E−06, A6 = −2.85790E−08, A8 = 9.21679E−11,
A10 = −4.86764E−13

[Lens Group Data]

| Group | First surface | Focal length |
|---|---|---|
| 1 | 1 | 129.519 |
| 2 | 6 | −21.862 |
| 3 | 14 | 47.382 |
| 4 | 20 | 28.141 |
| 5 | 27 | −53.501 |
| 6 | 31 | −45.973 |
| 7 | 33 | 62.847 |

[Variable Distance Data]

| | W Infinity | M Infinity | T Infinity | W Short-distance | M Short-distance | T Short-distance |
|---|---|---|---|---|---|---|
| D5 | 2.000 | 20.511 | 30.687 | 2.000 | 20.511 | 30.687 |
| D13 | 18.977 | 5.779 | 2.000 | 18.977 | 5.779 | 2.000 |
| D19 | 9.078 | 3.248 | 2.000 | 9.078 | 3.248 | 2.000 |
| D26 | 2.614 | 2.197 | 2.001 | 2.869 | 2.555 | 2.431 |
| D30 | 7.108 | 7.282 | 6.363 | 7.472 | 7.442 | 6.438 |
| D32 | 3.198 | 9.812 | 13.117 | 2.579 | 9.294 | 12.612 |

[Conditional Expression Corresponding Value]

Conditional Expression (1) fF1/−fF2 = 1.164
Conditional Expression (2) (−fFs)/ft = 0.677
Conditional Expression (3) (−fFs)/fw = 1.857
Conditional Expression (4) MWF1/MWF2 = 0.412
Conditional Expression (5) βWF1/βWF2 = 0.927
Conditional Expression (6) (−fFs)/fR = 0.732
Conditional Expression (7) (−fFs)/fF = 1.634
Conditional Expression (8) f1/(−f2) = 5.924
Conditional Expression (9) 2ωw = 85.14
Conditional Expression (10) BFw/fw = 0.529
Conditional Expression (11) (r2 + r1)/(r2 − r1) = 0.613
Conditional Expression (12) βWF1 = 1.418
Conditional Expression (13) βWF2 = 1.530
Conditional Expression (14) (βWF1 + 1/βWF1)$^{-2}$ = 0.2218
Conditional Expression (15) (βWF2 + 1/βWF2)$^{-2}$ = 0.2097

Figure 2A:
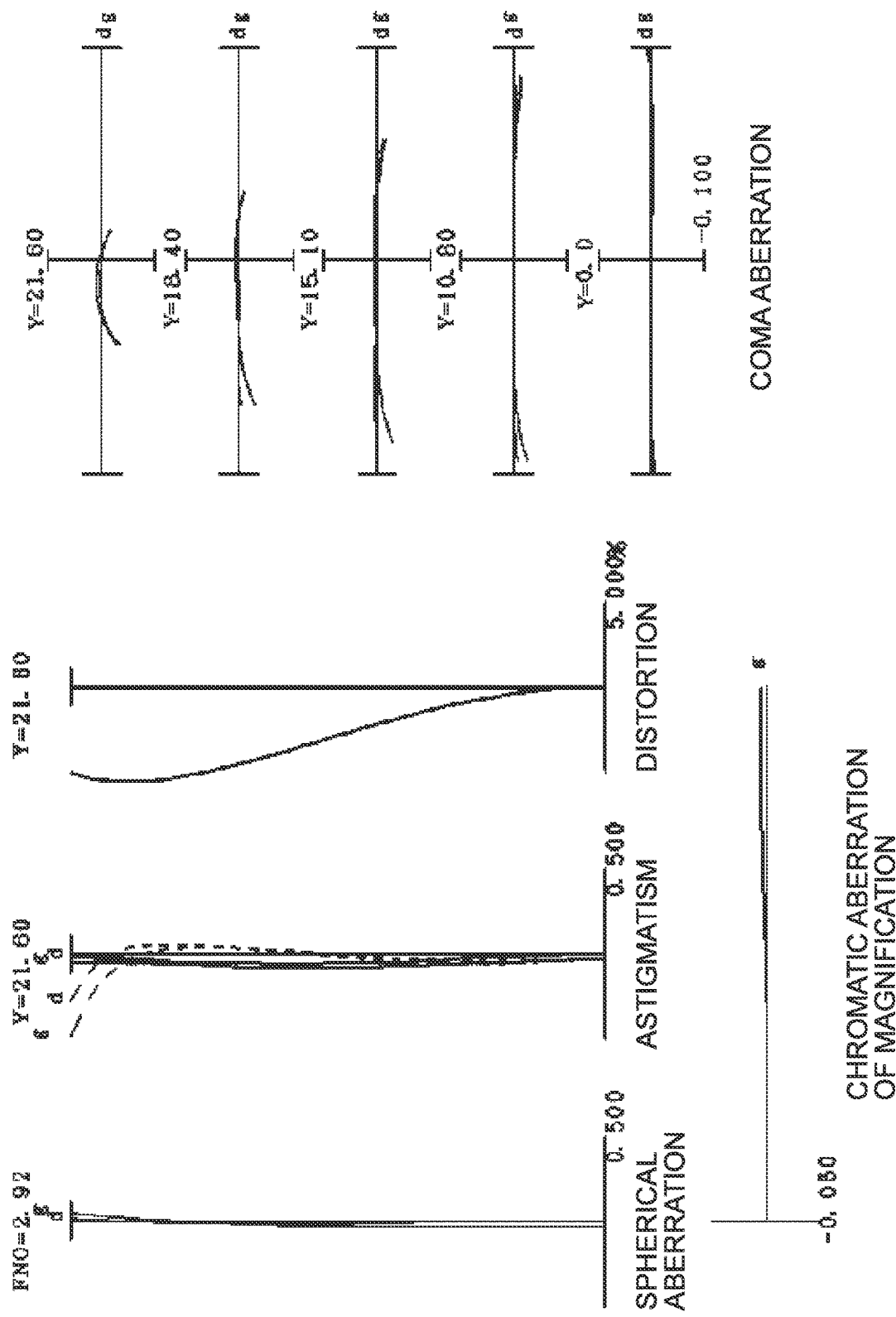

FIGS. 2A-2C shows various aberrations of the zoom optical system according to the first example upon focusing on infinity in the wide-angle end state (2A), the intermediate focal length state (2B) and the telephoto end state (2C). FIGS. 3A-3C shows various aberrations of the zoom optical system according to the first example upon focusing on a short distant object in the wide-angle end state (3A), the intermediate focal length state (3B) and the telephoto end state (3C).

The various aberration graphs show that the zoom optical system according to the first example favorably corrects the various aberrations from the wide-angle end state to the telephoto end state, has an excellent imaging performance, and also has an excellent imaging performance even upon focusing on a short distant object.

Second Example

A second example is described with reference to FIGS. 4, 5A-5C and 6A-6C and Table 2. FIG. 4 is a lens configuration diagram of a zoom optical system according to the second example. The zoom optical system ZL(2) according to the second example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 (first focusing lens group) having a negative refractive power; a sixth lens group G6 (second focusing lens group) having a negative refractive power; and a seventh lens group G7 having a positive refractive power. Here, the first to fourth lens groups G1 to G4 correspond to a preceding lens group GF, and the seventh lens group G7 corresponds to a succeeding lens group GR. The image surface I is disposed subsequent to the seventh lens group G7.

Upon zooming from the wide angle end state (W) to the telephoto end state (T), the first to seventh lens groups G1 to G7 move along the trajectories indicated by the arrows in the lower part of FIG. 4, which changes the distances between adjacent lens groups, and achieves zooming. Upon focusing, the fifth lens group G5 and the sixth lens group G6 independently move in the directions (image surface direction) indicated by arrows in the upper part of FIG. 4 (along different trajectories), thus achieving focusing from a long-distance object to a short distant object.

The first lens group G1 consists of, in order from the object: a negative cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a positive meniscus lens L23 having a convex surface facing the object; and a negative meniscus lens L24 having a concave surface facing the object. The negative meniscus lens L21 has an object-side surface that is an aspherical surface.

The third lens group G3 consists of, in order from the object: a positive meniscus lens L31 having a convex surface facing the object; and a negative cemented lens that includes a biconvex positive lens L32, and a biconcave negative lens L33.

The fourth lens group G4 consists of, in order from the object: a biconvex positive lens L41; a negative cemented lens that includes a biconcave negative lens L42, and a biconvex positive lens L43; and a biconvex positive lens L44. The positive lens L41 has an object-side surface that is an aspherical surface.

The fifth lens group G5 consists of, in order from the object: a biconvex positive lens L51; and a biconcave negative lens L52.

The sixth lens group G6 consists of a negative meniscus lens L61 having a concave surface facing the object. The negative meniscus lens L61 has an object-side surface that is an aspherical surface.

The seventh lens group G7 consists of a biconvex positive lens L71. The positive lens L71 has an object-side surface that is an aspherical surface.

TABLE 2

[General Data]

Zooming ratio = 2.74
MWF1 = 0.274
MWF2 = 0.666
βWF1 = 1.466
βWF2 = 1.399

| | W | M | T |
|---|---|---|---|
| f | 24.8 | 50.0 | 67.9 |
| FNO | 2.92 | 2.92 | 2.92 |
| 2ω | 85.14 | 45.14 | 33.98 |
| Ymax | 21.60 | 21.60 | 21.60 |
| TL | 136.45 | 152.83 | 166.55 |
| BF | 11.75 | 22.94 | 28.76 |

[Lens Data]

| Surface Number | R | D | nd | νd |
|---|---|---|---|---|
| Object Surface | ∞ | | | |
| 1 | 11836.0180 | 2.500 | 1.84666 | 23.80 |
| 2 | 263.6060 | 3.519 | 1.81600 | 46.59 |
| 3 | 996.8722 | 0.200 | | |
| 4 | 97.5302 | 5.847 | 1.81600 | 46.59 |
| 5 | 894.1609 | D5(Variable) | | |
| 6* | 469.8262 | 2.000 | 1.58887 | 61.13 |
| 7 | 20.0932 | 8.459 | | |
| 8 | −202.0263 | 1.200 | 1.77250 | 49.62 |
| 9 | 46.2591 | 0.200 | | |
| 10 | 32.7348 | 4.789 | 1.75520 | 27.57 |
| 11 | 757.6545 | 3.868 | | |
| 12 | −30.1213 | 1.200 | 1.60300 | 65.44 |
| 13 | −58.1128 | D13(Variable) | | |
| 14(Aperture Stop S) | ∞ | 1.500 | | |
| 15 | 43.9945 | 3.971 | 1.90265 | 35.73 |
| 16 | 1479.7660 | 0.603 | | |
| 17 | 33.0299 | 7.156 | 1.49782 | 82.57 |
| 18 | −34.0457 | 1.300 | 1.81600 | 46.59 |
| 19 | 92.8728 | D19(Variable) | | |
| 20* | 124.2240 | 4.029 | 1.77387 | 47.25 |
| 21 | −37.2228 | 0.200 | | |
| 22 | −64.0093 | 1.200 | 1.85478 | 24.80 |
| 23 | 21.9014 | 6.529 | 1.59319 | 67.90 |
| 24 | −90.1349 | 0.921 | | |
| 25 | 48.3180 | 5.294 | 1.83400 | 37.18 |
| 26 | −66.0132 | D26(Variable) | | |
| 27 | −1051.5067 | 3.250 | 1.94595 | 17.98 |
| 28 | −55.5153 | 0.431 | | |
| 29 | −85.9904 | 1.200 | 1.69680 | 55.52 |
| 30 | 23.6335 | D30(Variable) | | |

TABLE 2-continued

| 31* | −49.1357 | 1.300 | 1.95150 | 29.83 |
|---|---|---|---|---|
| 32 | −2454.5649 | D32(Variable) | | |
| 33* | 121.4403 | 4.780 | 1.88202 | 37.22 |
| 34 | −126.7893 | BF | | |
| Image Surface | ∞ | | | |

[Aspherical Surface Data]

6th Surface

K = 1.0000
A4 = 3.12101E−06, A6 = −1.77766E−09, A8 = 2.07046E−12,
A10 = −3.82388E−16

20th Surface

K = 1.0000
A4 = −1.59181E−05, A6 = −3.41748E−10, A8 = 5.24280E−11,
A10 = −1.12143E−13

31st Surface

K = 1.0000
A4 = −8.64573E−06, A6 = −1.85220E−08, A8 = 3.17657E−11,
A10 = −2.40014E−13

33rd Surface

K = 1.0000
A4 = 1.15695E−06, A6 = 7.52900E−10, A8 = −4.19329E−12,
A10 = 4.10233E−15

[Lens Group Data]

| Group | First surface | Focal length |
|---|---|---|
| 1 | 1 | 151.194 |
| 2 | 6 | −25.501 |
| 3 | 14 | 49.576 |
| 4 | 20 | 27.755 |
| 5 | 27 | −47.512 |
| 6 | 31 | −52.709 |
| 7 | 33 | 70.966 |

[Variable Distance Data]

| | W Infinity | M Infinity | T Infinity | W Short-distance | M Short-distance | T Short-distance |
|---|---|---|---|---|---|---|
| D5 | 2.000 | 21.966 | 33.591 | 2.000 | 21.966 | 33.591 |
| D13 | 23.054 | 7.122 | 2.000 | 23.054 | 7.122 | 2.000 |
| D19 | 8.670 | 3.016 | 2.000 | 8.670 | 3.016 | 2.000 |
| D26 | 2.760 | 2.196 | 2.542 | 3.034 | 2.530 | 2.948 |
| D30 | 7.661 | 8.136 | 7.640 | 8.053 | 8.378 | 7.816 |
| D32 | 3.109 | 10.012 | 12.574 | 2.444 | 9.436 | 11.991 |

[Conditional Expression Corresponding Value]

Conditional Expression (1) fF1/−fF2N = 0.901
Conditional Expression (2) (−fFs)/ft = 0.700
Conditional Expression (3) (−fFs)/fw = 1.920
Conditional Expression (4) MWF1/MWF2 = 0.412
Conditional Expression (5) βWF1/βWF2 = 1.048
Conditional Expression (6) (−fFs)/fR = 0.670
Conditional Expression (7) (−fFs)/fF = 1.712
Conditional Expression (8) f1/(−f2) = 5.929
Conditional Expression (9) 2ωw = 85.14
Conditional Expression (10) BFw/fw = 0.475
Conditional Expression (11) (r2 + r1)/(r2 − r1) = 1.041
Conditional Expression (12) βWF1 = 1.466
Conditional Expression (13) βWF2 = 1.399
Conditional Expression (14) (βWF1 + 1/βWF1)$^{-2}$ = 0.2167
Conditional Expression (15) (βWF2 + 1/βWF2)$^{-2}$ = 0.2238

Figure 5B:
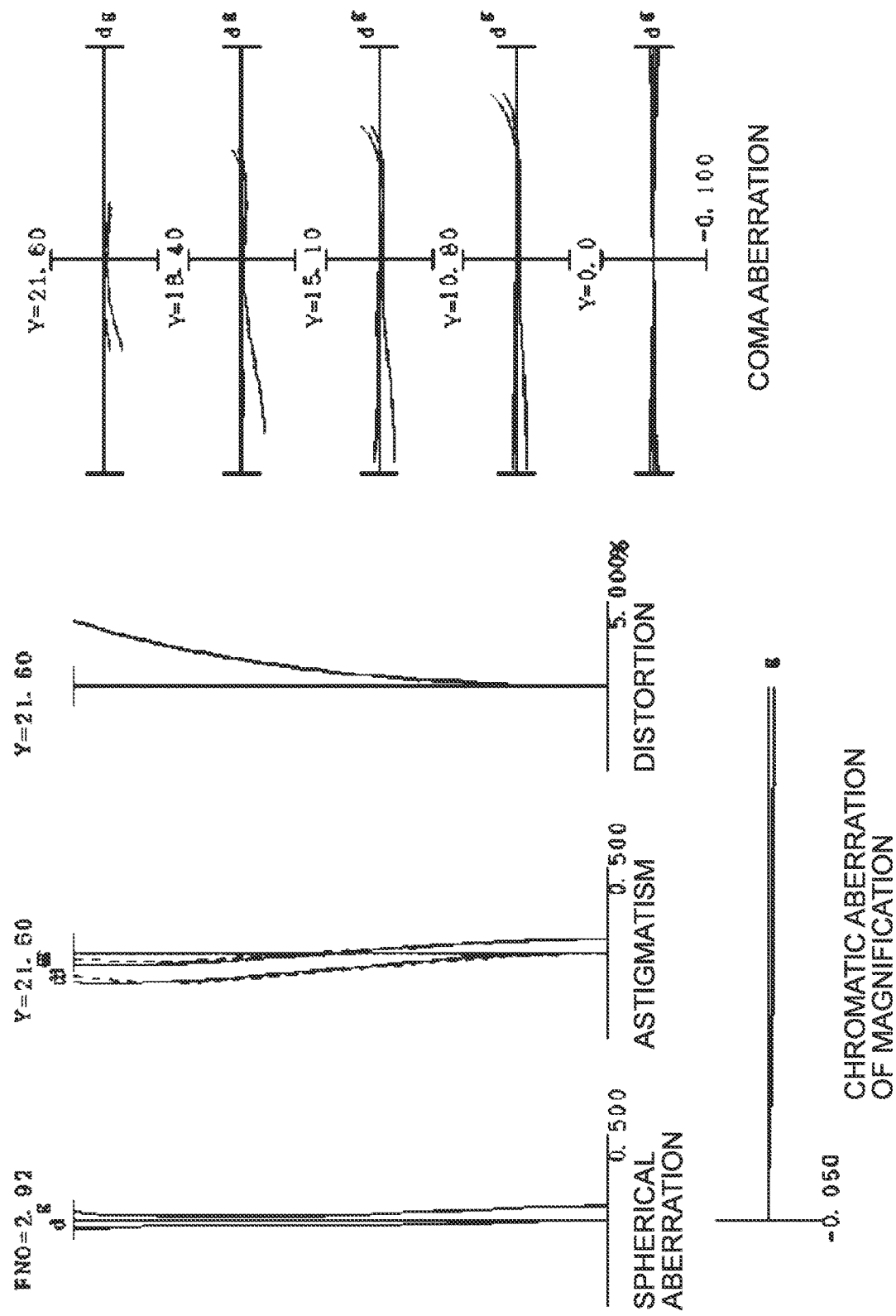
Figure 6B:
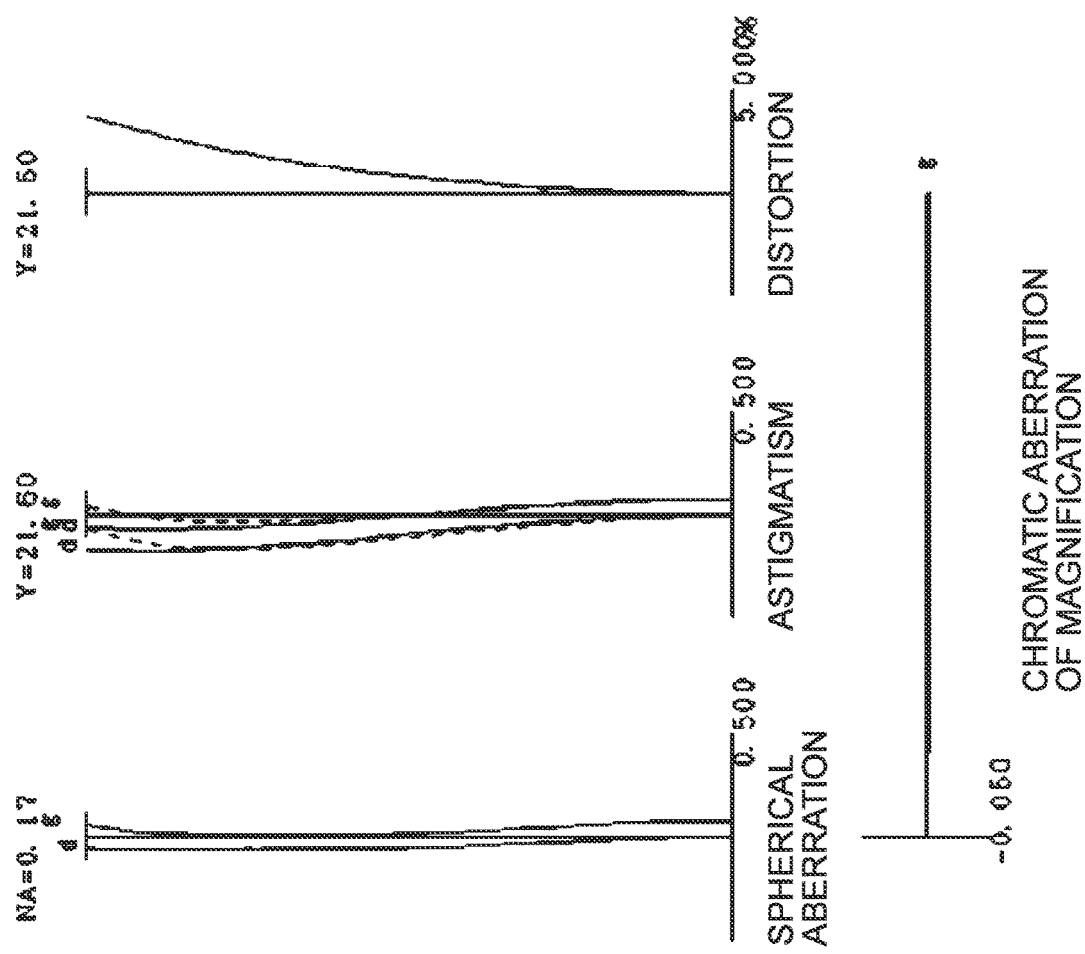

FIGS. 5A-5C shows various aberrations of the zoom optical system according to the second example upon focusing on infinity in the wide-angle end state (5A), the intermediate focal length state (5B) and the telephoto end state (5C). FIGS. 6A-6C shows various aberrations of the zoom optical system according to the second example upon focusing on a short distant object in the wide-angle end state (6A), the intermediate focal length state (6B) and the telephoto end state (6C).

The various aberration graphs show that the zoom optical system according to the second example favorably corrects the various aberrations from the wide-angle end state to the telephoto end state, has an excellent imaging performance, and also has an excellent imaging performance even upon focusing on a short distant object.

Third Example

A third example is described with reference to FIGS. 7, 8A-8C and 9A-9C and Table 3. FIG. 7 is a lens configuration diagram of a zoom optical system according to the third example. The zoom optical system ZL(3) according to the third example consists of, in order from the object: a first lens group G1 having a positive refractive power; a second lens group G2 having a negative refractive power; an aperture stop S; a third lens group G3 having a positive refractive power; a fourth lens group G4 (first focusing lens group) having a negative refractive power; a fifth lens group G5 (second focusing lens group) having a negative refractive power; and a sixth lens group G6 having a positive refractive power. Here, the first to third lens groups G1 to G3 correspond to a preceding lens group GF, and the sixth lens group G6 corresponds to a succeeding lens group GR. The image surface I is disposed subsequent to the sixth lens group G6.

Upon zooming from the wide angle end state (W) to the telephoto end state (T), the first to sixth lens groups G1 to G6 move along the trajectories indicated by the arrows in the lower part of FIG. 7, which changes the distances between adjacent lens groups, and achieves zooming. Upon focusing, the fourth lens group G4 and the fifth lens group G5 independently move in the directions (image surface direction) indicated by arrows in the upper part of FIG. 7 (along different trajectories), thus achieving focusing from a long-distance object to a short distant object.

The first lens group G1 consists of, in order from the object: a negative cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a negative meniscus lens L22 having a concave surface facing the object; a biconvex positive lens L23; and a negative meniscus lens L24 having a concave surface facing the object. The negative meniscus lens L21 has an object-side surface that is an aspherical surface.

The third lens group G3 consists of, in order from the object: a biconvex positive lens L31; a negative cemented lens that includes a biconvex positive lens L32, and a biconcave negative lens L33; a biconvex positive lens L34; a negative cemented lens that includes a biconcave negative lens L35 and a biconvex positive lens L36; and a biconvex positive lens L37. The positive lens L34 has an object-side surface that is an aspherical surface. The positive lens L37 has an image-side surface that is an aspherical surface.

The fourth lens group G4 consists of, in order from the object: a positive meniscus lens L41 having a concave surface facing the object; and a negative meniscus lens L42 having a convex surface facing the object.

The fifth lens group G5 consists of a negative meniscus lens L51 having a concave surface facing the object. The negative meniscus lens L51 has an object-side surface that is an aspherical surface.

The sixth lens group G6 consists of a biconvex positive lens L61.

The following Table 3 lists values of data on the zoom optical system according to the third example.

TABLE 3

[General Data]

Zooming ratio = 2.74
MWF1 = 0.419
MWF2 = 0.625
βWF1 = 1.168
βWF2 = 1.427

| | W | M | T |
|---|---|---|---|
| f | 24.8 | 50.0 | 67.9 |
| FNO | 3.50 | 3.50 | 3.50 |
| 2ω | 85.10 | 45.60 | 34.40 |
| Ymax | 21.60 | 21.60 | 21.60 |
| TL | 135.45 | 152.59 | 169.45 |
| BF | 11.75 | 18.25 | 23.91 |

[Lens Data]

| Surface Number | R | D | nd | νd |
|---|---|---|---|---|
| Object Surface | ∞ | | | |
| 1 | 800.0000 | 2.500 | 1.84666 | 23.80 |
| 2 | 149.2823 | 3.000 | 1.59319 | 67.90 |
| 3 | 205.0385 | 0.200 | | |
| 4 | 75.1891 | 6.257 | 1.81600 | 46.59 |
| 5 | 947.1276 | D5(Variable) | | |
| 6* | 500.0000 | 2.000 | 1.67798 | 54.89 |
| 7 | 18.8391 | 14.459 | | |
| 8 | −25.1985 | 1.200 | 1.59319 | 67.90 |
| 9 | −118.4665 | 0.200 | | |
| 10 | 97.8539 | 3.812 | 1.85000 | 27.03 |
| 11 | −61.2035 | 1.947 | | |
| 12 | −28.1128 | 1.200 | 1.60300 | 65.44 |
| 13 | −45.1446 | D13(Variable) | | |
| 14(Aperture Stop S) | ∞ | 1.500 | | |
| 15 | 39.0407 | 5.431 | 1.75520 | 27.57 |
| 16 | −150.5310 | 0.200 | | |
| 17 | 27.2134 | 6.774 | 1.49782 | 82.57 |
| 18 | −75.8975 | 1.300 | 2.00069 | 25.46 |
| 19 | 65.0385 | 2.024 | | |
| 20* | 112.8457 | 3.574 | 1.66755 | 41.87 |
| 21 | −42.5203 | 0.290 | | |
| 22 | −65.7387 | 1.200 | 1.85478 | 24.80 |
| 23 | 18.5000 | 7.483 | 1.49782 | 82.57 |
| 24 | −72.5400 | 3.463 | | |
| 25 | 94.8511 | 5.524 | 1.72825 | 28.38 |
| 26* | −33.9997 | D26(Variable) | | |
| 27 | −157.1254 | 2.312 | 1.94594 | 17.98 |
| 28 | −66.1574 | 0.200 | | |
| 29 | 77.0731 | 1.200 | 1.80400 | 46.60 |
| 30 | 30.1840 | D30(Variable) | | |
| 31* | −20.0000 | 1.300 | 1.95150 | 29.83 |
| 32 | −39.9506 | D32(Variable) | | |
| 33 | 389.0189 | 2.631 | 1.84666 | 23.80 |
| 34 | −287.6232 | BF | | |
| Image Surface | ∞ | | | |

[Aspherical Surface Data]

6th Surface

K = 1.0000
A4 = 9.81697E−06, A6 = −1.08680E−08, A8 = 1.23597E−11,
A10 = −2.17136E−15

TABLE 3-continued

20th Surface

K = 1.0000
A4 = −2.26533E−05, A6 = 5.36979E−09, A8 = 1.47314E−11,
A10 = −1.43415E−14

26th Surface

K = 1.0000
A4 = 2.62785E−07, A6 = −1.29286E−08, A8 = −4.74230E−12,
A10 = −5.79020E−14

31st Surface

K = 1.0000
A4 = 1.10646E−06, A6 = −1.33919E−08, A8 = 2.15561E−11,
A10 = −5.38428E−13

[Lens Group Data]

| Group | First surface | Focal length |
|---|---|---|
| 1 | 1 | 154.131 |
| 2 | 6 | −25.881 |
| 3 | 14 | 30.388 |
| 4 | 27 | −131.942 |
| 5 | 31 | −43.472 |
| 6 | 33 | 195.660 |

[Variable Distance Data]

|  | W Infinity | M Infinity | T Infinity | W Short-distance | M Short-distance | T Short-distance |
|---|---|---|---|---|---|---|
| D5 | 2.000 | 18.585 | 26.409 | 2.000 | 18.585 | 26.409 |
| D13 | 22.225 | 5.535 | 2.000 | 22.225 | 5.535 | 2.000 |
| D26 | 2.386 | 3.229 | 2.000 | 2.805 | 3.825 | 2.582 |
| D30 | 10.756 | 9.234 | 9.377 | 10.962 | 9.079 | 9.166 |
| D32 | 3.151 | 14.573 | 22.575 | 2.526 | 14.132 | 22.204 |

[Conditional Expression Corresponding Value]

Conditional Expression (1) fF1/−fF2 = 3.035
Conditional Expression (2) (−fFs)/ft = 0.640
Conditional Expression (3) (−fFs)/fw = 1.756
Conditional Expression (4) MWF1/MWF2 = 0.671
Conditional Expression (5) βWF1/βWF2 = 0.819
Conditional Expression (6) (−fFs)/fR = 0.222
Conditional Expression (7) (−fFs)/fF = 1.431
Conditional Expression (8) f1/(−f2) = 5.955
Conditional Expression (9) 2ωw = 85.10
Conditional Expression (10) BFw/fw = 0.475
Conditional Expression (11) (r2 + r1)/(r2 − r1) = 3.005
Conditional Expression (12) βWF1 = 1.168
Conditional Expression (13) βWF2 = 1.427
Conditional Expression (14) (βWF1 + 1/βWF1)$^{-2}$ = 0.2440
Conditional Expression (15) (βWF2 + 1/βWF2)$^{-2}$ = 0.2096

FIGS. 8A-8C shows various aberrations of the zoom optical system according to the third example upon focusing on infinity in the wide-angle end state (8A), the intermediate focal length state (8B) and the telephoto end state (8C). FIGS. 9A-9C shows various aberrations of the zoom optical system according to the third example upon focusing on a short distant object in the wide-angle end state (9A), the intermediate focal length state (9B) and the telephoto end state (9C).

The various aberration graphs show that the zoom optical system according to the third example favorably corrects the various aberrations from the wide-angle end state to the telephoto end state, has an excellent imaging performance, and also has an excellent imaging performance even upon focusing on a short distant object.

Fourth Example

Figure 10:
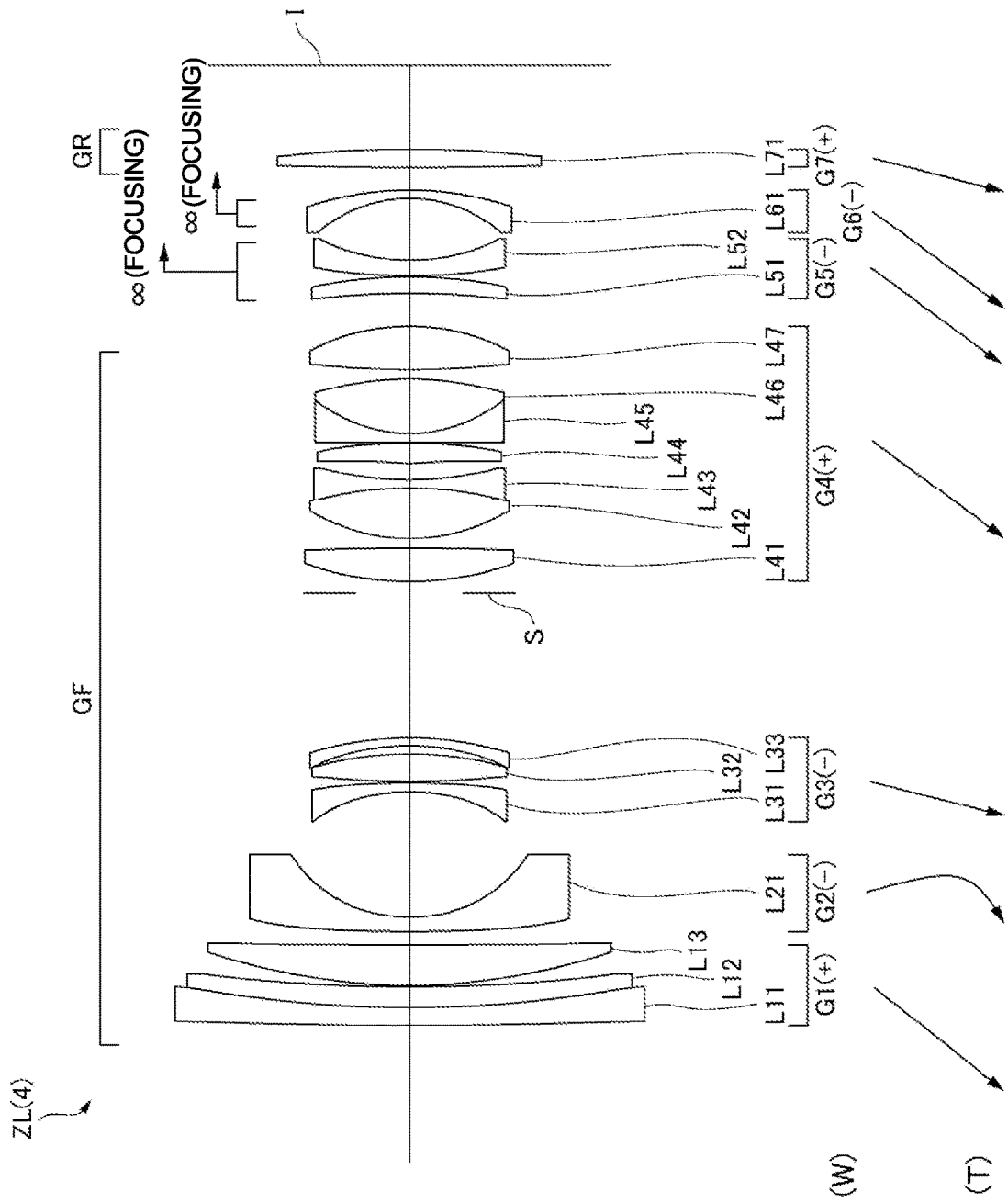
FIG. 10 shows a lens configuration of a zoom optical system according to a fourth example.

A fourth example is described with reference to FIGS. 10, 11A-11C and 12A-12C and Table 4. FIG. 10 is a lens configuration diagram of a zoom optical system according to the fourth example. The zoom optical system ZL(4) according to the fourth example consists of, in order from the object: a first lens group G1 having a positive refractive power; a second lens group G2 having a negative refractive power; a third lens group G3 having a negative refractive power; an aperture stop S; a fourth lens group G4 having a positive refractive power; a fifth lens group G5 (first focusing lens group) having a negative refractive power; a sixth lens group G6 (second focusing lens group) having a negative refractive power; and a seventh lens group G7 having a positive refractive power. Here, the first to fourth lens groups G1 to G4 correspond to a preceding lens group GF, and the seventh lens group G7 corresponds to a succeeding lens group GR. The image surface I is disposed subsequent to the seventh lens group G7.

Upon zooming from the wide angle end state (W) to the telephoto end state (T), the first to seventh lens groups G1 to G7 move along the trajectories indicated by the arrows in the lower part of FIG. 10, which changes the distances between adjacent lens groups, and achieves zooming. Upon focusing, the fifth lens group G5 and the sixth lens group G6 independently move in the directions (image surface direction) indicated by arrows in the upper part of FIG. 10 (along different trajectories), thus achieving focusing from a long-distance object to a short distant object.

The first lens group G1 consists of, in order from the object: a negative cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of a negative meniscus lens L21 having a convex surface facing the object. The negative meniscus lens L21 has an object-side surface that is an aspherical surface.

The third lens group G3 consists of, in order from the object: a negative meniscus lens L31 having a concave surface facing the object; a biconvex positive lens L32; and a negative meniscus lens L33 having a concave surface facing the object.

The fourth lens group G4 consists of, in order from the object: a biconvex positive lens L41; a negative cemented lens that includes a biconvex positive lens L42, and a biconcave negative lens L43; a biconvex positive lens L44; a negative cemented lens that includes a biconcave negative lens L45 and a biconvex positive lens L46; and a biconvex positive lens L47. The positive lens L44 has an object-side surface that is an aspherical surface. The positive lens L47 has an image-side surface that is an aspherical surface.

The fifth lens group G5 consists of, in order from the object: a positive meniscus lens L51 having a concave surface facing the object; and a negative meniscus lens L52 having a convex surface facing the object.

The sixth lens group G6 consists of a negative meniscus lens L61 having a concave surface facing the object. The negative meniscus lens L61 has an object-side surface that is an aspherical surface.

The seventh lens group G7 consists of a biconvex positive lens L71.

The following Table 4 lists values of data on the zoom optical system according to the fourth example.

TABLE 4

[General Data]

Zooming ratio = 2.74
MWF1 = 0.375
MWF2 = 0.564
βWF1 = 1.173
βWF2 = 1.459

| | W | M | T |
|---|---|---|---|
| f | 24.8 | 50.0 | 67.9 |
| FNO | 3.50 | 3.50 | 3.50 |
| 2ω | 85.08 | 45.84 | 34.44 |
| Ymax | 21.60 | 21.60 | 21.60 |
| TL | 135.43 | 152.96 | 169.45 |
| BF | 11.75 | 20.53 | 22.23 |

[Lens Data]

| Surface Number | R | D | nd | νd |
|---|---|---|---|---|
| Object Surface | ∞ | | | |
| 1 | 800.0000 | 2.500 | 1.84666 | 23.80 |
| 2 | 161.6173 | 3.000 | 1.59319 | 67.90 |
| 3 | 233.4567 | 0.200 | | |
| 4 | 88.3647 | 5.578 | 1.81600 | 46.59 |
| 5 | 1494.7667 | D5(Variable) | | |
| 6* | 500.0000 | 2.000 | 1.67798 | 54.89 |
| 7 | 20.0442 | D7(Variable) | | |
| 8 | −23.6909 | 1.200 | 1.59319 | 67.90 |
| 9 | −99.5585 | 0.200 | | |
| 10 | 130.0428 | 3.826 | 1.85000 | 27.03 |
| 11 | −52.3275 | 1.221 | | |
| 12 | −32.7025 | 1.200 | 1.60300 | 65.44 |
| 13 | −46.7034 | D13(Variable) | | |
| 14(Aperture Stop S) | ∞ | 1.658 | | |
| 15 | 42.4477 | 4.725 | 1.75520 | 27.57 |
| 16 | −240.9219 | 1.366 | | |
| 17 | 27.1858 | 6.996 | 1.49782 | 82.57 |
| 18 | −51.9273 | 1.300 | 2.00069 | 25.46 |
| 19 | 50.0514 | 2.382 | | |
| 20* | 108.1669 | 2.719 | 1.66755 | 41.87 |
| 21 | −76.2004 | 0.200 | | |
| 22 | −3410.9598 | 1.200 | 1.85478 | 24.80 |
| 23 | 20.2029 | 7.635 | 1.49782 | 82.57 |
| 24 | −49.1628 | 1.439 | | |
| 25 | 149.7679 | 6.074 | 1.72825 | 28.38 |
| 26* | −30.1914 | D26(Variable) | | |
| 27 | −162.6654 | 2.460 | 1.94594 | 17.98 |
| 28 | −61.8074 | 0.200 | | |
| 29 | 86.8437 | 2.035 | 1.80400 | 46.60 |
| 30 | 28.2564 | D30(Variable) | | |
| 31* | −20.2693 | 1.300 | 1.95150 | 29.83 |
| 32 | −44.8147 | D32(Variable) | | |
| 33 | 15425.4800 | 2.506 | 1.84666 | 23.80 |
| 34 | −190.6511 | BF | | |
| Image Surface | ∞ | | | |

[Aspherical Surface Data]

6th Surface

K = 1.0000
A4 = 7.50942E−06, A6 = −6.77248E−09, A8 = 6.81523E−12,
A10 = −1.86349E−15

20th Surface

K = 1.0000
A4 = −2.45608E−05, A6 = −6.09341E−09, A8 = 4.23890E−11,
A10 = −3.30984E−13

26th Surface

K = 1.0000
A4 = −1.46127E−06, A6 = −1.78339E−08, A8 = 1.84178E−11,
A10 = −1.65357E−13

TABLE 4-continued

31st Surface

K = 1.0000
A4 = −1.14793E−07, A6 = −2.17369E−08, A8 = 6.66752E−11,
A10 = −6.03155E−13

[Lens Group Data]

| Group | First surface | Focal length |
|---|---|---|
| 1 | 1 | 176.909 |
| 2 | 6 | −30.851 |
| 3 | 8 | −1135.437 |
| 4 | 14 | 29.673 |
| 5 | 27 | −109.998 |
| 6 | 31 | −39.925 |
| 7 | 33 | 222.447 |

[Variable Distance Data]

| | W Infinity | M Infinity | T Infinity | W Short-distance | M Short-distance | T Short-distance |
|---|---|---|---|---|---|---|
| D5 | 2.000 | 19.897 | 29.314 | 2.000 | 19.897 | 29.314 |
| D7 | 17.679 | 14.397 | 13.852 | 17.679 | 14.397 | 13.852 |
| D13 | 20.371 | 5.813 | 2.000 | 20.371 | 5.813 | 2.000 |
| D26 | 4.463 | 2.867 | 2.000 | 4.838 | 3.299 | 2.417 |
| D30 | 8.754 | 8.749 | 8.885 | 8.943 | 8.714 | 8.824 |
| D32 | 3.289 | 13.586 | 24.053 | 2.725 | 13.189 | 23.697 |

[Conditional Expression Corresponding Value]

Conditional Expression (1) fF1/−fF2 = 2.755
Conditional Expression (2) (−fFs)/ft = 0.588
Conditional Expression (3) (−fFs)/fw = 1.613
Conditional Expression (4) MWF1/MWF2 = 0.665
Conditional Expression (5) βWF1/βWF2 = 0.804
Conditional Expression (6) (−fFs)/fR = 0.179
Conditional Expression (7) (−fFs)/fF = 1.346
Conditional Expression (8) f1/(−f2) = 5.734
Conditional Expression (9) 2ωw = 85.08
Conditional Expression (10) BFw/fw = 0.475
Conditional Expression (11) (r2 + r1)/(r2 − r1) = 2.652
Conditional Expression (12) βWF1 = 1.1727
Conditional Expression (13) βWF2 = 1.4585
Conditional Expression (14) (βWF1 + 1/βWF1)$^{-2}$ = 0.2438
Conditional Expression (15) (βWF2 + 1/βWF2)$^{-2}$ = 0.2175

Figure 11B:
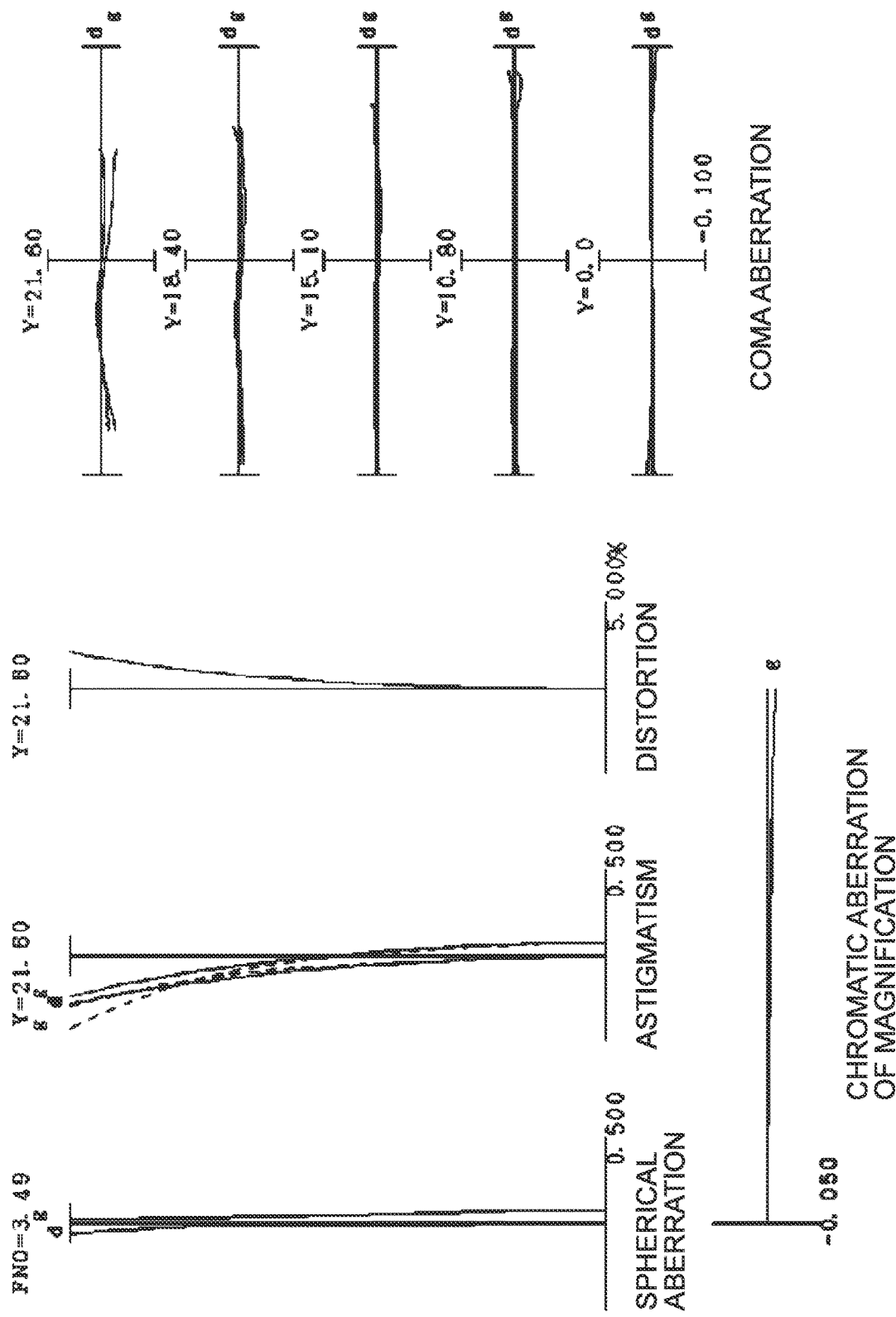
Figure 12A:
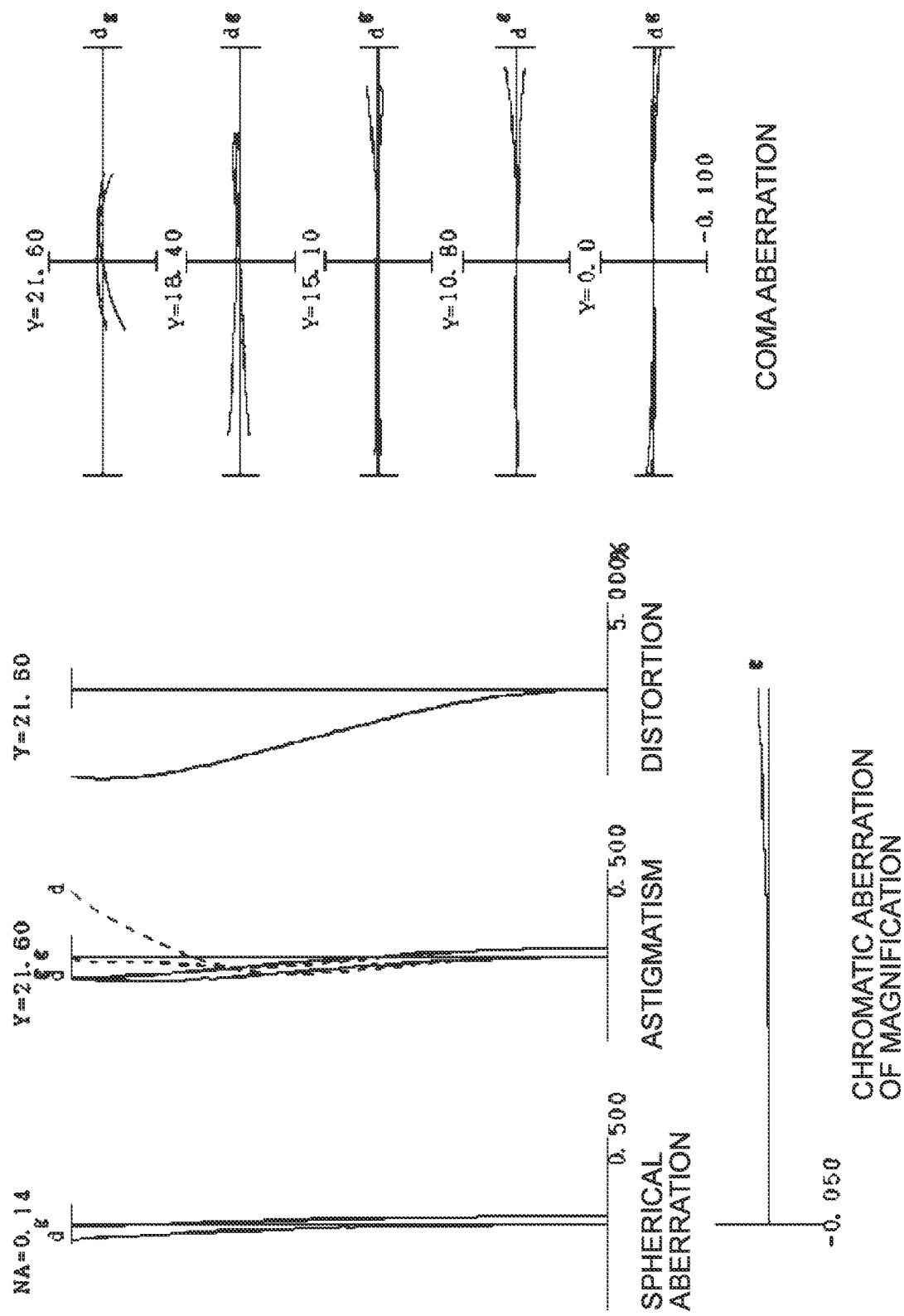
Figure 12C:
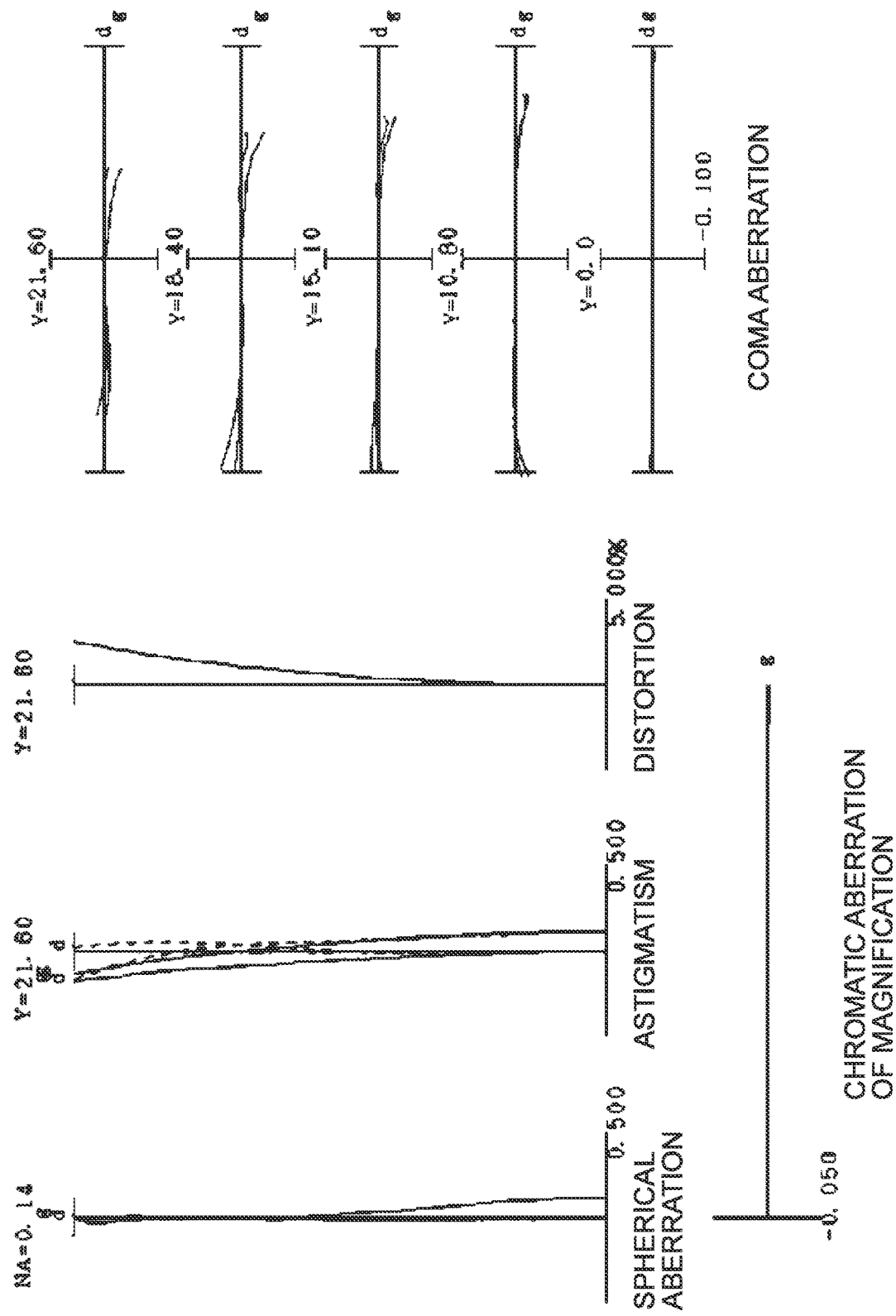

FIGS. 11A-11C shows various aberrations of the zoom optical system according to the fourth example upon focusing on infinity in the wide-angle end state (11A), the intermediate focal length state (11B) and the telephoto end state (11C). FIGS. 12A-12C shows various aberrations of the zoom optical system according to the fourth example upon focusing on a short distant object in the wide-angle end state (12A), the intermediate focal length state (12B) and the telephoto end state (12C).

The various aberration graphs show that the zoom optical system according to the fourth example favorably corrects the various aberrations from the wide-angle end state to the telephoto end state, has an excellent imaging performance, and also has an excellent imaging performance even upon focusing on a short distant object.

Fifth Example

Figure 13:
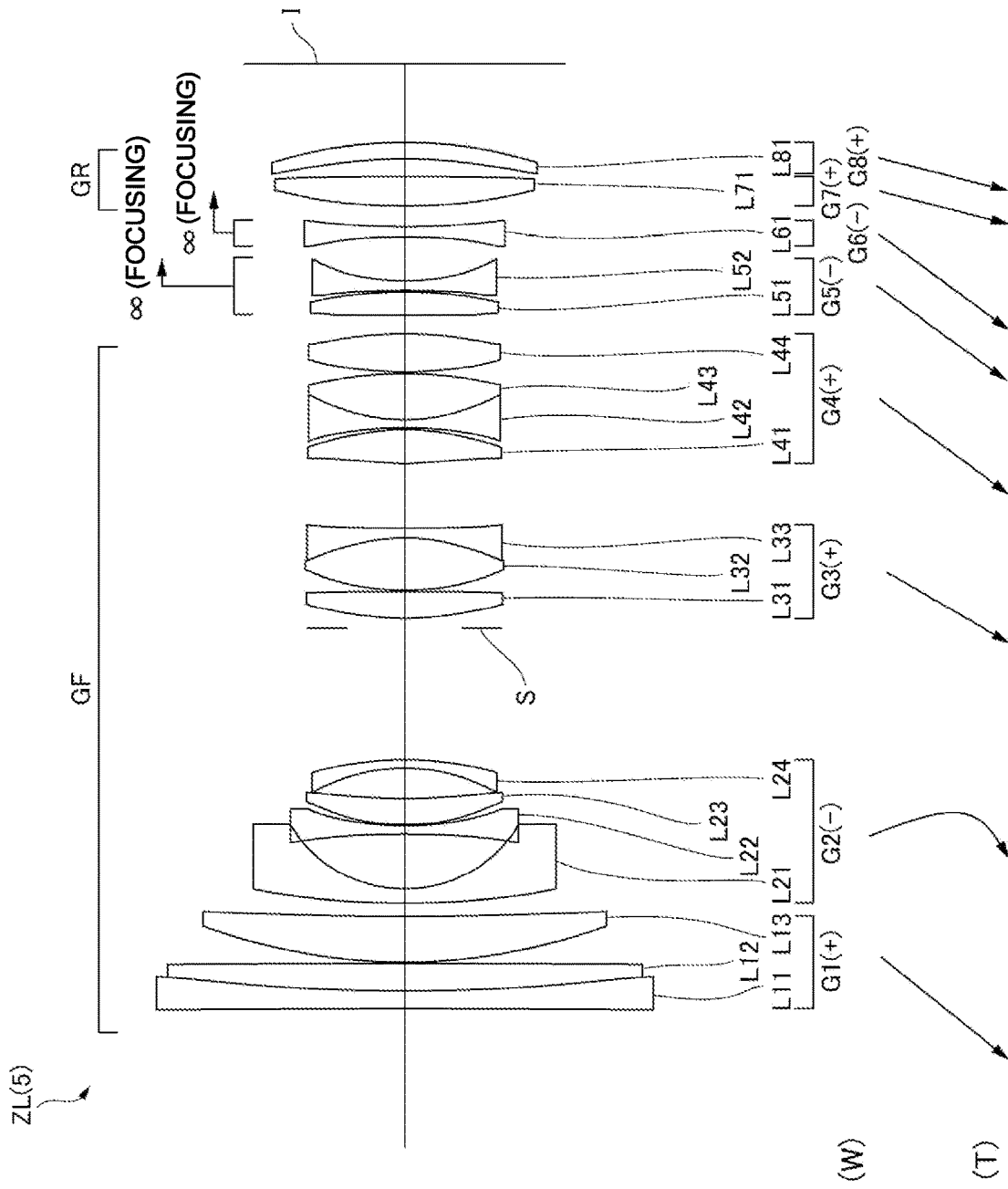
FIG. 13 shows a lens configuration of a zoom optical system according to a fifth example.

A fifth example is described with reference to FIGS. 13, 14A-14C and 15A-15C and Table 5. FIG. 13 is a lens configuration diagram of a zoom optical system according to the fifth example. The zoom optical system ZL(5) according to the fifth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 (first focusing lens group) having a negative refractive power; a sixth lens group G6 (second focusing lens group) having a negative refractive power; a seventh lens group G7 having a positive refractive power; and an eighth lens group G8 having a positive refractive power. Here, the first to fourth lens groups G1 to G4 correspond to a preceding lens group GF, and the seventh lens group G7 and the eighth lens groups G8 correspond to a succeeding lens group GR. The image surface I is disposed subsequent to the eighth lens group G8.

Upon zooming from the wide angle end state (W) to the telephoto end state (T), the first to eighth lens groups G1 to G8 move along the trajectories indicated by the arrows in the lower part of FIG. 13, which changes the distances between adjacent lens groups, and achieves zooming. Upon focusing, the fifth lens group G5 and the sixth lens group G6 independently move in the directions (image surface direction) indicated by arrows in the upper part of FIG. 13 (along different trajectories), thus achieving focusing from a long-distance object to a short distant object.

The first lens group G1 consists of, in order from the object: a negative cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a positive meniscus lens L23 having a convex surface facing the object; and a negative meniscus lens L24 having a concave surface facing the object. The negative meniscus lens L21 has an object-side surface that is an aspherical surface.

The third lens group G3 consists of, in order from the object: a biconvex positive lens L31; and a positive cemented lens that includes a biconvex positive lens L32, and a biconcave negative lens L33.

The fourth lens group G4 consists of, in order from the object: a biconvex positive lens L41; a negative cemented lens that includes a biconcave negative lens L42, and a biconvex positive lens L43; and a biconvex positive lens L44. The positive lens L41 has an object-side surface that is an aspherical surface. The positive lens L44 has an image-side surface that is an aspherical surface.

The fifth lens group G5 consists of, in order from the object: a biconvex positive lens L51; and a biconcave negative lens L52.

The sixth lens group G6 consists of a biconcave negative lens L61. The negative lens L61 has an object-side surface that is an aspherical surface.

The seventh lens group G7 consists of a biconvex positive lens L71.

The eighth lens group G8 consists of a positive meniscus lens L81 having a concave surface facing the object.

The following Table 5 lists values of data on the zoom optical system according to the fifth example.

TABLE 5

[General Data]

Zooming ratio = 2.74
MWF1 = 0.201
MWF2 = 0.694
βWF1 = 1.405
βWF2 = 1.534

| | W | M | T |
|---|---|---|---|
| f | 24.8 | 50.0 | 67.9 |
| FNO | 2.92 | 2.92 | 2.92 |
| 2ω | 85.18 | 45.24 | 34.12 |
| Ymax | 21.60 | 21.60 | 21.60 |
| TL | 135.45 | 154.15 | 169.45 |
| BF | 11.38 | 23.63 | 31.35 |

[Lens Data]

| Surface Number | R | D | nd | νd |
|---|---|---|---|---|
| Object Surface | ∞ | | | |
| 1 | 11891.6830 | 2.500 | 1.84666 | 23.80 |
| 2 | 259.8551 | 3.953 | 1.59319 | 67.90 |
| 3 | 4532.4082 | 0.200 | | |
| 4 | 82.2793 | 6.511 | 1.81600 | 46.59 |
| 5 | 637.5320 | D5(Variable) | | |
| 6* | 166.9549 | 2.000 | 1.67798 | 54.89 |
| 7 | 18.9915 | 7.826 | | |
| 8 | −128.0661 | 1.200 | 1.59319 | 67.90 |
| 9 | 39.3297 | 0.200 | | |
| 10 | 30.2329 | 3.805 | 1.85000 | 27.03 |
| 11 | 108.1671 | 4.249 | | |
| 12 | −26.7310 | 1.200 | 1.60300 | 65.44 |
| 13 | −50.1190 | D13(Variable) | | |
| 14(Aperture Stop S) | ∞ | 1.500 | | |
| 15 | 52.2117 | 3.906 | 1.90265 | 35.72 |
| 16 | −426.9813 | 0.200 | | |
| 17 | 36.5119 | 7.383 | 1.49782 | 82.57 |
| 18 | −31.0542 | 1.300 | 1.81600 | 46.59 |
| 19 | 191.2416 | D19(Variable) | | |
| 20* | 83.3066 | 4.681 | 1.82098 | 42.50 |
| 21 | −38.9988 | 0.299 | | |
| 22 | −52.7599 | 1.200 | 1.85478 | 24.80 |
| 23 | 26.2315 | 6.594 | 1.49782 | 82.57 |
| 24 | −62.9470 | 0.212 | | |
| 25 | 52.3086 | 5.490 | 1.80604 | 40.74 |
| 26* | −58.3708 | D26(Variable) | | |
| 27 | 592.1811 | 3.338 | 1.94594 | 17.98 |
| 28 | −62.8662 | 0.200 | | |
| 29 | −106.8070 | 1.200 | 1.77250 | 49.62 |
| 30 | 28.0432 | D30(Variable) | | |
| 31* | −84.0436 | 1.300 | 1.95150 | 29.83 |
| 32 | 101.0812 | D32(Variable) | | |
| 33 | 76.7980 | 4.332 | 1.83481 | 42.73 |
| 34 | −571.5236 | D34(Variable) | | |
| 35 | −84.4248 | 2.428 | 1.67252 | 26.52 |
| 36 | −64.1857 | BF | | |
| Image Surface | ∞ | | | |

[Aspherical Surface Data]

6th Surface

K = 1.0000
A4 = 2.89860E−06, A6 = −1.09792E−09, A8 = 1.24848E−12, A10 = 1.65714E−15

20th Surface

K = 1.0000
A4 = −1.21758E−05, A6 = 2.33795E−10, A8 = 1.34229E−11, A10 = −2.74633E−14

TABLE 5-continued

26th Surface

K = 1.0000
A4 = 2.89243E−06, A6 = −6.52485E−09, A8 = 1.47471E−14,
A10 = 1.05852E−14
31st Surface K = 1.0000
A4 = −5.73632E−06, A6 = −2.30482E−08, A8 = 6.15426E−11,
A10 = −2.77958E−13

[Lens Group Data]

| Group | First surface | Focal length |
|---|---|---|
| 1 | 1 | 130.490 |
| 2 | 6 | −21.991 |
| 3 | 14 | 47.900 |
| 4 | 20 | 27.873 |
| 5 | 27 | −56.211 |
| 6 | 31 | −48.064 |
| 7 | 33 | 81.345 |
| 8 | 35 | 379.801 |

[Variable Distance Data]

| | W Infinity | M Infinity | T Infinity | W Short-distance | M Short-distance | T Short-distance |
|---|---|---|---|---|---|---|
| D5 | 2.000 | 20.708 | 31.055 | 2.000 | 20.708 | 31.055 |
| D13 | 18.835 | 5.825 | 2.000 | 18.835 | 5.825 | 2.000 |
| D19 | 9.480 | 3.315 | 2.000 | 9.480 | 3.315 | 2.000 |
| D26 | 2.777 | 2.126 | 2.000 | 2.977 | 2.460 | 2.419 |
| D30 | 6.407 | 6.601 | 5.787 | 6.901 | 6.815 | 5.893 |
| D32 | 3.039 | 10.144 | 13.339 | 2.345 | 9.596 | 12.814 |
| D34 | 2.329 | 2.594 | 2.721 | 2.329 | 2.594 | 2.721 |

[Conditional Expression Corresponding Value]

Conditional Expression (1) fF1/−fF2 = 1.170
Conditional Expression (2) (−fFs)/ft = 0.708
Conditional Expression (3) (−fFs)/fw = 1.942
Conditional Expression (4) MWF1/MWF2 = 0.289
Conditional Expression (5) βWF1/βWF2 = 0.916
Conditional Expression (6) (−fFs)/fR = 0.702
Conditional Expression (7) (−fFs)/fF = 1.724
Conditional Expression (8) f1/(−f2) = 5.934
Conditional Expression (9) 2ωw = 85.18
Conditional Expression (10) BFw/fw = 0.460
Conditional Expression (11) (r2 + r1)/(r2 − r1) = 0.092
Conditional Expression (12) βWF1 = 1.405
Conditional Expression (13) βWF2 = 1.534
Conditional Expression (14) (βWF1 + 1/βWF1)$^{-2}$ = 0.2232
Conditional Expression (15) (βWF2 + 1/βWF2)$^{-2}$ = 0.2093

Figure 14A:
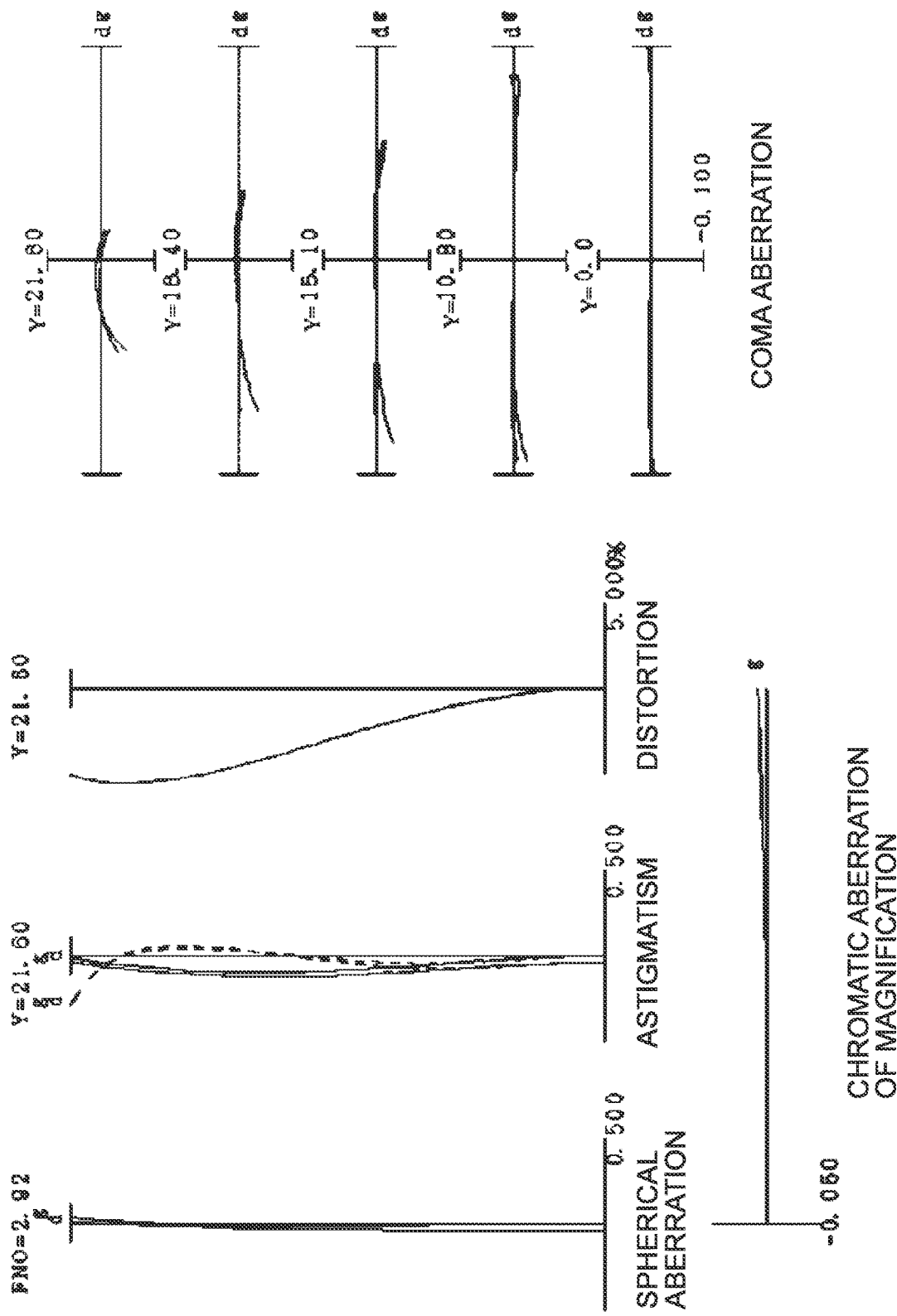
Figure 14C:
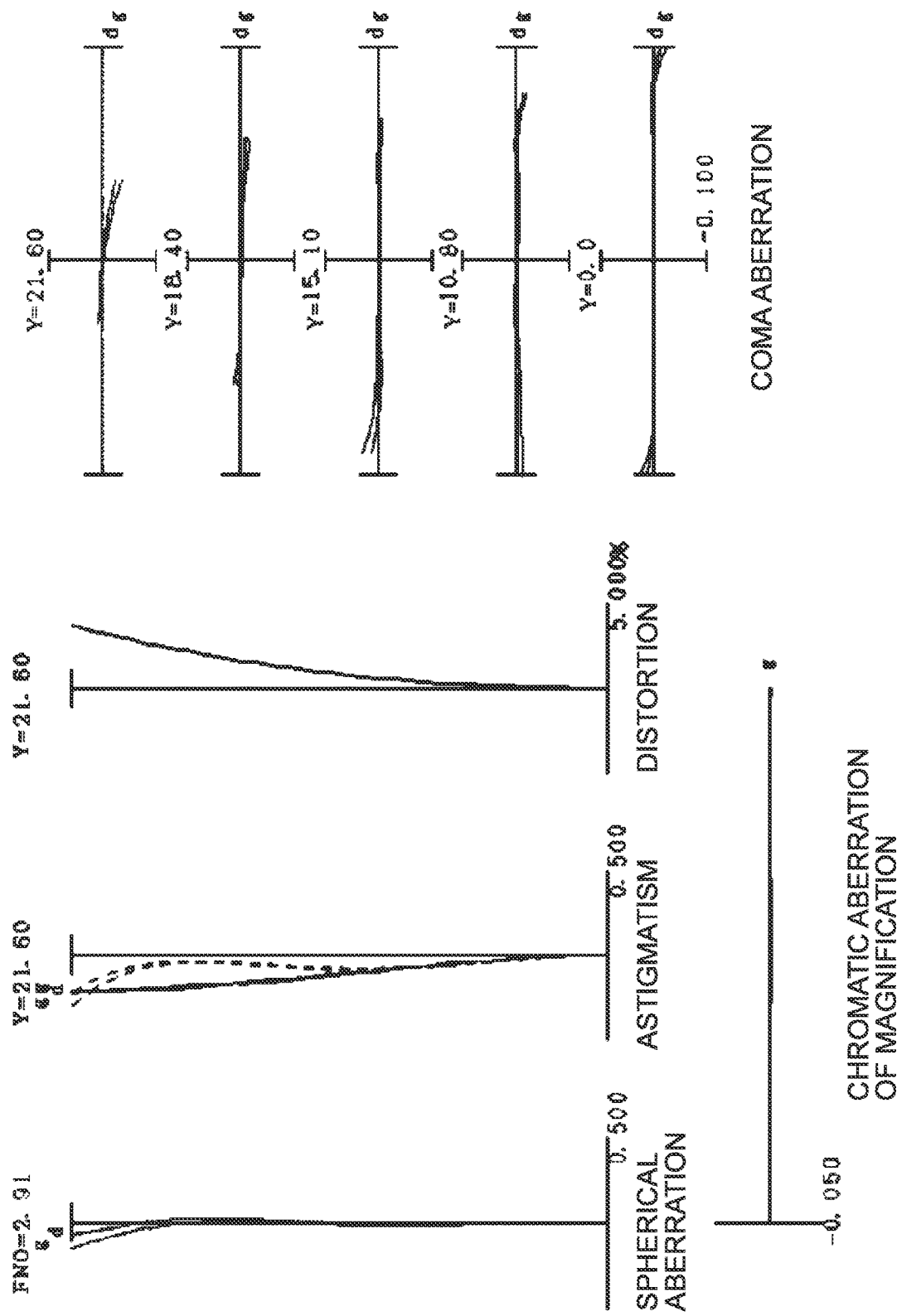
Figure 15A:
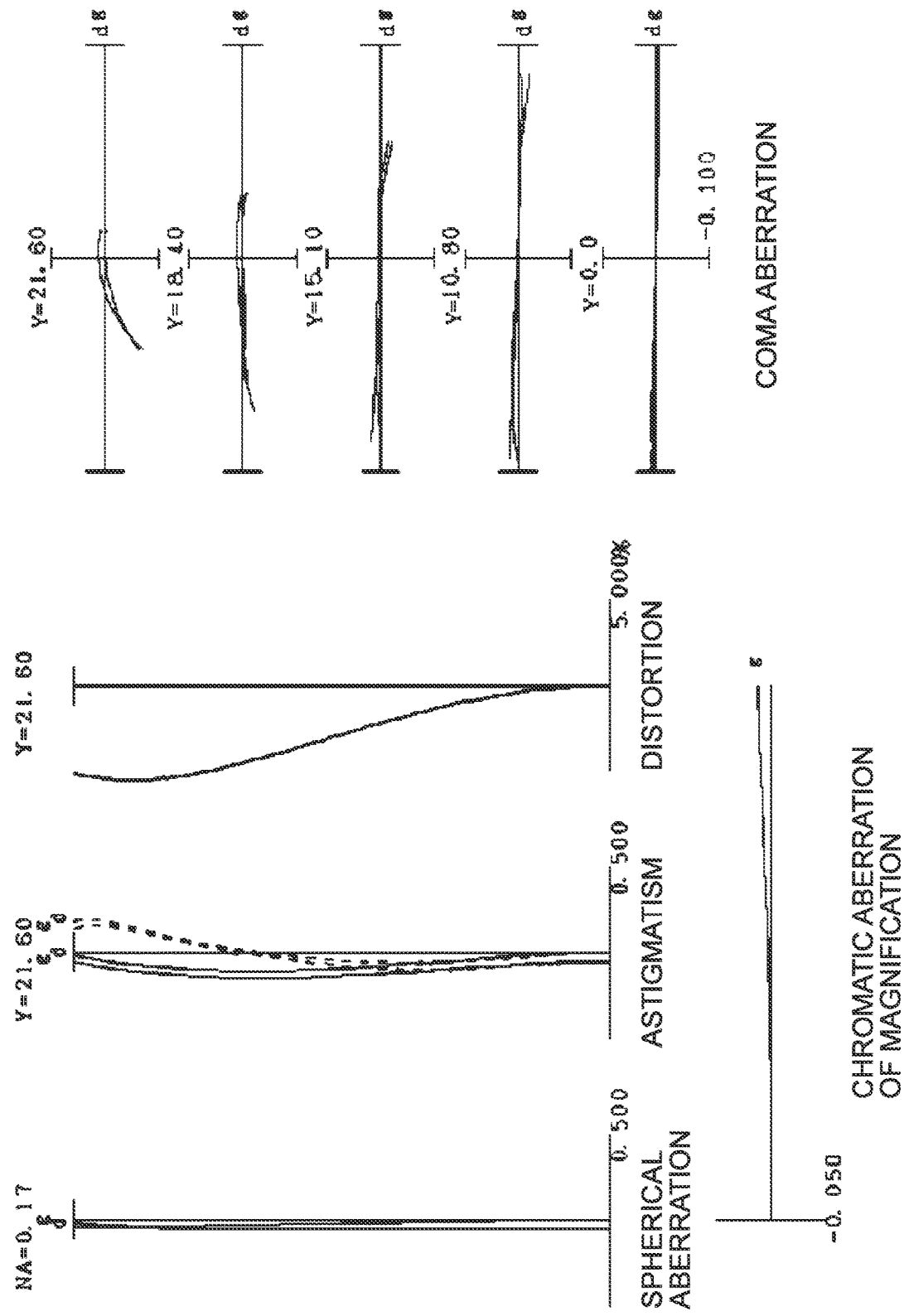
Figure 15C:
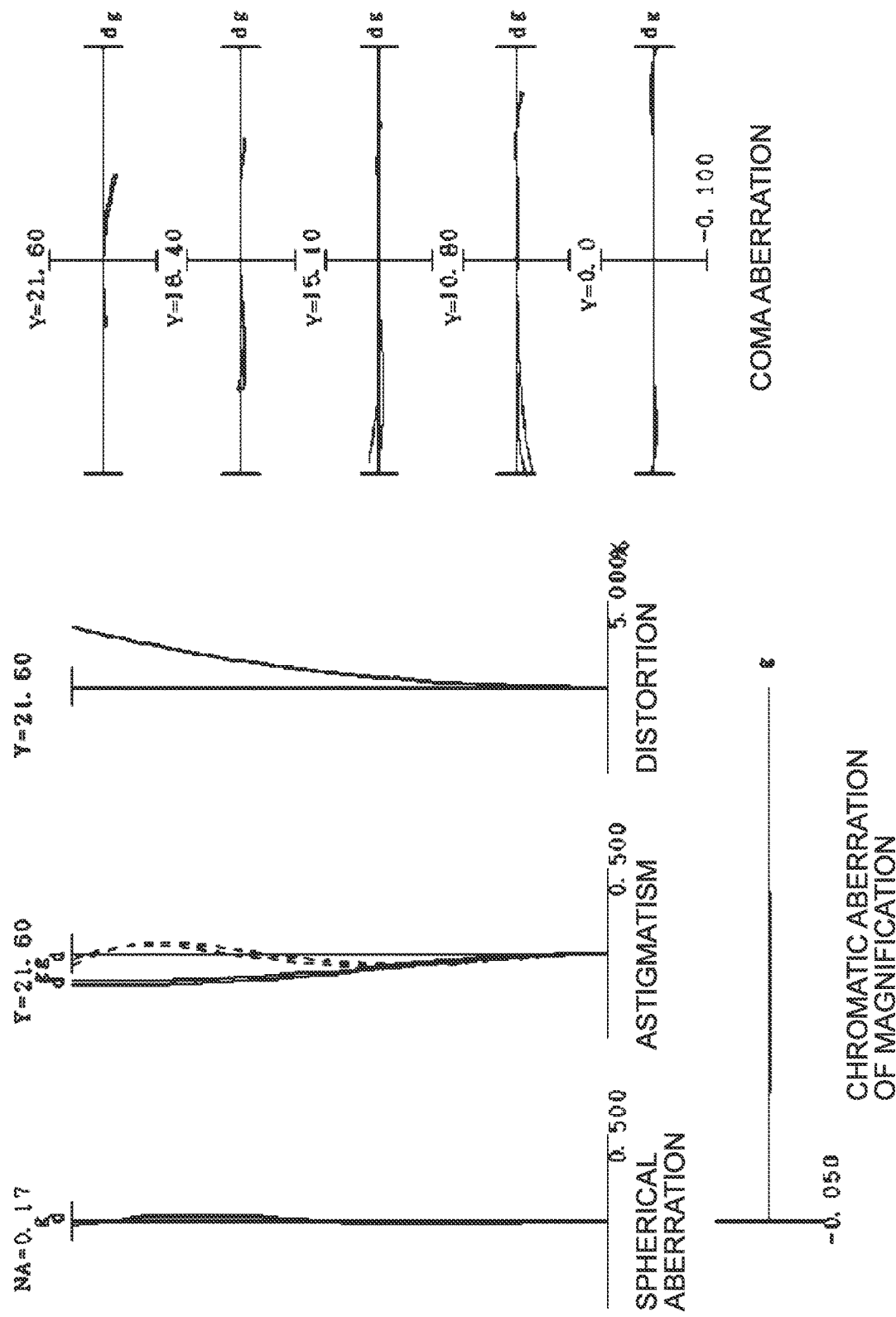

FIGS. 14A-14C shows various aberrations of the zoom optical system according to the fifth example upon focusing on infinity in the wide-angle end state (14A), the intermediate focal length state (14B) and the telephoto end state (14C). FIGS. 15A-15C shows various aberrations of the zoom optical system according to the fifth example upon focusing on a short distant object in the wide-angle end state (15A), the intermediate focal length state (15B) and the telephoto end state (15C).

The various aberration graphs show that the zoom optical system according to the fifth example favorably corrects the various aberrations from the wide-angle end state to the telephoto end state, has an excellent imaging performance, and also has an excellent imaging performance even upon focusing on a short distant object.

According to each embodiment described above, the reduction in size and weight of the lens groups for focusing can achieve high-speed AF and quietness during AF without increasing the size of the lens barrel, and can further achieve a zoom optical system that favorably suppress the aberration fluctuation upon zooming from the wide angle end state to the telephoto end state, and the aberration fluctuation upon focusing from the infinity object to the short distant object.

Note that the invention of the present application is not limited to the embodiments described above, and can be appropriately changed in a range without degrading the optical performances identified by the descriptions of corresponding claims.

The aforementioned examples describe the zoom optical systems that have the six-group configuration, the seven-group configuration, and the eight-group configuration. Alternatively, zoom optical systems having other group configurations (e.g., a nine-group configuration or the like where a lens or a lens group are added at a position in the zoom optical system closest to the object or the image) can be adopted. Here, the lens group indicates a portion that includes at least one lens separated by air distances changing during zooming.

Any of a spherical surface, a plane, and an aspherical surface may be adopted as each of the lenses constituting the zoom optical system of the present application. Spherical and planar lens surfaces have advantages that can facilitate lens processing and assembling and adjustment, prevent the optical performance degradation due to an error in the lens processing and assembling and adjustment, and reduce the degradation in representation performance even with the image surface being misaligned. The lens surface that is an aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

An antireflection film having a high transmissivity in a wide wavelength region may be applied onto the lens surfaces of the lenses constituting the zoom optical systems of the present application. Accordingly, flares and ghosts can be reduced, and high optical performances having a high contrast can be achieved.

EXPLANATION OF NUMERALS AND CHARACTERS

G1 First lens group
G2 Second lens group
G3 Third lens group
G4 Fourth lens group
G5 Fifth lens group
G6 Sixth lens group
G7 Seventh lens group
G8 Eighth lens group
I Image surface
S Aperture stop

The invention claimed is:

1. A zoom optical system comprising a plurality of lens groups, wherein
distances between adjacent lens groups among the plurality of lens groups change upon zooming,
the plurality of lens groups include: a first focusing lens group that moves upon focusing; and a second focusing lens group that is disposed closer to an image surface than the first focusing lens group, and moves on a trajectory different from a trajectory of the first focusing lens group upon focusing, the first focusing lens group and the second focusing lens group each have a negative refractive power, and
the following conditional expressions are satisfied:

$$0.40 < fF1/fF2 < 3.50$$

$$(\beta WF1 + 1/\beta WF1)^{-2} < 0.250$$

where
fF1: a focal length of the first focusing lens group,
fF2: a focal length of the second focusing lens group, and
βWF1: a lateral magnification of the first focusing lens group upon focusing on an infinity object in a wide angle end state.

2. The zoom optical system according to claim 1, wherein the following conditional expression is satisfied:

$$0.20 < (-fFs)/ft < 2.00$$

fFs: a focal length of either the first focusing lens group or the second focusing lens group which has a stronger refractive power than the other, and
ft: a focal length of the zoom optical system in a telephoto end state.

3. The zoom optical system according to claim 1, wherein the first focusing lens group moves in a direction toward the image surface upon focusing from an infinity object to a short distant object.

4. The zoom optical system according to claim 1, wherein the second focusing lens group moves in a direction toward the image surface upon focusing from an infinity object to a short distant object.

5. The zoom optical system according to claim 1, wherein the following conditional expression is satisfied:

$$1.00 < (-fFs)/fw < 4.00$$

where
fFs: a focal length of either the first focusing lens group or the second focusing lens group which has a stronger refractive power than the other, and
fw: a focal length of the zoom optical system in a wide angle end state.

6. The zoom optical system according to claim 1, wherein the following conditional expression is satisfied:

$$0.10 < MWF1/MWF2 < 3.00$$

where
MWF1: an absolute value of an amount of movement of the first focusing lens group upon focusing from an infinity object to a short distant object in a wide angle end state, and
MWF2: an absolute value of an amount of movement of the second focusing lens group upon focusing from the infinity object to the short distant object in the wide angle end state.

7. The zoom optical system according to claim 1, wherein the following conditional expression is satisfied:

$$0.20 < \beta WF1/\beta WF2 < 5.00$$

where
βWF1: a lateral magnification of the first focusing lens group upon focusing on an infinity object in a wide angle end state, and
βWF2: a lateral magnification of the second focusing lens group upon focusing on the infinity object in the wide angle end state.

8. The zoom optical system according to claim 1, wherein the plurality of lens groups include a succeeding lens group disposed closer to the image surface than the second focusing lens group, and the succeeding lens group consists of at least one lens group.

9. The zoom optical system according to claim 1, wherein the plurality of lens groups include a succeeding lens group disposed closer to the image surface than the second focusing lens group, and
the following conditional expression is satisfied:

$$-2.00 < (-fFs)/fR < 2.00$$

where
fFs: a focal length of either the first focusing lens group or the second focusing lens group which has a stronger refractive power than the other, and
fR: a focal length of the succeeding lens group.

10. The zoom optical system according to claim 1, wherein the plurality of lens groups include a preceding lens group disposed closer to an object than the first focusing lens group, and the preceding lens group consists of at least one lens group.

11. The zoom optical system according to claim 1, wherein the plurality of lens groups include a preceding lens group disposed closer to an object than the first focusing lens group, and
the following conditional expression is satisfied:

$$0.30 < (-fFs)/fF < 3.00$$

where
fFs: a focal length of either the first focusing lens group or the second focusing lens group which has a stronger refractive power than the other, and
fF: a focal length of a lens group adjacent to the first focusing lens group among lens groups consisting of the preceding lens group.

12. The zoom optical system according to claim 1, wherein the plurality of lens groups include a preceding lens group disposed closer to an object than the first focusing lens group, and
the preceding lens group includes a first lens group that has a positive refractive power and is disposed closest to an object.

13. The zoom optical system according to claim 1, wherein the plurality of lens groups include a preceding lens group disposed closer to an object than the first focusing lens group,
the preceding lens group includes: a first lens group that has a positive refractive power and is disposed closest to the object; and a second lens group that has a negative refractive power and is disposed adjacent to an image surface of the first lens group, and
the first focusing lens group is disposed closest to the object among all the focusing lens groups.

14. The zoom optical system according to claim 1, wherein the plurality of lens groups include, in order closest from an object: a first lens group having a positive refractive power; and a second lens group having a negative refractive power, and
the following conditional expression is satisfied:

$$4.00 < f1/(-f2) < 8.00$$

where
f1: a focal length of the first lens group, and
f2: a focal length of the second lens group.

15. The zoom optical system according to claim 1, wherein
the following conditional expression is satisfied:

$$2\omega w > 75.0°$$

where
ωw: a half angle of view of the zoom optical system in a wide angle end state.

16. The zoom optical system according to claim 1, wherein
the following conditional expression is satisfied:

$$0.10 < BFw/fw < 1.00$$

where
BFw: a back focus of the zoom optical system in a wide-angle end state, and
fw: a focal length of the zoom optical system in the wide angle end state.

17. The zoom optical system according to claim 1, wherein
the second focusing lens group has a lens component having a negative refractive power, and the lens component satisfies the following conditional expression:

$$-2.00 < (r2+r1)/(r2-r1) < 6.00$$

where
r1: a radius of curvature of a lens surface of the lens component on an object side, and
r2: a radius of curvature of a lens surface of the lens component on an image side.

18. The zoom optical system according to claim 1, wherein
the following conditional expression is satisfied:

$$1.05 < \beta WF1 < 1.80$$

where
βWF1: a lateral magnification of the first focusing lens group upon focusing on an infinity object in a wide angle end state.

19. The zoom optical system according to claim 1, wherein
the following conditional expression is satisfied:

$$1.05 < \beta WF2 < 1.80$$

where
βWF2: a lateral magnification of the second focusing lens group upon focusing on an infinity object in a wide angle end state.

20. The zoom optical system according to claim 1, wherein
the following conditional expression is satisfied:

$$(\beta WF2 + 1/\beta WF2)^{-2} < 0.250$$

where
βWF2: a lateral magnification of the second focusing lens group upon focusing on an infinity object in a wide angle end state.

21. An optical apparatus mounted with the zoom optical system according to claim 1.

22. A method for manufacturing a zoom optical system comprising a plurality of lens groups, wherein
distances between adjacent lens groups among the plurality of lens groups change upon zooming,
the plurality of lens groups include: a first focusing lens group that moves upon focusing; and a second focusing lens group that is disposed closer to an image surface than the first focusing lens group, and moves on a trajectory different from a trajectory of the first focusing lens group upon focusing,
the first focusing lens group and the second focusing lens group each have a negative refractive power, and
the method configures each of the lens groups and arranges the groups in a lens barrel so as to satisfy the following conditional expressions:

$$0.40 < fF1/fF2 < 3.50$$

$$(\beta WF1 + 1/\beta WF1)^{-2} < 0.250$$

where
fF1: a focal length of the first focusing lens group,
fF2: a focal length of the second focusing lens group, and
βWF1: a lateral magnification of the first focusing lens group upon focusing on an infinity object in a wide angle end state.

* * * * *